United States Patent
Duong et al.

(10) Patent No.: US 12,093,696 B1
(45) Date of Patent: Sep. 17, 2024

(54) BUS FOR TRANSPORTING OUTPUT VALUES OF A NEURAL NETWORK LAYER TO CORES SPECIFIED BY CONFIGURATION DATA

(71) Applicant: Perceive Corporation, San Jose, CA (US)

(72) Inventors: Kenneth Duong, San Jose, CA (US); Jung Ko, San Jose, CA (US); Steven L. Teig, Menlo Park, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 778 days.

(21) Appl. No.: 16/537,481

(22) Filed: Aug. 9, 2019

Related U.S. Application Data

(63) Continuation-in-part of application No. 16/120,387, filed on Sep. 3, 2018, now Pat. No. 10,740,434.
(Continued)

(51) Int. Cl.
*G06F 9/38* (2018.01)
*G06F 15/80* (2006.01)
(Continued)

(52) U.S. Cl.
CPC ............ *G06F 9/3877* (2013.01); *G06F 15/80* (2013.01); *G06N 3/063* (2013.01); *G06N 5/046* (2013.01)

(58) Field of Classification Search
CPC ...... G06F 15/8046; G06F 15/82; G06F 17/16; G06F 9/3877; G06F 13/4022;
(Continued)

(56) References Cited

U.S. PATENT DOCUMENTS

| | | |
|---|---|---|
| 5,386,531 A | 1/1995 | Blaner et al. |
| 5,956,703 A | 9/1999 | Turner et al. |

(Continued)

FOREIGN PATENT DOCUMENTS

| | | |
|---|---|---|
| CN | 108876698 A | 11/2018 |
| CN | 108280514 B | 10/2020 |
| WO | 2020044527 A1 | 3/2020 |

OTHER PUBLICATIONS

Boo, Yoonho, et al., "Structured Sparse Ternary Weight Coding of Deep Neural Networks for Efficient Hardware Implementations," 2017 IEEE Workshop on Signal Processing Systems (SiPS), Oct. 3-5, 2017, 6 pages, IEEE, Lorient, France.
(Continued)

*Primary Examiner* — David J. Huisman
(74) *Attorney, Agent, or Firm* — ADELI LLP

(57) ABSTRACT

Some embodiments provide a neural network inference circuit (NNIC) for executing a neural network that includes multiple computation nodes at multiple layers. The NNIC includes multiple core circuits including memories for storing input values for the computation nodes. The NNIC includes a set of post-processing circuits for computing output values of the computation nodes. The output values for a first layer are for storage in the core circuits as input values for a second layer. The NNIC includes an output bus that connects the post-processing circuits to the core circuits. The output bus is for (i) receiving a set of output values from the post-processing circuits, (ii) transporting the output values of the set to the core circuits based on configuration data specifying a core circuit at which each of the output values is to be stored, and (iii) aligning the output values for storage in the core circuits.

16 Claims, 27 Drawing Sheets

Related U.S. Application Data

(60) Provisional application No. 62/873,804, filed on Jul. 12, 2019, provisional application No. 62/853,128, filed on May 27, 2019, provisional application No. 62/797,910, filed on Jan. 28, 2019, provisional application No. 62/792,123, filed on Jan. 14, 2019, provisional application No. 62/773,164, filed on Nov. 29, 2018, provisional application No. 62/773,162, filed on Nov. 29, 2018, provisional application No. 62/753,878, filed on Oct. 31, 2018, provisional application No. 62/742,802, filed on Oct. 8, 2018, provisional application No. 62/724,589, filed on Aug. 29, 2018, provisional application No. 62/660,914, filed on Apr. 20, 2018.

(51) Int. Cl.
  *G06N 3/063* (2023.01)
  *G06N 5/046* (2023.01)

(58) Field of Classification Search
  CPC ..... G06F 15/80; G06F 13/4027; G06N 5/046; G06N 20/00; G06N 3/063
  See application file for complete search history.

(56) References Cited

U.S. PATENT DOCUMENTS

| | | | |
|---|---|---|---|
| 9,858,636 B1 | 1/2018 | Im et al. | |
| 9,904,874 B2 | 2/2018 | Shoaib et al. | |
| 10,445,638 B1 | 10/2019 | Amirineni et al. | |
| 10,489,478 B2 | 11/2019 | Lim et al. | |
| 10,515,303 B2 | 12/2019 | Lie et al. | |
| 10,572,447 B2 | 2/2020 | Honkala et al. | |
| 10,657,438 B2 | 5/2020 | Lie et al. | |
| 10,664,310 B2 | 5/2020 | Bokhari et al. | |
| 10,740,265 B1 | 8/2020 | Xu et al. | |
| 10,768,856 B1 | 9/2020 | Diamant et al. | |
| 10,796,198 B2 | 10/2020 | Franca-Neto | |
| 10,817,042 B2 | 10/2020 | Desai et al. | |
| 10,853,738 B1 | 12/2020 | Dockendorf et al. | |
| 11,138,292 B1 | 10/2021 | Nair et al. | |
| 11,537,853 B1 | 12/2022 | Afzal et al. | |
| 11,586,910 B1 | 2/2023 | Duong et al. | |
| 11,868,867 B1 | 1/2024 | Afzal et al. | |
| 2004/0078403 A1 | 4/2004 | Scheuermann et al. | |
| 2009/0279141 A1 | 11/2009 | Ohhashi | |
| 2011/0307685 A1 | 12/2011 | Song | |
| 2015/0339570 A1 | 11/2015 | Scheffler et al. | |
| 2016/0086078 A1 | 3/2016 | Ji et al. | |
| 2016/0239706 A1 | 8/2016 | Dijkman et al. | |
| 2017/0243110 A1 | 8/2017 | Esquivel et al. | |
| 2017/0323196 A1 | 11/2017 | Gibson et al. | |
| 2017/0344882 A1 | 11/2017 | Ambrose et al. | |
| 2018/0018559 A1 | 1/2018 | Yakopcic et al. | |
| 2018/0046458 A1 | 2/2018 | Kuramoto | |
| 2018/0101763 A1 | 4/2018 | Barnard et al. | |
| 2018/0101768 A1 | 4/2018 | Laine et al. | |
| 2018/0114569 A1 | 4/2018 | Strachan et al. | |
| 2018/0121196 A1 | 5/2018 | Temam et al. | |
| 2018/0121796 A1 | 5/2018 | Deisher et al. | |
| 2018/0181406 A1 | 6/2018 | Kuramoto | |
| 2018/0189229 A1 | 7/2018 | Desoli et al. | |
| 2018/0189638 A1 | 7/2018 | Nurvitadhi et al. | |
| 2018/0197068 A1 | 7/2018 | Narayanaswami et al. | |
| 2018/0246855 A1 | 8/2018 | Redfern et al. | |
| 2018/0285726 A1 | 10/2018 | Baum et al. | |
| 2018/0285727 A1 | 10/2018 | Baum et al. | |
| 2018/0293490 A1 | 10/2018 | Ma et al. | |
| 2018/0293493 A1 | 10/2018 | Kalamkar et al. | |
| 2018/0293691 A1 | 10/2018 | Nurvitadhi et al. | |
| 2018/0300600 A1 | 10/2018 | Ma et al. | |
| 2018/0307494 A1 | 10/2018 | Ould-Ahmed-Vall et al. | |
| 2018/0307950 A1 | 10/2018 | Nealis et al. | |
| 2018/0307980 A1 | 10/2018 | Barik et al. | |
| 2018/0307985 A1 | 10/2018 | Appu et al. | |
| 2018/0308202 A1 | 10/2018 | Appu et al. | |
| 2018/0314492 A1 | 11/2018 | Fais et al. | |
| 2018/0314941 A1* | 11/2018 | Lie | G06F 9/45533 |
| 2018/0322386 A1 | 11/2018 | Sridharan et al. | |
| 2018/0329868 A1 | 11/2018 | Chen et al. | |
| 2019/0012296 A1 | 1/2019 | Hsieh et al. | |
| 2019/0026078 A1 | 1/2019 | Bannon et al. | |
| 2019/0026237 A1 | 1/2019 | Talpes et al. | |
| 2019/0026249 A1 | 1/2019 | Talpes et al. | |
| 2019/0041961 A1 | 2/2019 | Desai et al. | |
| 2019/0057036 A1 | 2/2019 | Mathuriya et al. | |
| 2019/0073585 A1 | 3/2019 | Pu et al. | |
| 2019/0087713 A1 | 3/2019 | Lamb et al. | |
| 2019/0114499 A1 | 4/2019 | Delaye et al. | |
| 2019/0138891 A1 | 5/2019 | Kim et al. | |
| 2019/0147338 A1 | 5/2019 | Pau et al. | |
| 2019/0156180 A1* | 5/2019 | Nomura | G06N 3/063 |
| 2019/0171927 A1 | 6/2019 | Diril et al. | |
| 2019/0179635 A1 | 6/2019 | Jiao et al. | |
| 2019/0196970 A1 | 6/2019 | Han et al. | |
| 2019/0205094 A1 | 7/2019 | Diril et al. | |
| 2019/0205736 A1 | 7/2019 | Bleiweiss et al. | |
| 2019/0205739 A1 | 7/2019 | Liu et al. | |
| 2019/0236445 A1 | 8/2019 | Das et al. | |
| 2019/0266217 A1 | 8/2019 | Arakawa et al. | |
| 2019/0266479 A1 | 8/2019 | Singh et al. | |
| 2019/0294413 A1 | 9/2019 | Vantrease et al. | |
| 2019/0294968 A1* | 9/2019 | Vantrease | G06N 3/063 |
| 2019/0303741 A1* | 10/2019 | Appuswamy | G06N 3/04 |
| 2019/0303749 A1 | 10/2019 | Appuswamy et al. | |
| 2019/0303750 A1 | 10/2019 | Kumar et al. | |
| 2019/0325296 A1 | 10/2019 | Fowers et al. | |
| 2019/0332925 A1 | 10/2019 | Modha | |
| 2019/0347559 A1 | 11/2019 | Kang et al. | |
| 2019/0385046 A1* | 12/2019 | Cassidy | G06F 15/8092 |
| 2020/0005131 A1 | 1/2020 | Nakahara et al. | |
| 2020/0042856 A1 | 2/2020 | Datta et al. | |
| 2020/0042859 A1 | 2/2020 | Mappouras et al. | |
| 2020/0089506 A1 | 3/2020 | Power et al. | |
| 2020/0134461 A1 | 4/2020 | Chai et al. | |
| 2020/0210838 A1 | 7/2020 | Lo et al. | |
| 2020/0234114 A1 | 7/2020 | Rakshit et al. | |
| 2020/0257930 A1 | 8/2020 | Nahr et al. | |
| 2020/0301668 A1 | 9/2020 | Li | |
| 2020/0364545 A1 | 11/2020 | Shattil | |
| 2020/0380344 A1 | 12/2020 | Lie et al. | |
| 2021/0110236 A1 | 4/2021 | Shibata | |
| 2021/0173787 A1 | 6/2021 | Nagy et al. | |
| 2021/0232897 A1 | 7/2021 | Bichler et al. | |
| 2021/0241082 A1 | 8/2021 | Nagy et al. | |
| 2021/0406672 A1 | 12/2021 | Hoang et al. | |
| 2022/0004854 A1 | 1/2022 | Lee et al. | |
| 2022/0121914 A1 | 4/2022 | Huang et al. | |

OTHER PUBLICATIONS

Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.

Ardakani, Arash, et al., "Sparsely-Connected Neural Networks: Towards Efficient VLSI Implementation of Deep Neural Networks," Proceedings of the 5th International Conference on Learning Representations (ICLR 2017), Apr. 24-26, 2017, 14 pages, ICLR, Toulon, France.

Bang, Suyoung, et al., "A 288 µW Programmable Deep-Learning Processor with 270KB On-Chip Weight Storage Using Non-Uniform Memory Hierarchy for Mobile Intelligence," Proceedings of 2017 IEEE International Solid-State Circuits Conference (ISSCC 2017), Feb. 5-7, 2017, 3 pages, IEEE, San Francisco, CA, USA.

Bong, Kyeongryeol, et al., "A 0.62mW Ultra-Low-Power Convolutional-Neural-Network Face-Recognition Processor and a CIS Integrated with Always-On Haar-Like Face Detector," Proceedings of 2017 IEEE International Solid-State Circuits Conference (ISSCC 2017), Feb. 5-7, 2017, 3 pages, IEEE, San Francisco, CA, USA.

(56) References Cited

OTHER PUBLICATIONS

Chen, Yu-Hsin, et al., "Eyeriss: A Spatial Architecture for Energy-Efficient Dataflow for Convolutional Neural Networks," Proceedings of 2016 ACM/IEEE 43rd Annual International Symposium on Computer Architecture (ISCA 2016), Jun. 18-22, 2016, 13 pages, IEEE, Seoul, South Korea.
Chen, Yu-Hsin, et al., "Using Dataflow to Optimize Energy Efficiency of Deep Neural Network Accelerators," IEEE Micro, Jun. 14, 2017, 10 pages, vol. 37, Issue 3, IEEE, New York, NY, USA.
Cho, Minsik, et al., "MEC: Memory-Efficient Convolution for Deep Neural Network," Jun. 21, 2017, 10 pages, arXiv: 1706.06873v1, Computer Research Repository (CoRR)—Cornell University, Ithaca, NY, USA.
Courbariaux, Matthieu, et al., "Binarized Neural Networks: Training Neural Networks with Weights and Activations Constrained to +1 or -1," Mar. 17, 2016, 11 pages, arXiv:1602.02830v3, Computing Research Repository (CoRR)—Cornell University, Ithaca, NY, USA.
Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.
Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.
Fu, Yao, et al., "Embedded Vision with INT8 Optimization on Xilinx Devices," WP490 (v1.0.1), Apr. 19, 2017, 15 pages, Xilinx, Inc., San Jose, CA, USA.
Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.
He, Zhezhi, et al., "Optimize Deep Convolutional Neural Network with Ternarized Weights and High Accuracy," Jul. 20, 2018, 8 pages, arXiv:1807.07948v1, Computing Research Repository (CoRR)—Cornell University, Ithaca, NY, USA.
Hegde, Kartik, et al., "UCNN: Exploiting Computational Reuse in Deep Neural Networks via Weight Repetition," Proceedings of the 45th Annual International Symposium on Computer Architecture (ISCA '18), Jun. 2-6, 2018, 14 pages, IEEE Press, Los Angeles, CA, USA.
Huan, Yuxiang, et al., "A Low-Power Accelerator for Deep Neural Networks with Enlarged Near-Zero Sparsity," May 22, 2017, 5 pages, arXiv:1705.08009v1, Computer Research Repository (CoRR)—Cornell University, Ithaca, NY, USA.
Jeon, Dongsuk, et al., "A 23-mW Face Recognition Processor with Mostly-Read 5T Memory in 40-nm CMOS," IEEE Journal on Solid-State Circuits, Jun. 2017, 15 pages, vol. 52, No. 6, IEEE, New York, NY, USA.
Jouppi, Norman, P., et al., "In-Datacenter Performance Analysis of a Tensor Processing Unit," Proceedings of the 44th Annual International Symposium on Computer Architecture (ISCA '17), Jun. 24-28, 2017, 17 pages, ACM, Toronto, ON, Canada.
Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.
Leng, Cong, et al., "Extremely Low Bit Neural Network: Squeeze the Last Bit Out with ADMM," Proceedings of 32nd AAAI Conference on Artificial Intelligence (AAAI-18), Feb. 2-7, 2018, 16 pages, Association for the Advancement of Artificial Intelligence, New Orleans, LA, USA.
Li, Fengfu, et al., "Ternary Weight Networks," May 16, 2016, 9 pages, arXiv:1605.04711v1, Computing Research Repository (CoRR)—Cornell University, Ithaca, NY, USA.
Merolla, Paul, et al., "Deep Neural Networks are Robust to Weight Binarization and Other Non-linear Distortions," Jun. 7, 2016, 10 pages, arXiv:1606.01981v1, Computing Research Repository (CoRR)—Cornell University, Ithaca, NY, USA.
Moons, Bert, et al., "Envision: A 0.26-to-10TOPS/W Subword-Parallel Dynamic-Voltage-Accuracy-Frequency- Scalable Convolutional Neural Network Processor in 28nm FDSOI," Proceedings of 2017 IEEE International Solid-State Circuits Conference (ISSCC 2017), Feb. 5-7, 2017, 3 pages, IEEE, San Francisco, CA, USA.
Moshovos, Andreas, et al., "Exploiting Typical Values to Accelerate Deep Learning," Computer, May 24, 2018, 13 pages, vol. 51—Issue 5, IEEE Computer Society, Washington, D.C.
Non-Published Commonly Owned U.S. Appl. No. 16/537,478, filed Aug. 9, 2019, 102 pages, Perceive Corporation.
Park, Jongsoo, et al., "Faster CNNs with Direct Sparse Convolutions and Guided Pruning," Jul. 28, 2017, 12 pages, arXiv: 1608.01409v5, Computer Research Repository (CoRR)—Cornell University, Ithaca, NY, USA.
Rastegari, Mohammad, et al., "XNOR-Net: ImageNet Classification Using Binary Convolutional Neural Networks," Proceedings of 2016 European Conference on Computer Vision (ECCV '16), Oct. 8-16, 2016, 17 pages, Lecture Notes in Computer Science, vol. 9908, Springer, Cham, Amsterdam, Netherlands.
Ren, Mengye, et al., "SBNet: Sparse Blocks Network for Fast Inference," Jan. 7, 2018, 10 pages, arXiv: 1801.02108v1, Computer Research Repository (CoRR)—Cornell University, Ithaca, NY, USA.
Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.
Shin, Dongjoo, et al., "DNPU: An 8.1TOPS/W Reconfigurable CNN-RNN Processor for General-Purpose Deep Neural Networks," Proceedings of 2017 IEEE International Solid-State Circuits Conference (ISSCC 2017), Feb. 5-7, 2017, 3 pages, IEEE, San Francisco, CA, USA.
Sim, Jaehyeong, et al., "A 1.42TOPS/W Deep Convolutional Neural Network Recognition Processor for Intelligent IoE Systems," Proceedings of 2016 IEEE International Solid-State Circuits Conference (ISSCC 2016), Jan. 31-Feb. 4, 2016, 3 pages, IEEE, San Francisco, CA, USA.
Sze, Vivienne, et al., "Efficient Processing of Deep Neural Networks: A Tutorial and Survey," Aug. 13, 2017, 32 pages, arXiv: 1703.09039v2, Computer Research Repository (CoRR)—Cornell University, Ithaca, NY, USA.
Wang, Min, et al., "Factorized Convolutional Neural Networks," 2017 IEEE International Conference on Computer Vision Workshops (ICCVW '17), Oct. 22-29, 2017, 9 pages, IEEE, Venice, Italy.
Yang, Xuan, et al., "DNN Dataflow Choice Is Overrated," Sep. 10, 2018, 13 pages, arXiv: 1809.04070v1, Computer Research Repository (CoRR)—Cornell University, Ithaca, NY, USA.
Zhang, Shijin, et al., "Cambricon-X: An Accelerator for Sparse Neural Networks," 2016 49th Annual IEEE/ACM International Symposium on Microarchitecture (Micro '16), Oct. 15-19, 2016, 12 pages, IEEE, Taipei, Taiwan.
Zhu, Chenzhuo, et al., "Trained Ternary Quantization," Dec. 4, 2016, 9 pages, arXiv: 1612.01064v1, Computing Research Repository (CoRR)—Cornell University, Ithaca, NY, USA.
Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.
Abtahi, Tahmid, et al., "Accelerating Convolutional Neural Network With FFT on Embedded Hardware," IEEE Transactions on Very Large Scale Integration (VLSI) Systems, Sep. 2018, 14 pages, vol. 26, No. 9, IEEE.
Carbon, A., et al., "Pleura: A Scalable Energy-Efficient Programmable Hardware Accelerator for Neural Networks," 2018 Design, Automation & Test in Europe Conference & Exhibition (Date 2018), Mar. 19-23, 2018, 6 pages, IEEE, Dresden, Germany.
Gokhale, Vinayak, et al., "Snowflake: A Model Agnostic Accelerator for Deep Convolutional Neural Networks," Aug. 8, 2017, 11 pages, arXiv: 1708.02579v1, Computing Research Repository (CoRR)—Cornell University, Ithaca, NY, USA.
Jin, Canran,, et al., "Sparse Ternary Connect: Convolutional Neural Networks Using Ternarized Weights with Enhanced Sparsity," 2018

(56) References Cited

OTHER PUBLICATIONS

23rd Asia and South Pacific Design Automation Conference (ASP-DAC), Jan. 22-25, 2018, 6 pages, IEEE, Jeju, South Korea.
Liu, Shaoli, et al., "Cambricon: An Instruction Set Architecture for Neural Networks," 2016 ACM/IEEE 43rd Annual International Symposium on Computer Architecture, Jun. 18-22, 2016, 13 pages, IEEE, Seoul, South Korea.
Han, Song, "Efficient Methods and Hardware for Deep Learning," September 217, 125 pages, Stanford University, Palo Alto, CA, USA.

\* cited by examiner

BUS FOR TRANSPORTING OUTPUT VALUES OF A NEURAL NETWORK LAYER TO CORES SPECIFIED BY CONFIGURATION DATA

BACKGROUND

In a typical neural network, a standard computation is a dot product between input values (activations) and weight values. A typical way for an integrated circuit to compute these weight values is to use multiply-accumulate (MAC) circuits that repeatedly perform the multiplication of an input value by a weight value, add that to an existing partial dot product, and store the new partial dot product. However, this requires numerous clock cycles, as each term in the dot product computed by a MAC uses a separate cycle. In addition, the storage of each intermediate term requires the use of memory (contributing to both slowing down of the computation and use of resources for the read/write operations). Accordingly, techniques for parallelization without massively expanding the surface area of the circuit are required.

BRIEF SUMMARY

Some embodiments provide an integrated circuit (IC) for implementing a machine-trained network (e.g., a neural network). The IC of some embodiments includes a set of input processing circuits, a neural network computation fabric that can be configured to apply a neural network to an input value, and a microprocessor (e.g., for controlling the input processing circuits and configuring the neural network computation fabric). The neural network computation fabric of some embodiments includes (i) a set of cores that compute dot products of input values and corresponding weight values and (ii) a channel that aggregates these dot products and performs post-processing operations (as well as performs other operations), in order to compute the outputs of neural network computation nodes.

In some embodiments, at startup of the IC, the microprocessor loads neural network configuration data (e.g., weight values, scale and bias parameters, etc.) from off-chip storage and generates instructions for the neural network computation fabric to write the neural network parameters to memory. In addition, the microprocessor loads the neural network program instructions for the computation fabric to its own memory. These instructions are applied by the computation fabric to input data (e.g., images, audio clips, etc.) in order to execute the neural network. The instructions include, e.g., the memory locations to which input values are written, configuration data specifying how to compute specific neural network nodes, etc. Upon receiving input data (e.g., from a sensor on a device that incorporates the IC), the microprocessor provides neural network program instructions to the computation fabric. Once the final output of the neural network is computed, the fabric provides this output back to the microprocessor, so that the microprocessor (or other circuitry on the device) can evaluate this output and perform any actions based on the output.

The microprocessor executes a controller, in some embodiments, that provides the neural network instructions to the computation fabric. Some embodiments provide these instructions to the computation fabric incrementally. For instance, in some embodiments, the system controller on the microprocessor initially loads the instructions for the first layer (or a first portion of the first layer) of the neural network, then waits for a signal from the fabric indicating that these instructions have been completed. Once the first portion of the network is completed by the fabric, the system controller provides the fabric with the instructions for the second portion (either a second portion of the first layer, or the second layer of the network), and so on until the network has been fully executed.

As mentioned, the neural network computation fabric includes numerous cores as well as a global channel that connects the cores, with the various data processing circuits configured by the hierarchical set of control circuits. These data processing circuits operate to compute neural network operations in an efficient, low-power manner, according to the configuration data provided by the control circuits. In some embodiments, the global channel is divided conceptually into interconnected segments, with each segment corresponding to a cluster of cores.

A typical neural network operates in layers, with each layer including numerous nodes. Examples of neural networks include feed-forward neural networks, regulatory feedback networks, radial basis function networks, recurrent networks, etc. In convolutional neural networks (a type of feed-forward network), a majority of the layers include computation nodes with both a linear function followed by a non-linear activation function (applied to the result of the linear function). The linear function is a dot product of input values (either the initial inputs based on the input data for the first layer, or outputs of the previous layer for subsequent layers) and predetermined (trained) weight values, along with bias (addition) and scale (multiplication) terms, which are also predetermined based on training. As such, for convolutional neural networks, the dot products are the primary computation that uses the most circuit resources.

The neural network computation circuit of some embodiments computes numerous neural network nodes simultaneously, with the computation for one node spread across multiple cores (and subsequently the global channel). That is, each of several cores of the computation fabric computes a partial dot product from a subset of the input values and weight values for the node. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

For a dot product computed across more than one core, these multiple cores compute partial dot products and provide these partial dot products to the global channel. In the simplest case, all of the partial dot products for a given computation node are computed in the same clock cycle and provided at the same time to the global channel. In some cases, however (e.g., for dot products with a very large number of terms), each core computes more than one partial dot product, requiring multiple clock cycles. Based on configuration data specifying which outputs from the cores are to be added together (and whether multiple partial dot products are required from the same core), the global channel aggregates these partial dot products to compute the complete dot product for each node, then applies various post-processing functions (e.g., the bias, scale, and non-linear activation functions) to compute the output of each node.

In some embodiments, each segment of the global channel includes a dot product bus, a set of post-processing circuits, and an output bus. The dot product bus, in some embodiments, includes a number of independent dot product bus lanes that each receives partial dot products from the cores, aggregates these dot products together, and provides the aggregated dot products to the post-processing circuits. In some embodiments, configuration data from the control circuitry specifies to which post-processing unit each aggregated dot product is sent. Each lane of the dot product bus spans all of the channel segments, each of which aggregates the partial dot products from its own cores. These aggregated values are then aggregated together further by additional circuits of the dot product bus lane, and configuration data specifies whether to pass the aggregated dot products in one direction of the segment or the other, or whether that segment is the final aggregator for the dot product (in which case that aggregated dot product is provided to a post-processing unit in that segment).

In some embodiments, each segment includes the same number of post-processing units as dot product bus lanes, with each post-processing unit receiving the output of a different dot product bus lane as its primary input. The post-processing units, as mentioned, perform the non-dot product functions of the neural network nodes. For a typical computation node of a convolutional (or fully-connected) layer, this includes a bias factor, a scaling factor, and a non-linear activation function. The non-linear activation function, in some embodiments, is implemented as a lookup table rather than a hardwired function. In some embodiments, the outputs of the linear function are quantized or truncated to a particular number of bits (e.g., 4 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design.

In addition to these operations, in some embodiments the post-processing units include additional circuitry for (i) performing additional dot product operations if required and (ii) performing operations for neural network computation nodes that do not use dot products. The post-processing units of some embodiments each have the ability to combine dot products from two separate cycles if a dot product is too large to be computed in a single cycle across the cores of the computation fabric. In addition, if a particular filter slice needs to be split across multiple partial dot product computation circuits (because of too many non-zero weight values, as described in greater detail below), the post-processing unit is configured to account for that. Furthermore, some embodiments enable dot products to be double the size of the standard quantized output (e.g., 8-bit rather than 4-bit) by using dot products from multiple cycles and bit-shifting the first set of input data.

Neural network computation nodes that do not use dot products include, for example, pooling layers of convolutional networks (e.g., average pooling and max pooling layers) as well as nodes that perform element-wise operations. In some of these embodiments, the cores provide input values directly to the post-processing units without computing dot products, and the post-processing units are configured to perform the appropriate operations on these inputs.

The output bus carries the computation node outputs from the post-processing units back to the cores, to be stored in the memory of the core and used as inputs for the next layer of neural network computation nodes. In some embodiments, the output values may be computed by post-processing units in one cluster but carried to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value.

Like the dot product bus, the output bus of some embodiments includes numerous lanes for transporting the computed output values from the post-processing units to the cores. Specifically, each global channel segment includes one output bus lane per post-processing unit, with that lane receiving the output value computed by the post-processing unit in some embodiments. Each of these lanes spans the entire global channel, so that it can transport output values from a post-processing unit in one segment to a core in a different cluster. As with the dot product bus, configuration from the control circuitry specifies to which core each output value is transported by the output bus. For reasons described in further detail below, in some embodiments each core that receives output values for a particular layer receives these values from a contiguous set of output bus lanes. The output values designated for a particular core, before being delivered to the core for storage in memory, are shifted by an amount specified by the configuration data, and receiving the output values from a contiguous set of output bus lanes allows for a single shift amount to align all of the data being delivered to that particular core at a given time.

As mentioned, to compute output values for a set of computation nodes, the cores compute partial dot products in parallel that are provided to the dot product bus of the local channel segment. In some embodiments, the cores include memory that stores the weight values and input values, an input buffer into which input values are loaded for the partial dot product computations, a set of weight value buffers into which weight values are loaded for the partial dot product computations, a controller or set of controller circuits for (i) writing input values and weight values into the memory (e.g., upon receipt of the input values from the output bus as output values of a previous set of computation nodes) and (ii) loading the input values and weight values from memory into the respective buffers, and a set of partial dot product computation circuits.

In some embodiments, the number of partial dot product computation circuits in each core is equal to (i) the number of weight value buffers in the core (or half of the number of weight value buffers, if primary and secondary buffers are used), (ii) the number of independent lanes of the dot product bus, (iii) the number of post-processing units of each segment of the global channel, and (iv) the number of independent lanes of the output bus. Thus, for a typical neural network computation node, the partial dot products computed by the partial dot product computation circuits having a particular index are aggregated by the dot product bus lane with the same index, that aggregated dot product is provided for post-processing to one of the post-processing units with the same index (i.e., the post-processing unit with that index in one of the channel segments), and the computation node output value generated by the post-processing unit with that index is delivered back to one of the cores via the output write bus lane with the same index).

As mentioned, each core includes one input value buffer and numerous weight value buffers in some embodiments. In convolutional neural networks, a set of input values are used as the inputs to a number of different nodes, and each layer has numerous different filters (sets of weight values). For parallelization within the cores, such a set of input values are loaded into the input value buffers of the cores used to compute the dot product for a node (by computing partial dot products that are then aggregated), while the weight values for each of these different nodes are loaded into the weight value buffers (for a node computed across multiple cores, the weight values for a given node are loaded into the weight value buffers with the same index in each of the cores). The partial dot product computation circuits corresponding to these weight value buffers then simultaneously compute the partial dot product computations for the loaded input values.

In some embodiments, the weight values for each layer of the network are ternary values (e.g., each weight is either zero, a positive value, or the negation of the positive value), with at least a fixed percentage (e.g., 75%) of the weight values being zero. Using ternary weight values allows for the weights to be treated as {0, 1, −1} (with a potential multiplication by the actual positive weight value in the post-processor), such that the multiplication of each input value by its weight value can be handled with a simple circuit that avoids actual multiplier circuits. The remainder of the partial dot product computation in a core can then be computed with an adder tree. The sparsity requirement allows for some embodiments to reduce the size of the partial dot product computation circuits by mapping each of a first number of input values (e.g., 144) to a second number of dot product inputs (e.g., 36 or 40), such that each input value with a non-zero corresponding weight value is mapped to a different one of the dot product inputs.

Specifically, in some embodiments, the partial dot product computation circuits include at least two sets of wires for each input value, with each of the sets of wires for a given input value providing that input value to two different dot product inputs. With a guarantee of at least 75% weight sparsity (i.e., at least 75% of the weight values for any set of input values are zero), the number of dot product inputs is set at 25% (or slightly more than 25%, for redundancy) of the number of input values provided to the circuit. In some embodiments, the weight sparsity is guaranteed by the training algorithm used to train the weights to perform a specific purpose, and the neural network computation circuit is adaptable for any set of weights that meets the guarantee. In some cases, individual partial dot product computations will not meet the sparsity requirement, and solutions for handling these situations are described below. In addition to storing discrete weight values (e.g., 0, 1, and −1), in some embodiments the input values (which, other than for the first layer, are output values of previous computation nodes) are discrete values (e.g., 4-bit values).

The use of small amounts of data for the weights (e.g., less than 1 bit per weight of the neural network in some cases) and consistently-sized (e.g., 4-bit) input values allows for optimizing the storage of these values in the core memories. In some embodiments, the weight and input values are aligned both within a core and between cores in such a way as to optimize (i) the efficient retrieval and usage of these values to compute the dot products of the neural network computation nodes and (ii) the minimization of the configuration instructions that the controller circuit hierarchy sends to the core controllers in order to execute this retrieval and usage of the values.

The compiler of some embodiments determines the storage location of each of the weight and input values according to sets of rules defined for how these values should be aligned in the memory. In some embodiments, the weight values for all layers of the neural network are stored in the memory at startup (boot time) of the IC (as the weight values are the same for all inputs processed by the neural network), whereas the input values are determined (and stored) during runtime (these values are different for each input processed by the neural network).

Each core of the neural network computation fabric of some embodiments includes the same circuit structure, including the same amount of memory (e.g., random access memory). In each core, this memory is divided between weight memory and activation memory. The weight memory partition is typically larger than the activation memory partition because the weight memory stores data for all of the weights for the network (e.g., encoded weight data) whereas the activation memory only stores the input/output values for a small number of layers at a time. In some embodiments, at least two layers of activations are stored at a time (i.e., the inputs for a current layer as well as the outputs for that layer, which are the inputs to the next layer). Because some layers have too many filters for the entire layer to be computed in a single pass, the input activation values for that layer cannot be overwritten immediately by the output activation values for that layer (as these inputs will be needed for second/third/etc. passes to generate additional output activation values for the layer).

In some embodiments, the compiler determines how many and which cores store the activation values for each layer of the network. The cores that store the input values for a layer are referred to as "source cores" for the layer and the cores to which the output values for the layer are written are referred to as the "destination cores" for the layer (these are then the source cores for the next layer). In general, the compiler will select cores within the same cluster before expanding to additional clusters (i.e., if only four source cores are to be used, the compiler will choose a single cluster rather than two cores of one cluster and two cores of a second cluster). Irrespective of the number of source cores used for a layer, in some embodiments the activation values are aligned across cores, with the same memory locations used in each source core to store the input activation values for the layer. Depending on the structure of the input activation values for a layer, the number of input activation values stored in each core may differ slightly. However, some embodiments always start the input activation values for a layer at the same memory location in each source core, and use zero-padding in the source cores with fewer activation values.

For convolutional neural networks, the input activation values for each layer (or at least each convolutional layer) are conceptually represented as a three-dimensional array. This three-dimensional array is structured as numerous two-dimensional grids. For instance, the initial input for an image is three two-dimensional pixel grids (e.g., a 1280×720 RGB image will have three 1280×720 input grids, one for each of the red, green, and blue channels). The number of input grids for each subsequent layer is determined by the number of filters used in the previous layer (assuming standard convolutional layers). The size of the grids for the subsequent layer depends on the number of computation nodes in the previous layer, which is based on the size of the filters and how those filters are convolved over the previous layer input activations.

For a typical convolutional layer, each filter is a small kernel of weights (often 3×3 or 5×5) with a depth equal to the number of grids of the layer's input activations. The dot product for each computation node of the layer multiplies the weights of a filter by a subset of the coordinates of the input activation values. For example, the input activations for a 3×3×Z filter are the activation values located at the same 3×3 square of all Z input activation grids for a layer.

To optimize the dot product computations, all of the input activations for a single grid are stored in the same source core, and the total number of grids is divided evenly across the source cores (i.e., if there are Q source cores, then each source core stores the activations of 1/Q of the grids). If the number of grids is not evenly divisible by the number of source cores, then some embodiments use grids of zeros to even out the number of activations in each core.

These activations within a core are not necessarily arranged with all of the activation values of a grid stored contiguously. Instead, within each core, some embodiments store all of the activations for a particular coordinate (i.e., an x-y coordinate) within the grids assigned to that core contiguously. That is, each activation has an x-coordinate, y-coordinate, and z-coordinate in the three-dimensional array, with the z-coordinate indicating the grid to which the activation belongs. Thus, in some embodiments, the activation memory for a layer in a particular core starts with the activations at (0,0) for all of the grids assigned to that core. In some embodiments, if there are more grids assigned to a core than the number of activation values that a memory location (i.e., a RAM word) can store, then these are split up into separate sets of activations, and only a single memory location worth of activation values at the same coordinate are stored contiguously. As a result, a given memory location in one source core for a layer will store activations for the same x-y coordinates as that memory location in any of the other source cores.

This storage pattern of the input values for one layer, in some embodiments, influences the assignment of filters to different indices (i.e., partial dot product computation circuit, dot product bus lane, post-processing circuit, and output bus lane) for the previous layer. As indicated above, in some embodiments the output bus operates such that all of the output values (which are input values for a subsequent layer or layers) computed at a given time (i.e., in a given clock cycle) that are to be stored in a particular core should be computed by post-processing units having a contiguous range of indices. In the typical scenario (e.g., in which the filter slices do not need to be split across multiple partial dot product computation circuits), this means that all of the filters used to compute output values that will be stored in a particular core will be assigned by the compiler to a contiguous range of weight value buffers (and thus to a contiguous range of output bus lanes).

The output bus, in some embodiments, is wired such that all lanes are potentially connected to all of the cores. However, circuitry in the core responsible for writing these output values into the core memory (to be read as input values for subsequent layers of the neural network) does not actually receive the output values on all of the output bus lanes in some embodiments. Instead, a shifter at each core is configured to shift the values from output bus lanes in order to align the output values being provided to the core. As an example, if the output bus has 64 lanes, then a core receiving output values from lanes 0-7 will not need the output values to be shifted at all. A core receiving output values from lanes 8-15 will have the output values shifted by 8 (i.e., by 32 bits if the output values are each 4 bits). The amount of this shift for each core is configured by the chip fabric control circuitry in some embodiments.

Each of the cores, in some embodiments, includes write control circuitry that is responsible for writing the output values (received via the output bus) into the activation memory of the core. This write control circuitry in some embodiments is capable of writing to one memory location (i.e., one RAM word) in a given clock cycle. However, rather than instantly writing each set of received output values to their assigned location in memory as soon as the output values are received, some embodiments use a cache to store output values until an entire memory location (i.e., entire RAM word) can be written. Because the memory read/write operations are power-intensive (as compared to temporarily storing data in registers), only writing output values to their memory location when the entire memory location can be written saves significant power over the course of executing a neural network.

This write cache, in some embodiments, is the same width as a memory location (e.g., 128 bits). When the core receives a set of output values from the output bus, if the set of output values does not cause the cache to fill up completely, then the write control circuit stores the set of output values in the cache. Some embodiments keep track of a pointer that identifies the location within the cache at which to start this newly-received set of output values. When new output values are added to the cache, the pointer is modified to identify the end of the newly added output values, so that the next set of output values will be tacked on immediately following these newly added output values. When output values are received that fill up the cache, the full cache including the newly-received values that fill up the cache are written to memory. In addition, if any newly-received output values remain (e.g., if 10 output values are received at once, but only 2 output values are needed to fill up the cache, then 8 output values would remain), then these values overwrite the values at the start of the cache (the overwritten values will now have been written to memory).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments provide an integrated circuit (IC) for implementing a machine-trained network (e.g., a neural network). The IC of some embodiments includes a set of input processing circuits, a neural network computation fabric (also referred to as a neural network inference circuit) that can be configured to apply a neural network to a set of input values, and a microprocessor (e.g., for controlling the input processing circuits and configuring the neural network computation fabric). The neural network computation fabric of some embodiments includes (i) a set of cores that compute dot products of input values and corresponding weight values and (ii) a channel that aggregates these dot products and performs post-processing operations (as well as performs other operations), in order to compute the outputs of neural network computation nodes.

Figure 1:
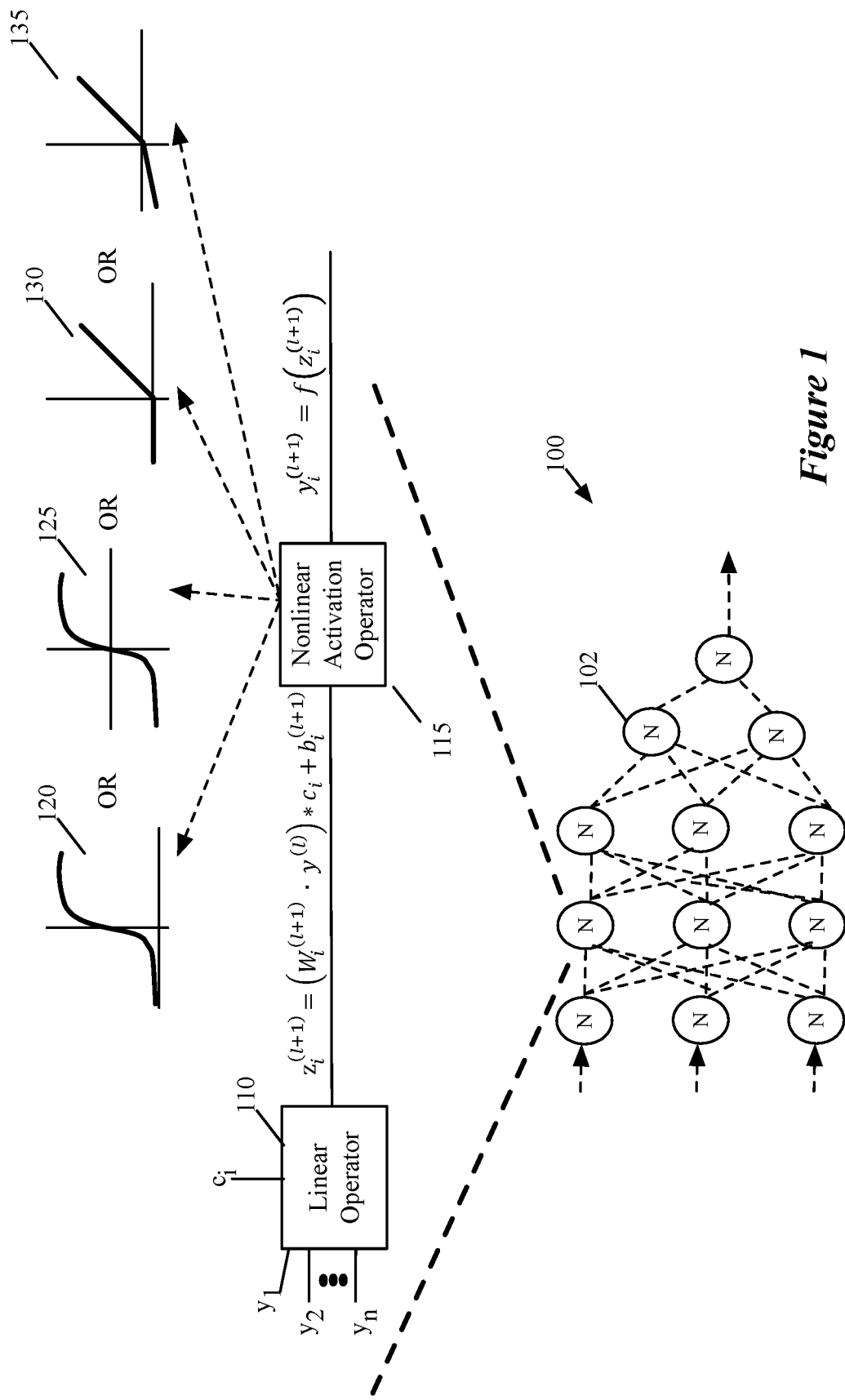
FIG. 1 illustrates an example of a multi-layer machine-trained network of some embodiments.

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value).

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 100 is a fully-connected network in which each node in a particular layer receives as inputs all of the outputs from the previous layer. However, the neural networks of some embodiments are convolutional feed-forward neural networks. In this case, the intermediate layers (referred to as "hidden" layers) may include convolutional layers, pooling layers, fully-connected layers, and normalization layers. The convolutional layers of some embodiments use a small kernel (e.g., 3×3×3) to process each tile of pixels in an image with the same set of parameters. The kernels (also referred to as filters) are three-dimensional, and multiple kernels are used to process each group of input values in in a layer (resulting in a three-dimensional output). Pooling layers combine the outputs of clusters of nodes from one layer into a single node at the next layer, as part of the process of reducing an image (which may have a large number of pixels) or other input item down to a single output (e.g., a vector output). In some embodiments, pooling layers can use max pooling (in which the maximum value among the clusters of node outputs is selected) or average pooling (in which the clusters of node outputs are averaged).

As shown in FIG. 1, each node in the neural network 100 has a linear component 110 and a nonlinear component 115. The linear component 110 of each hidden or output node in this example computes a dot product of a vector of weight coefficients and a vector of output values of prior nodes, plus an offset. In other words, a hidden or output node's linear operator computes a weighted sum of its inputs (which are outputs of the previous layer of nodes) plus an offset (also referred to as a bias). Similarly, the linear component 110 of each input node of some embodiments computes a dot product of a vector of weight coefficients and a vector of input values, plus an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable l can be any of the hidden layers (i.e., $l \in \{1, \ldots, L-1\}$ index the hidden layers of the network, with $l=0$ representing the input layer and $l=L$ representing the output layer). The variable $z_i^{(l+1)}$ represents the output of the linear component of a hidden node i in layer $l+1$. As indicated by the following Equation (A), the variable $z_i^{(l+1)}$ is computed as the dot product of a vector of weight values $W_i^{(l+1)}$ and a vector of outputs $y^{(l)}$ from layer l multiplied by a constant value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n}\left(w_{ik}^{(l+1)} * y_k^{(l)}\right) * c_i + b_i^{(l+1)}. \quad (A)$$

The constant value $c_i$ is a value to which all the weight values are normalized. In some embodiments, the constant value $c_i$ is 1. The symbol * is an element-wise product, while the symbol · is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments use a training technique that maximizes the number of weight values that are equal to zero (such that, e.g., 75% or 90% of the weight values equal zero).

The output $y^{(l+1)}$ of the nonlinear component 115 of a node in layer $l+1$ is a function of the node's linear component, and can be expressed as by Equation (B) below:

$$y_i^{(l+1)} = f(z_i^{(l+1)}). \quad (B)$$

In this equation, $f$ is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tan h function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (B) can be expressed in the following expanded format of Equation (C):

$$y_i^{(l+1)} = f(z_i^{(l+1)}) = f\left[\left(\sum_{k=1}^{n}w_{ik} * y_k\right) * c_i + b_i^{(l+1)}\right]. \quad (C)$$

In this equation, $w_{ik}$ are weight values associated with the inputs $y_k$ of the node i in layer $l+1$.

Before a multi-layer network can be used to solve a particular problem, the network is put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values).

Figure 2:
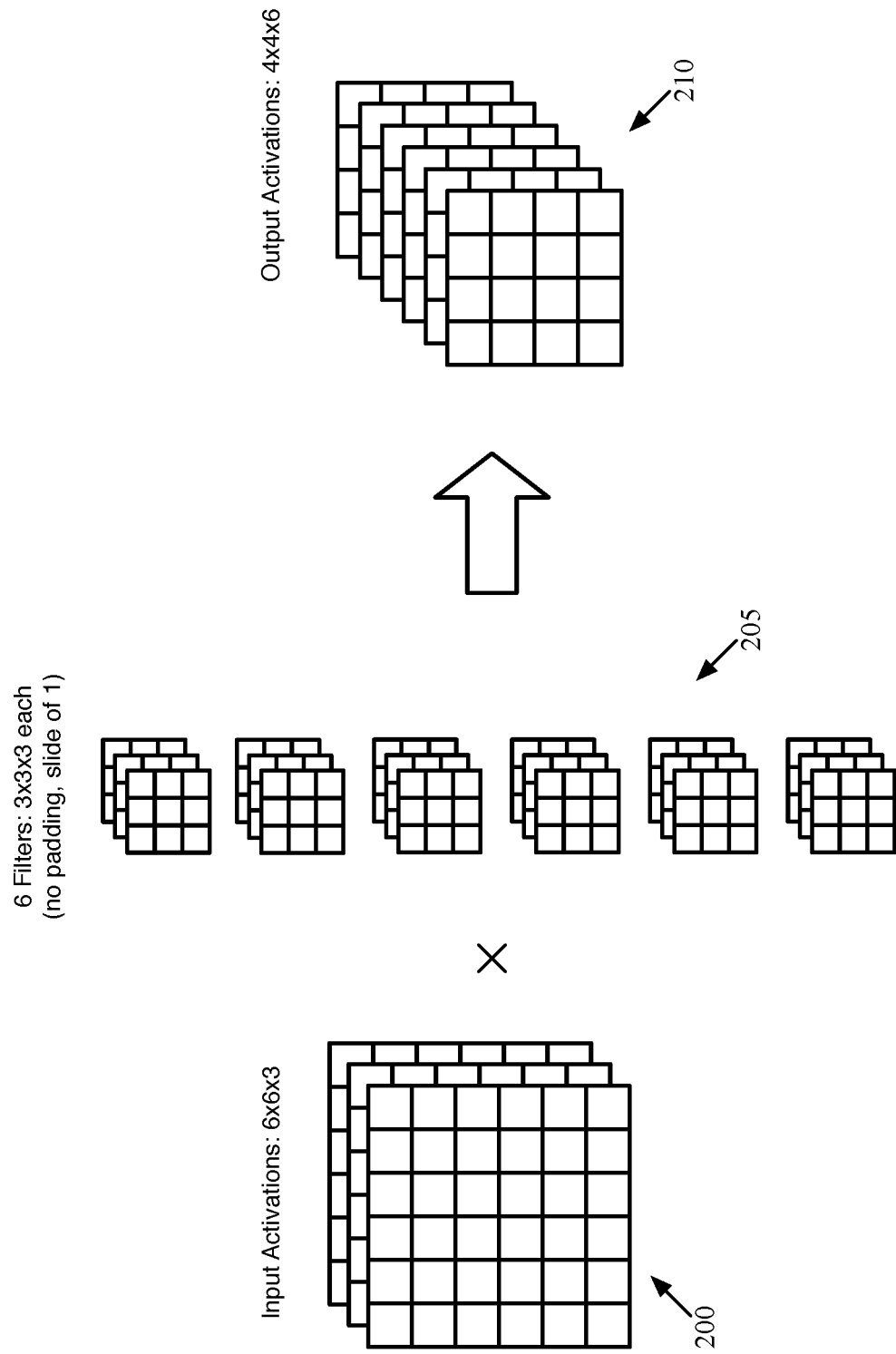
FIG. 2 conceptually illustrates a representation of a convolutional layer of a convolutional neural network.

FIG. 2 conceptually illustrates a representation of a convolutional layer of a convolutional neural network. The convolutional layer receives a set of input activation values 200 organized as a three-dimensional array. This three-dimensional array is either (i) a set of input values for the network, if the convolutional layer is the first layer of the network, or (ii) a set of output values of a previous layer of the network (e.g., a previous convolutional layer, a pooling layer, etc.). The array can be conceptualized as a set of two-dimensional grids, as shown in the figure. In this example, the dimensions of the input values is 6×6×3 (i.e., three 6×6 grids).

Each computation node of the convolutional layer involves a linear component (e.g., a dot product followed by scaling and bias functions) as well as a non-linear component, as described above. The input to each computation node is a subset of the input activation values, and the dot product for the computation node involves multiplying those input activation values by one of the filters of the layer. As shown, in this example the layer includes six filters 205, each of which is 3×3×3. Each value in one of the filters is a weight value that is trained using the techniques described above. Thus, in the example shown in this figure, each filter includes 27 trainable weight values.

The size of the filters in the x and y directions can vary (3×3 and 5×5 are common sizes), but in some embodiments the depth is required to match the depth of the input activations (in this case there are three grids, or channels, so the depth is three). The number of filters in a given layer can also vary—in general, each filter is attempting to identify the presence of a particular feature in the input values. For instance, in image analysis, a filter in an early layer might test for the presence of an edge in a particular direction while a filter in a later layer tests for the presence of a more specific object type in the image (e.g., a nose).

To generate the output activations, each of the filters 205 is applied to numerous subsets of the input activation values.

Specifically, in a typical convolution layer, each 3×3×3 filter is moved across the three-dimensional array of activation values, and the dot product between the 27 activations in the current subset and the 27 weight values in the filter is computed. This process starts in the top left corner (i.e., x=0-2, y=0-2) of the grid, and includes the full depth of the array. The filter moves across the rows, in this case using a slide of 1 (i.e., moving one column per computation node, such that the second dot product uses activations at x=1-3, y=0-2). When the end of a row is reached, the filter is moved back to the first columns (i.e., x=0-2) and down one row (i.e., y=1-3), and so on until the bottom right corner of the array is reached. Though not the case in this example, some embodiments use zero-padding at the edges of the grids.

The output activation values 210 are arranged in a 4×4×6 array in this example. The outputs from a single filter are arranged in a single grid, and because the example has six filter 205 the output activations have six grids. Using a slide value of 1 with no zero-padding results in a 4×4 output grid for each filter. These output activation values 210 are then the input activation values for the next layer of the neural network.

As mentioned, some embodiments provide an IC that implements a machine-trained network such as that shown in FIG. 1 (e.g., a convolutional neural network with at least some of the layers being similar in structure to that shown in FIG. 2). The ICs of some embodiments are configurable to implement different networks trained to perform a particular function, which may have various different arrangements of nodes and different trained weight values. For instance, the ICs may implement networks for object or facial recognition in images, voice recognition in audio samples, etc. The IC of some embodiments includes a set of input processing circuits, a neural network computation fabric that can be configured to apply a neural network to an input value, and a microprocessor (e.g., for controlling the input processing circuits and configuring the neural network computation fabric).

Figure 3:
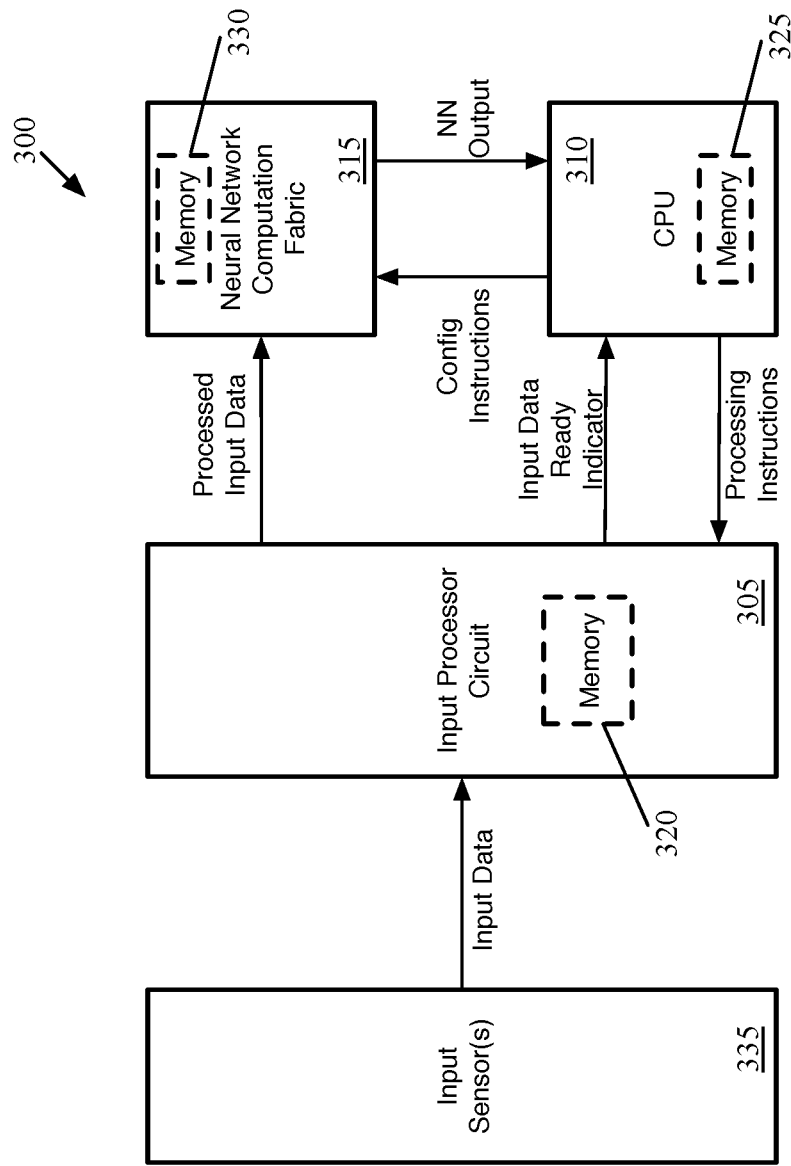
FIG. 3 conceptually illustrates an integrated circuit of some embodiments.

FIG. 3 conceptually illustrates such an IC 300 of some embodiments. As shown, the IC includes an input processor circuit 305, a microprocessor (CPU) 310, and a neural network computation fabric 315. Each of these components 305-315 also has corresponding memory (e.g., random access memory (RAM)) 320-330. In addition, in some embodiments, the IC is integrated into a device (such as an Internet of Things (IOT) device) with one or more input sensors 335. These input sensors can include cameras (e.g., for capturing video images on which the neural network computation fabric 315 performs face or object recognition, etc.), microphones (e.g., for capturing audio on which the neural network computation fabric 315 performs voice recognition, speech processing, etc.), or other types of input sensors. In other embodiments, the input sensors 335 are located on a separate device that is linked with the IC 300.

In some embodiments, at bootup of the IC 300, the CPU 310 loads neural network configuration data (e.g., weight values, scale and bias parameters, lookup table masks for each layer, memory locations for the weight and input values to use for computing each layer of the network, etc.) from off-chip storage and generates instructions for the neural network computation fabric 315 to write the weight values and other data to its memory 330. In addition, the CPU 310 loads the neural network program instructions for the computation fabric to its own memory 325. These instructions are applied by the computation fabric 315 to input data in order to execute the neural network. These runtime instructions include, e.g., indications as to which pre-loaded sets of instructions to use for each set of calculations, etc.

The input processor circuit 305 receives input data (e.g., still images or video frames, sounds, etc.) from the input sensor(s) 335, and processes these according to processing instructions received from the CPU 310. The CPU 310 stores in its memory instructions for the input processor circuit to prepare input data for the computation fabric 315 as well as the neural network program instructions. These instructions identify, in some embodiments, any sort of initial processing to apply to the raw data (e.g., decompression of compressed data, etc.) as well as how to arrange the data to be provided to the computation fabric 315. For an image, e.g., these instructions might specify the order in which the pixels should be arranged and streamed to the computation fabric 315, so that the computation fabric stores this data in the appropriate locations of its memory 330 for subsequent operations. The input processor circuit 305 also sends signals to the CPU 310 to indicate when it has fully buffered an input (e.g., a frame of video) and when the input is prepared to be sent to the computation fabric 315.

In addition to instructing the input processor circuit 305 how and when to provide input data to the computation fabric 315, the CPU 310 provides the neural network program instructions to the computation fabric. In some embodiments the CPU 310 provides these instructions in stages (e.g., one layer or portion of a layer at a time). Once the final output of the neural network is computed, the fabric 315 provides this output back to the CPU, so that the CPU (or other circuitry on the device) can evaluate this output and perform any actions based on the output.

The computation fabric of some embodiments provides a set of circuits for performing the various computations required for neural networks (e.g., dot product computations, scaler and bias operations, activation functions, etc.), with the network parameters (weight values, bias values, node arrangement, filter size, etc.) configurable. In some embodiments, the computation fabric imposes certain requirements on the networks, such as a maximum size of the network (i.e., a maximum size of the dot product computations), that the weight values be ternary (e.g., 0, $\alpha$, and $-\alpha$ for each layer of the network), and/or that at least a particular percentage of the weight values be equal to zero.

Figure 4:
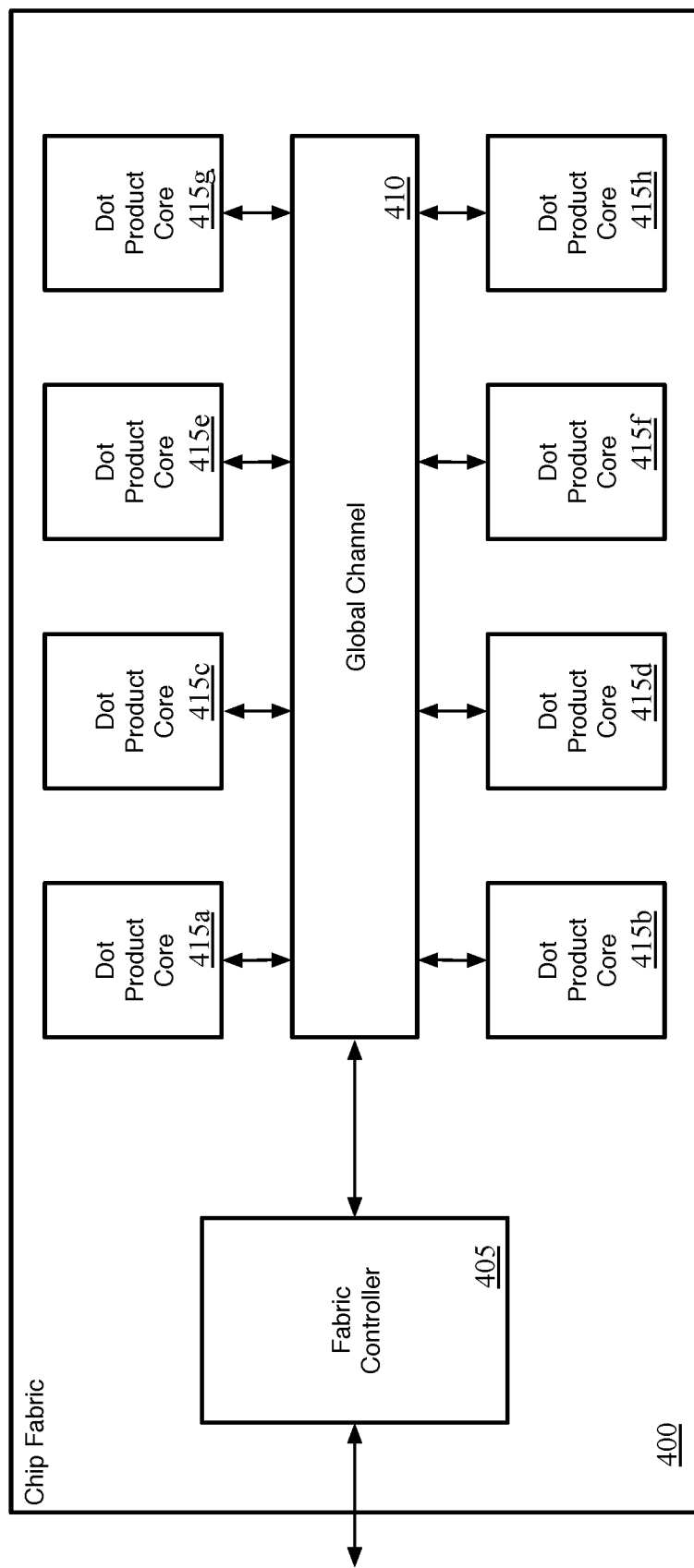
FIG. 4 conceptually illustrates the neural network computation fabric of some embodiments.

FIG. 4 conceptually illustrates the neural network computation fabric 400 (also referred to as the chip fabric) of some embodiments. The chip fabric 400 of some embodiments includes a fabric controller 405, a global channel 410, and a set of dot product cores 415a-h. The connections between the various components 405-415 represent the flow of both control data (e.g., configuration data for a particular neural network layer) and computation data at runtime in some embodiments.

The fabric controller 405 is responsible for managing the operation of the rest of the chip fabric 400 (e.g., the dot product cores 415) in some embodiments. The fabric controller 405 loads instruction arguments (e.g., weight and activation value locations, which cores to use for a particular computation, etc.) from local memory (not shown) on the chip, maps instructions into a sequence of memory-mapped register writes, synchronizes the downstream controllers (e.g., controllers for the various cores 415), etc. The instructions managed by the fabric controller 405 are configured at compile time, in some embodiments, based on the parameters of the network being implemented by the chip fabric 400. In some embodiments, the fabric controller 405 interacts with the microprocessor of the IC as well (i.e., the fabric controller 405 handles the communication with the CPU 310 shown in FIG. 3).

The chip fabric also includes numerous dot product cores 415 as well as a global channel 410 that connects the cores, with these data processing circuits configured by the fabric controller (and a set of hierarchical control circuits, in some embodiments). These data processing circuits 410 and 415 operate to compute neural network operations in an efficient, low-power manner, according to the configuration data provided by the control circuits.

The dot product cores 415a-h include circuitry for computing partial dot products in some embodiments, which is described in further details below. In some embodiments, this circuitry includes memory and/or buffers for storing weights and activations, controllers for reading these values out of memory, and adder trees for computing the partial dot products based on the weight and activation inputs. The core memory, controllers, adder trees, and other core circuitry of some embodiments are described below in greater detail.

The global channel 410 is responsible for providing a communications bus for control and computation data between the fabric controller 405 and the cores 415, as well as from one core to another. The global channel 410, among other operations, accumulates partial dot products from multiple cores when computing dot products that require more computations than can be performed in a single core, and performs post-processing on these dot products. In addition, the global channel 410 carries activations (i.e., computation node outputs) after post-processing for storage (and for use as inputs to subsequent computation nodes) in other cores 415. In some embodiments, the global channel 410 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 410, as described further below.

The chip fabric 400 of some embodiments computes numerous neural network computation nodes simultaneously, with the computation for one node often spread across multiple cores (and subsequently the global channel). In some cases, if a neural network layer is small enough, then computation for that layer may be confined to a single core 415. However, if multiple cores are used for a given layer (any number of cores may be used in some embodiments), then each dot product computed for that layer is spread across all of the cores 415 in use.

That is, for a dot product computed across more than one core 415, each of these cores computes a partial dot product from a subset of the input values and weight values for the node, then provides these partial dot products to the global channel 410. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

In the simplest case, all of the partial dot products are computed in the same clock cycle and provided at the same time to the global channel 410. In some cases, however (e.g., for dot products with a very large number of terms or using larger than standard activation values, or when filters have too many nonzero weight values), each core 415 computes more than one partial dot product for a single computation node, requiring multiple clock cycles (also referred to as time-multiplexing of the dot products). Based on configuration data specifying which outputs from the cores are to be added together (and whether multiple partial dot products are required from the same core), the global channel 410 aggregates these partial dot products to compute the complete dot product for each node, then applies various post-processing functions (e.g., the bias, scale, and non-linear activation functions) to compute the output of each node.

Figure 5:
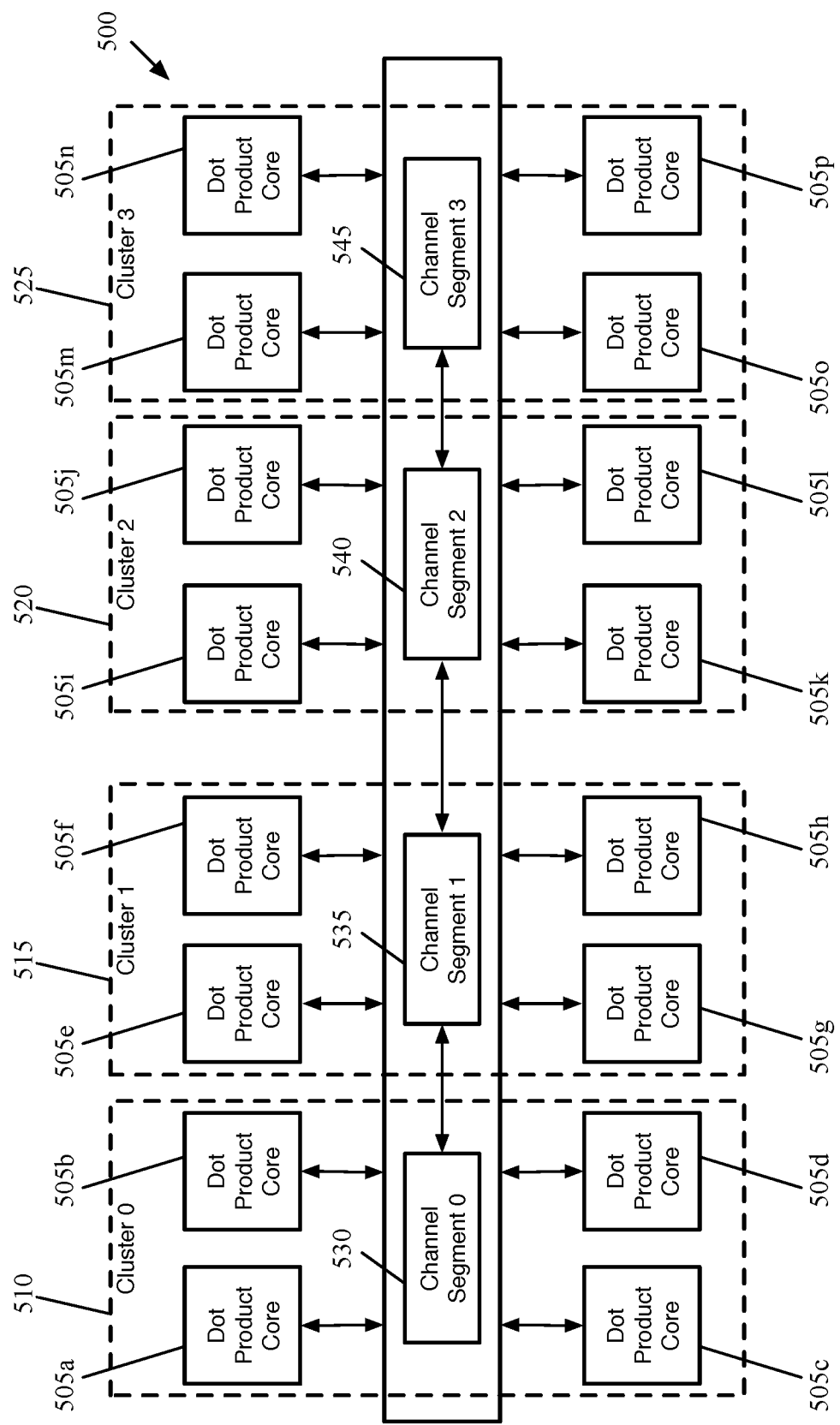
FIG. 5 illustrates a neural network computation fabric of some embodiments with sixteen dot product cores grouped into four clusters.

In some embodiments, the dot product cores are grouped into clusters, and the global channel includes separate segments for each such cluster. FIG. 5 illustrates a neural network computation fabric 500 of some embodiments with sixteen dot product cores 505a-p grouped into four clusters 510-525. In addition, the global channel includes four channel segments 530-545. Each of these channel segments includes the same circuitry in some embodiments, with the exception that buses in the first channel segment 530 and last channel segments 545 only connect to corresponding buses in one other channel segment while the buses in the intermediate channel segments 535 and 540 connect to corresponding buses in two neighboring channel segments.

The data processing circuitry of each of the channel segments 530-545 includes a dot product bus, a set of post-processing circuits, and an output bus in some embodiments. The dot product bus receives partial dot products from the cores, aggregates these dot products together, and provides the aggregated dot products to the post-processing circuits. The post-processing circuits perform the non-dot product computations of the neural network computation nodes, which may include a bias (addition) factor, a scaling (multiplication) factor, and a non-linear activation function (e.g., for a node in a convolutional or fully-connected layer). The output of the post-processing circuits are the computation node outputs (activations). The output bus, or activation write bus, carries the outputs of the post-processing circuits to the cores 505a-p to be stored as inputs for the next computation layer.

In some embodiments, each cluster 510-525 or group of clusters (e.g., clusters 510 and 515 being one group and clusters 520 and 525 being a second group) can execute a separate neural network. This allows the fabric to execute multiple networks simultaneously, so long as the networks are not so large as to require more than the cores of the allocated cluster or clusters. For instance, a single chip of an IOT device could run both a facial recognition network and an object recognition network, a facial recognition network and a language parsing network, etc.

Figure 6:
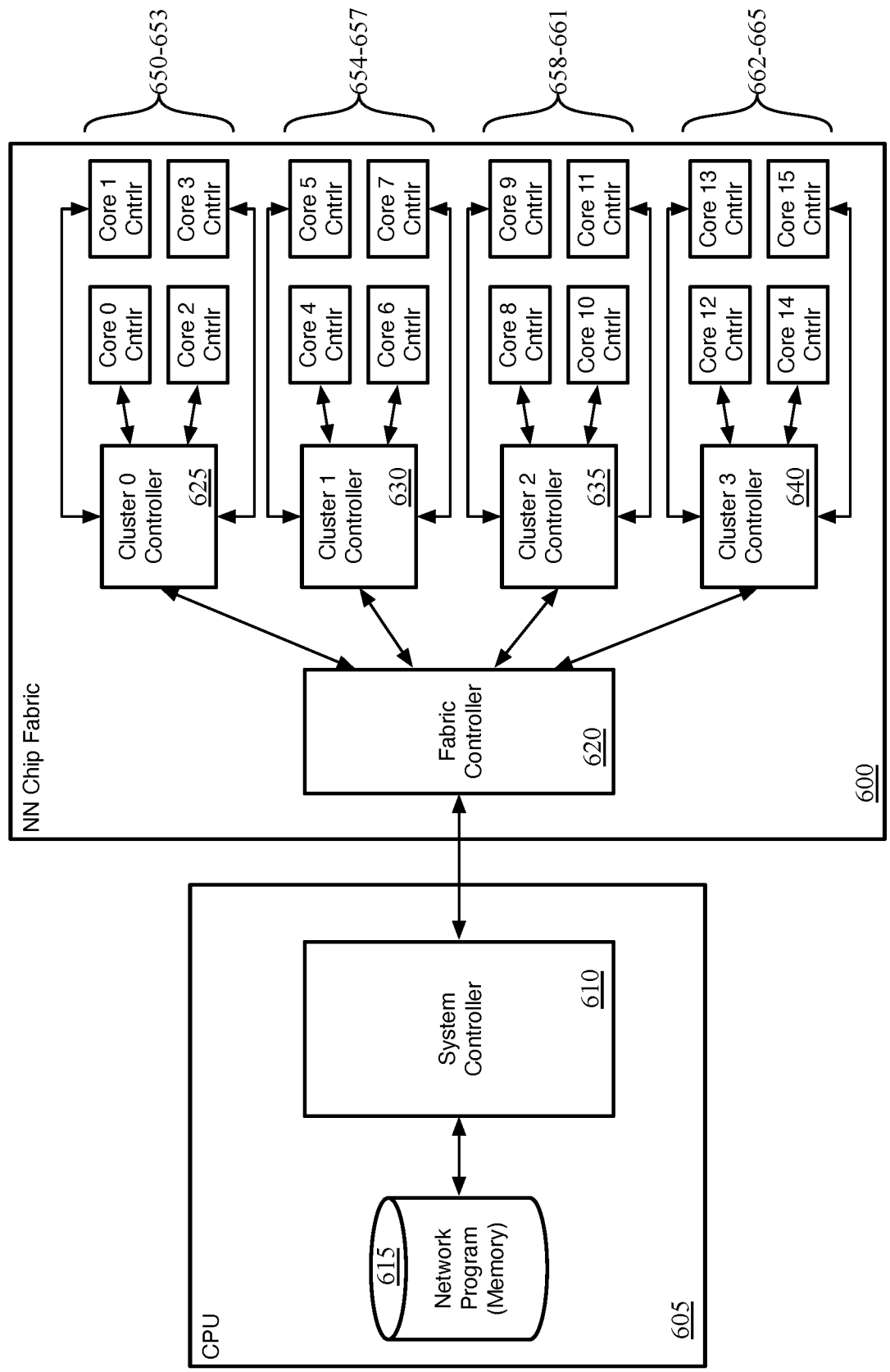
FIG. 6 conceptually illustrates a set of controller circuits for configuring a neural network chip fabric of some embodiments to execute a neural network.

Before describing the structure of the computation circuitry in greater detail, the hierarchical control and configuration of the neural network chip fabric will be described. FIG. 6 conceptually illustrates the set of controller circuits for configuring a neural network chip fabric 600 of some embodiments to execute a neural network. As shown, a CPU 605 executes a system controller 610 and stores a neural network program 615 (i.e., the compiled version of the neural network) in its memory.

The system controller 610 provides the neural network instructions to the chip fabric 600 (per the stored network program 615) for the chip fabric to execute the program on incoming input data (e.g., images, etc.). In some embodiments, the system controller 610 provides these instructions to the chip fabric 600 incrementally. For instance, in some embodiments, the system controller 610 initially loads the instructions for the first layer of the neural network, or a portion of the first layer, then waits for a signal from the chip fabric 600 indicating that these instructions have been completed.

If a layer of the network is small enough to be completed in a single pass, then the compiler of some embodiments schedules the entire layer for one pass. However, in some embodiments, there is a maximum number of filters that can be loaded in a single pass (e.g., 64) due to the structure of the chip fabric. In addition, in some embodiments there is a maximum number of output sets that can be written to the same core in the same pass, so this can also constrict the number of filters in a pass. The chip fabric computes the output for all of the nodes for each filter loaded (i.e., each pass loads all of the input activations for the layer in the correct order for the outputs to be computed). However, if a layer has more than this maximum number of filters, then the layer will be divided across multiple passes. Once the first portion of the network is completed, the system controller 610 provides the fabric 600 with the instructions for the second portion (e.g., a second layer, or a second pass of the first layer), and so on until the chip fabric has fully executed the network.

The chip fabric 600 includes a hierarchical control structure for configuring the data processing circuitry (i.e., the dot product cores and global channel segments) to execute the neural network instructions from the system controller 610. As shown, the chip fabric 600 of some embodiments includes (i) a fabric controller 620 that interacts with the system controller 610 on the CPU 605, (ii) a set of cluster controllers 625-640, and (iii) a set of core controllers 650-665. Some embodiments include one cluster controller for each cluster of the chip fabric and one core controller for each core (in this case the chip fabric 600 has four clusters with four cores each).

The fabric controller 620 provides the point of interaction with the CPU 605 for the chip fabric 600, receiving neural network program instructions from the system controller 610 and sending signals to the system controller to indicate when instructions have been completed. Upon receiving neural network instructions (e.g., for a layer of the network or portion of a layer), the fabric controller 620 parses the instructions to identify the active cores (and thus the active clusters), and unpacks additional arguments stored in local instruction memory on the chip fabric. In some embodiments, in order to minimize power usage, the instructions provided from the CPU are high-level commands that the fabric controller parses in order to determine more detailed instructions for the lower-level controllers. Doing so limits control signal power consumption on the chip while encapsulating implementation details of the lower-level (cluster, core) circuits.

For example, in some embodiments the instructions from the system controller 610 to the fabric controller 620 specify to execute a particular pass of a particular layer of the network, and the fabric controller memory includes the required information to execute this specific pass. In some embodiments, this information is conveyed by the system controller instructions specifying to execute a particular type of pass or layer (e.g., convolution) based on the arguments found at a particular memory location of the fabric controller's memory. The specified memory location stores arguments such as the source cores for the computations (i.e., the cores that will perform the dot product calculations) and the destination cores for the output values (i.e., the cores to which the output values are stored), the memory locations in the cores at which to find the weight and/or input values for the computations (in some embodiments, the weight values are loaded into memory initially such that these memory locations are the same across all of the source cores), information for calculating the non-linear activation function for the layer (e.g., the lookup table mapping information), etc.

Because layers may potentially include thousands of output activation values, having the CPU specify a core and RAM location for each such activation value would require a lot of power. Instead, as described, some embodiments specify only a few parameters required for the chip fabric to determine the memory locations for each activation value (e.g., the cores at which the values will be stored, the starting memory address that is the same for each core, and the dimensions of the activation layer). In addition, similar principles apply to the use of input values already stored in RAM (the outputs of the previous layer) for the dot products of the current layer. The weight values and their location in memory, the location of the input values, the lookup table configuration for a layer, etc. are all the same for each network input (e.g., each frame of video) as the network is statically scheduled, so resources can be saved by storing all of this information on the chip at bootup, with a minimal amount of instruction information sent from the CPU for each layer or pass (i.e., only the location in the fabric controller of the arguments for the current layer).

The fabric controller then provides cluster instructions to the cluster controllers for the identified clusters that are in use for the current neural network layer, and waits for completion signals from the clusters indicating that the current set of instructions has been executed (and thus, that the fabric controller can notify the system controller on the CPU that the current set of instructions is complete, causing the system controller to provide the next set of instructions). Avoiding use of some of the clusters when possible provides power savings, as these cores can be powered down, or at least the memories in the cores put to sleep. Even for networks that require the use of all of the cores of the chip fabric, often the initial layers have smaller dot product computations that require fewer cores. In addition, in some embodiments, the fabric controller synchronizes the cluster controllers, ensuring that dot products computed across multiple clusters are aggregated together correctly.

In some embodiments, the cluster instructions provided by the fabric controller are not fully parsed instructions, pushing some of this work to the cluster and/or core controllers. For instance, the fabric controller may only provide the starting memory address for the activations and the activation layer dimensions, allowing the cluster controllers to determine at which core (and the RAM location within that core) each activation value is to be stored. The fabric controller also broadcasts these instructions in some embodiments, while including certain bits that specify the difference in setup between the clusters (or whether certain clusters even need to act on the instructions). Some embodiments broadcast the instructions only to the clusters involved in the computation (which could include clusters with source cores, destination cores, or both). This broadcasting reduces latency and power consumption as compared to sending separate sets of instructions to each cluster.

Each of the cluster controllers 625-640 receives instructions from the fabric controller and configures its own segment of the global channel in addition to parsing the instructions to identify configuration data for each of the cores in its cluster. That is, each cluster controller 625-640 that receives cluster instructions for a given high-level instruction directly configures the dot product bus, the post-processing units, and the activation write bus in its channel segment. In addition, these cluster controllers 625-640 determines which of its cores require the instructions and provides these instructions to the core controllers for these identified cores.

Much as the fabric controller 620 parses the high-level instructions from the system controller 610, the cluster controllers 625-640 of some embodiments decompose the instructions from the fabric controller 620 to determine the configuration data to provide to its channel segment circuits (dot product bus, post-processing units, and activation write bus) as well as the sets of instructions for each of its cores. The cluster controllers configure the channel segment circuits to, e.g., aggregate the partial dot products from the cores correctly (both within a channel segment and across channel segments), provide these aggregated dot products to the post-processing units in the correct channel segment, perform post-processing operations, and provide the output of the post-processors to the correct core. In some embodiments, this information both comes from the fabric controller (e.g., the lookup table mapping for the non-linear activation function) as well as from information stored in cluster controller memory.

The use of separate cluster controllers enables the ability of the chip fabric to execute multiple separate networks simultaneously in some embodiments. The fabric controller 620 can provide instructions to the first cluster controller 625 for a layer of a first neural network and, so long as those instructions do not require the use of other clusters, the first cluster can execute the entire neural network layer in a self-contained manner. At the same time, the fabric controller 620 could provide instructions to the second cluster controller 630 for a layer of a second neural network, with the second cluster executing the entire neural network layer in a self-contained manner. The third and fourth cluster controllers 635 and 640 could receive instructions for third and fourth networks as well, to execute at the same time as the first two. In addition, other combinations of clusters can execute multiple networks simultaneously (e.g., the first two clusters executing a first network and the second two clusters executing a second network, the first two clusters executing a first network while the third and fourth clusters each separately execute second and third networks, etc.

The cluster controllers 625-640, as mentioned, also provide the appropriate configuration data to each of the core controllers 650-665, which coordinate the dot product processing in the core (as well as the direct delivery of input activation values to the global channel for pooling, element-wise operations, etc.). In some embodiments, the cluster controllers do not fully parse the instructions to specify each individual memory read or write, but instead provide the higher-level instructions to each core controller. In addition, some embodiments broadcast the instructions from a particular cluster controller to each of the core controllers within the cluster (or the core controllers for each of the cores active in the current pass), while including certain bits that specify the difference in setup between the cores. This broadcasting reduces latency and power consumption as compared to sending separate sets of instructions to each core.

The core controllers 650-665 then parse these instructions to determine the specific configuration data for the operations of the core. This configuration data includes memory locations for various read operations to read and align weight and activation values, enable bits for the dot product operations, memory locations for write operations after activations have been computed, etc. Once the instructions are fully executed, the core controllers 650-665 send completion signals to the cluster controllers 625-640. Similarly, once the cluster controllers 625-640 receive these completion messages, they send similar messages to the fabric controller 620, which can then notify the system controller executing on the CPU that the instructions are complete. In some embodiments, the last set of neural network instructions is a set of memory read operations, for the computation fabric to deliver the neural network output results to the system controller for any post-processing operations (e.g., a soft-max operation to generate a probability, etc.). After this, the system controller puts the fabric to sleep until the next set of input data is to be processed, in some embodiments. If only a portion of the fabric is involved in executing the neural network (e.g., because one or more clusters execute a different neural network in parallel), then that portion of the fabric is put to sleep in some embodiments.

Figure 7:
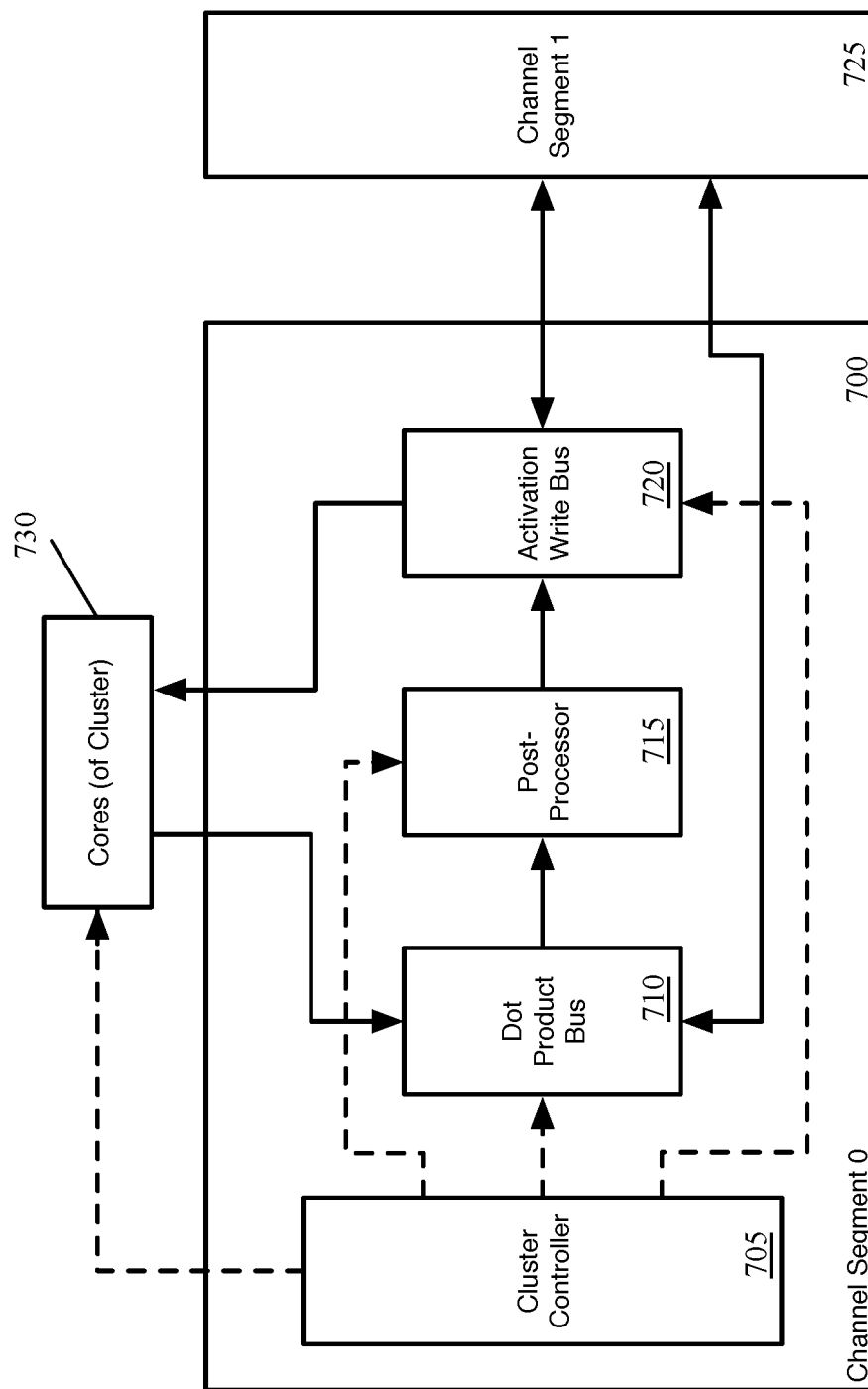
FIG. 7 conceptually illustrates the circuit blocks of a channel segment of some embodiments.

Returning to the neural network computation circuitry, FIG. 7 conceptually illustrates the circuit blocks of a channel segment 700 of some embodiments (e.g., one of the channel segments 530-545 shown in FIG. 5). The channel segment 700 includes a cluster controller 705, a dot product bus 710, a post-processor 715, and an activation write bus 720 (also referred to as an output bus). In addition to the channel segment 700, the figure also illustrates an additional channel segment 725 and the cores 730 of the local cluster for the channel segment 700, as the circuit blocks of the channel segment 700 exchange dot product and configuration data with these other circuits. In this diagram, the dashed lines represent the flow of configuration data while the solid lines represent the flow of neural network computation node data for convolution or fully-connected layer nodes (i.e., nodes that use a dot product based linear function). Additional neural network computation data, such as that flowing directly from the cores 730 to the post-processor 715 for pooling nodes or element-wise operators, is not shown.

The cluster controller 705 configures the dot product bus 710, post-processor 715, and activation write bus 720 as per the configuration instructions received from the fabric controller in some embodiments. For the dot product bus 710, this configuration data specifies, in some embodiments, (i) which partial dot products are to be added together as part of the same neural network computation node, (ii) to which post-processing unit each aggregated dot product is sent (the post-processor 715 of some embodiments includes numerous post-processing units with the same circuitry), and (iii) to which core the activation write bus 720 transports each computation node output. In other embodiments, the post-processing unit that receives each aggregated dot product is not specified as configuration data because there are an equal number of dot product bus lanes and post-processing units, so that the data from each lane is provided as the primary input to a different post-processing unit.

For the post-processor 715, the configuration data of some embodiments indicates (for each of the post-processing units) whether a dot product computation node or other computation node (e.g., pooling, element-wise operator) is being executed, the scaler and bias factors for a linear computation, the activation function to use (which may be specified, e.g., as a lookup table), as well as other data. For the activation write bus 720, the configuration data indicates to which cores each output value is to be delivered, in some embodiments.

As mentioned, the solid lines indicate the flow of neural network computation data, for a node in a convolutional or fully-connected layer. The cores 730 (as well as, in some cases, cores of other clusters) compute partial dot products. For a given computation node, these partial dot products may be computed across multiple cores. In some embodiments, if more than one core is used to compute the dot products for a neural network layer, then the partial dot products for each node are computed across all of these active cores.

These partial dot products are output to the dot product bus 710, which aggregates the partial dot products from the cores 730 of the local cluster. The dot product bus 710, in some embodiments, includes a number of independent dot product bus lanes that each receives partial dot products from the cores, aggregates these together, and provides the aggregated dot products to the post-processing circuits. In some embodiments, each lane of the dot product bus corresponds to (i) one of the adder trees in each of the cores (i.e., dot product bus lane N receives the partial dot products from each of the adder trees of index N in the cores), and (ii) one of the post-processing units in each of the clusters (i.e., dot product bus lane N provides its aggregated output to the post-processing unit N in one of the clusters, as specified by the configuration data).

Each lane of the dot product bus 710 spans all of the channel segments, and the dot product bus lanes in each channel segment aggregate the partial dot products from the cores of its local cluster. The dot product bus 710 in the channel segment 700 also exchanges locally-aggregated dot products with its neighboring segments for further aggregation if needed (i.e., if the source cores for the dot product computation span multiple clusters). In this case, the channel segment 700 only has one neighboring segment, but internal channel segments (e.g., the segments 535 and 540 in FIG. 5) will have two such neighboring segments. The configuration data from the cluster controller 705 specifies whether to send these dot products in one direction or the other along the global channel for each dot product bus lane, or to aggregate the dot products from the neighboring channels locally, depending on where post-processing will occur for each dot product.

The post-processor 715 includes numerous post-processing units that receive the dot products from their corresponding dot product bus lane and perform the non-dot product functions of the neural network computation nodes. For a typical computation node of a convolutional (or fully-connected) layer, these functions includes an addition operation to account for the bias factor, a multiplication operation to account for the scaling factor, and a non-linear activation function. In some embodiments, the outputs of the linear function are quantized or truncated to a particular number of bits (e.g., 4 bits, 5 bits, 8 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design. The non-linear activation function, in some embodiments, is implemented as a lookup table rather than a hardwired function. This enables the IC to execute different neural networks that use different activation functions and, in some embodiments, allows for different activation functions to be used in different layers of the neural network.

The activation write bus 720 receives the computation node activation outputs from the post-processing units and carries these outputs back to the cores 730, to be stored in the memory of the cores and used as inputs for the computation nodes of the next layer of the neural network. The activation write bus connects to the cores 730 in the local cluster as well as the activation write bus in the neighboring channel segment 725. As with the dot product bus 710, the activation write bus 720 of some embodiments includes lanes, with each post-processing unit of the post-processor 715 sending its output to a different one of these lanes.

In some embodiments, the output values may be computed by the post-processor 715 in one cluster but carried by the activation write bus 720 to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value. The activation write bus 720 also includes a right shift circuit for each core that is used to align the output values for the core, in order for the values to be stored in contiguous blocks within the core RAM.

Figure 8:
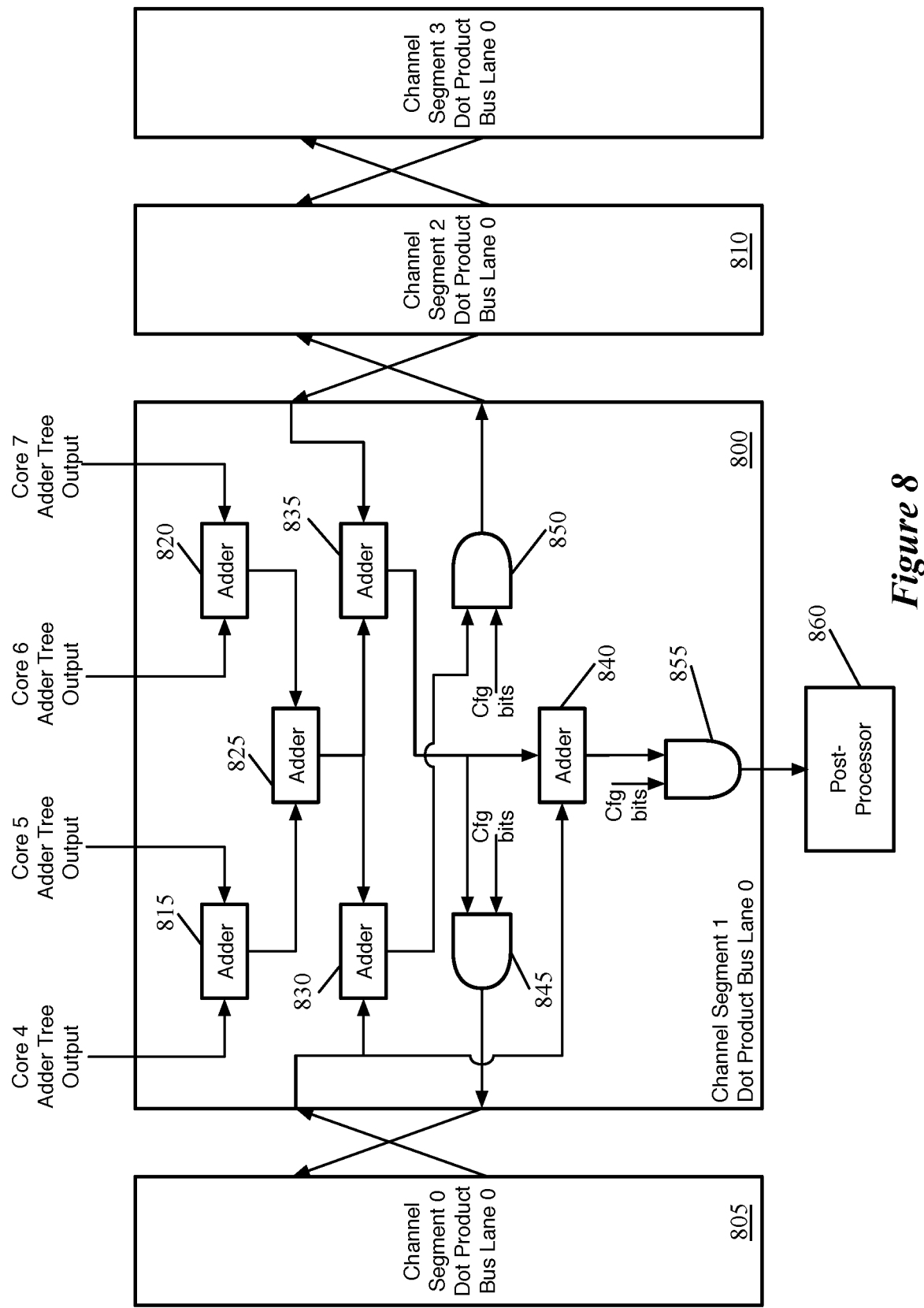
FIG. 8 conceptually illustrates a portion of the dot product bus of some embodiments.

Now that the primary circuit blocks of the global channel have been introduced, these circuits of some embodiments will be explained in greater detail. FIG. 8 conceptually illustrates a portion 800 of a dot product bus of some embodiments. In this example, the segment for which the dot product bus portion 800 is shown is an internal segment (in that it has two neighboring segments 805 and 810). The dot product bus of some embodiments includes, within each segment, numerous (N) non-interacting lanes, and the portion 800 is a segment of one of these lanes. In some embodiments, each segment includes the same number of lanes, and lane ne Nin one segment is connected to lane n in its neighboring segments for the aggregation of dot products across clusters. In some embodiments, the number N of dot product bus lanes is equal to the number of adder trees computing partial dot products in each core, the number of post-processing units in each post-processor block of a channel segment, and the number of activation write bus lanes. Thus, each computation node has its partial dot product computed by the same adder tree in each of one or more cores, which is aggregated across the corresponding dot product bus lane to calculate the complete dot product. This complete dot product is (in the typical case) provided to the corresponding dot post-processing unit, which provides its output to the corresponding activation write bus lane to be carried to the appropriate core.

The dot product bus portion 800 includes a set of adders 815-840 as well as a set of AND gates 845-855. The first three adders 815-825 form an adder tree to aggregate the partial dot products output by the corresponding adder trees of the four cores of the local cluster for the channel segment. In some embodiments, if a core does not compute a partial dot product for a particular computation node, then that core outputs a 0 value to the dot product bus. This aggregated partial dot product is output to both of the adders 830 and 835.

These adders 830 and 835 handle the computation of dot products that are "moving" downstream (to a lower-numbered segment, in this case segment 805) and downstream (to a lower-numbered segment, in this case segment 810). The adder 830 receives the aggregated dot product from the corresponding downstream dot product bus lane 805 and combines it with the locally aggregated dot product from the adder 825. If either (i) the cores of the downstream cluster(s) do not participate in the dot product computation or (ii) the dot product will be completely aggregated and sent to a post-processor downstream, then this value received from the downstream dot product bus lane 805 is gated to 0 (i.e., by the equivalent of AND gate 850 in the downstream segment).

Correspondingly, the adder 835 receives the aggregated dot product from the corresponding upstream dot product bus lane 810 and combines it with the locally aggregated dot product from the adder 825. If either (i) the cores of the upstream cluster(s) do not participate in the dot product computation or (ii) the dot product will be completely aggregated and sent to a post-processor upstream, then this value received from the upstream dot product bus lane 810 is gated to 0 (i.e., by the equivalent of AND gate 845 in the upstream segment).

The output of the adder 830 is sent to the AND gate 850, which ANDs this output with configuration bits from the local cluster controller based on where the post-processing for the completed dot product will be performed. If the post-processing segment is upstream, then these configuration bits are 1 (resulting in the aggregated dot product being passed upstream), whereas if the post-processing segment is either downstream or local, then these configuration bits are 0 (resulting in 0 values being passed upstream).

Similarly, the output of the adder 835 is sent to the AND gate 845, which ANDs this output with configuration bits from the local cluster controller based on where the post-processing for the completed dot product will be performed. If the post-processing segment is downstream, then these configuration bits are 1 (resulting in the aggregated dot product being passed downstream), whereas if the post-processing segment is either upstream or local, then these configuration bits are 0 (resulting in 0 values being passed downstream).

The final adder 840 receives (i) the output of the adder 835 and (ii) the aggregated dot product from the downstream segment 805 of the dot product bus lane. It should be noted that the directions could be reversed in other embodiments with an equivalent effect, with this adder 840 instead receiving the output of the adder 830 and the aggregated dot product from the upstream segment 810 of the dot product bus lane. This adder aggregates the complete dot product (accounting for the partial dot products from the local cores and upstream cores via the output of adder 835 and the partial dot products from the downstream cores via the output from the segment 805).

The output of the final adder 840 is provided to the post-processor 860 (e.g., to the post-processing unit that corresponds to the lane of the dot product bus). However, AND gate 855 is used to gate this output to 0 if the post-processor for this dot product bus lane is not local (i.e., either upstream or downstream). In summary, the dot product bus lane segment 800 is configured (via the AND gates 845-855) to (i) add the local cluster partial product with the downstream partial product and pass this aggregated partial product upstream if the post-processing segment is upstream, (ii) add the local cluster partial product with the upstream partial product and pass this aggregated partial product downstream if the post-processing segment is downstream, and (iii) add the local cluster partial product with the downstream and upstream partial products and pass this completed dot product to the local post-processor if the post-processing will be performed locally. In some embodiments, the post-processing segment is selected by the compiler, with the primary factor in this selection being that the post-processing segment is centrally located among the source clusters (i.e., the cores that compute the partial dot products and a secondary factor being that the selected segment is as close to the destination core(s) as possible, in order to reduce the power required for the computation and write operations.

In addition to the circuitry shown in FIG. 8, the dot product bus also includes a control block in some embodiments. This block is responsible for outputting a signal to the post-processor block to indicate when the output of the dot product bus is valid (i.e., when the dot products are aggregated by the dot product bus), so that the post-processor acts on the data from the dot product bus.

Figure 9:
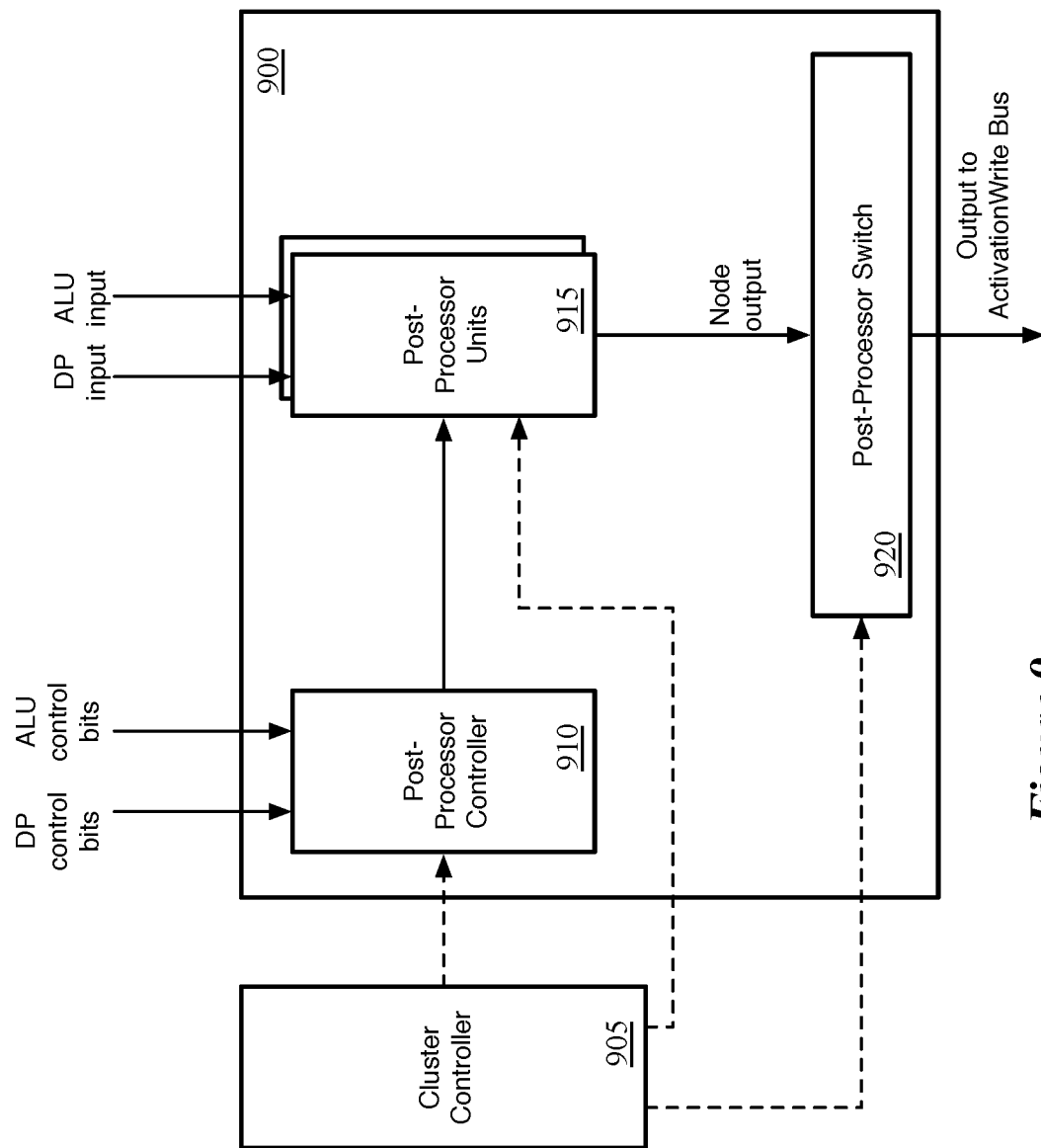
FIG. 9 conceptually illustrates the post-processing circuit block for a channel segment of some embodiments, along with the local cluster controller that provides configuration data to this post-processor.

FIG. 9 conceptually illustrates the post-processing circuit block 900 for a channel segment of some embodiments, along with the local cluster controller 905 that provides configuration data to this post-processor 900. As shown, the post-processing circuit block 900 includes as sub-blocks a post-processor controller 910, a set of post-processing units 915, and a post-processor switch 920. The cluster controller 905 provides configuration data to each of these sub-blocks in order to synchronize operations, and to configure the post-processing units 915 with the correct bias and scale factors as well as the activation function.

The post-processor controller block 910 aggregates control signals from the dot product bus (for convolution and fully-connected operations) as well as the ALU bus from the cores (for pooling, copy, and element-wise operations). These control bits include accumulate and valid signals for the dot product bus (which indicate to the post-processor whether the incoming data is a final dot product, as dot products are not sent every clock cycle) as well as accumulate, valid, and end of row signals for the ALU bus. The ALU bus, as mentioned, carries activation values directly from the cores without having dot products performed, to be used for pooling and element-wise operation layers. The accumulate and valid signals indicate to the post-processor whether the incoming ALU data is to be used, while the end of row signals that different configuration data should be used for certain post-processing operations when the end of a row of input values is reached (e.g., on account of padding, etc.). The post-processor controller block 910 aggregates these signals, as mentioned, and outputs signals to the post-processing units 915 to indicate when the post-processing units are receiving valid dot product or ALU data.

The post-processor 900 includes numerous post-processing units 915 that handle the non-dot product computation of the neural network nodes. In some embodiments, the post-processor block within a segment includes the same number of post-processing units 915 as there are dot product bus lanes and activation write bus lanes (which is also the number of adder trees in each core for computing partial dot products). Each post-processing unit 915 receives two types of data inputs: (1) dot products from the dot product bus for convolution and fully-connected neural network nodes and (2) activation inputs (ALU inputs) from the core RAM for pooling nodes and element-wise operator nodes.

In some embodiments, each post-processing unit receives a single dot product input, from its corresponding segment in the dot product bus. However, to accommodate certain situations in which one or more filter slices assigned to a core is not sparse enough (i.e., too many of the weight values of a portion of the filter used to compute a partial dot product are nonzero), the post-processing units of some embodiments each receive two dot product inputs. Specifically, some of the dot product bus lane outputs are sent to two or more of the post-processing units (in some such embodiments, different dot product bus lane outputs are sent to different numbers of post-processing units, with each post-processing unit receiving two such outputs). Some of the details of the post-processing units are described further below by reference to FIG. 10.

The post-processing switch 920 of some embodiments compresses the post-processing unit outputs (i.e., the activation outputs) to be sent to the activation write bus. In some embodiments, the chip fabric can be configured for different size activation outputs (e.g., 4-bit, 8-bit, or 16-bit), but the activation write bus requires the outputs to be in contiguous blocks. As such, for output sizes smaller than the maximum, the post-processing switch compresses these together to eliminate the meaningless bits (e.g., compressing two 4-bit activation outputs onto the wires for one 8-bit activation output).

Figure 10:
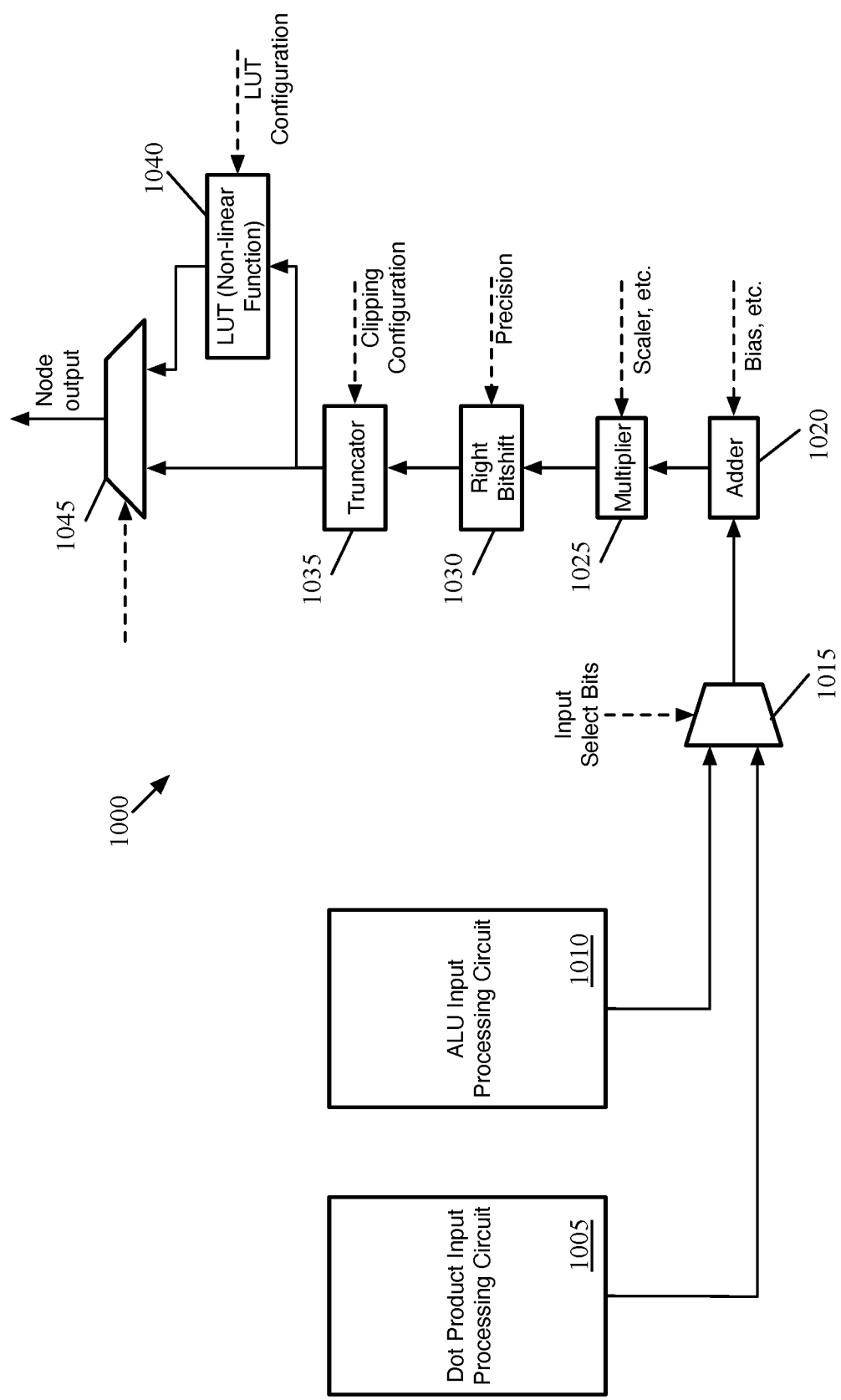
FIG. 10 conceptually illustrates the structure of a post-processing unit of some embodiments.

FIG. 10 conceptually illustrates the structure of a post-processing unit 1000 of some embodiments. As shown, the post-processing unit 1000 includes a dot product input processing circuit 1005, an ALU input processing circuit 1010, a multiplexer 1015 that selects between the outputs of these two circuits, and a set of post-processing operation circuits.

The dot product input processing circuit 1005 is used to combine dot products from two separate cycles if a dot product is too large to be computed in a single cycle across the cores of the computation fabric. In addition, if a particular filter slice needs to be split across multiple cores (because of too many non-zero weight values), the dot product input processing circuit is configured to account for that by using inputs from multiple dot product buses. Furthermore, some embodiments enable dot products to be double the size of the standard quantized output (e.g., 8-bit rather than 4-bit) by using dot products from multiple cycles and bit-shifting the first set of input data.

The ALU input processing circuit 1010 is used to perform operations for neural network nodes that do not use dot products (i.e., that are not part of convolutional or fully-connected layers). Neural network computation nodes that do not use dot products include, for example, pooling layers of convolutional networks (e.g., average pooling and max pooling layers) as well as nodes that perform element-wise operations. In some of these embodiments, the cores provide input values directly to the post-processing units without computing dot products, and the post-processing units are configured to perform the appropriate operations on these inputs.

The output of each of these circuits 1005 and 1010 is sent to a multiplexer 1015, and a set of configuration bits is used to select between these two possible inputs. This input value is sent to an adder 1020 and then to a multiplier 1025. For dot product outputs, the adder 1020 adds the bias of the linear function for the node and the multiplier 1025 multiplies this by the scaling factor for the linear function. The bias value sent to the adder 1020, in some embodiments, is a combination of (i) the bias value computed during the training of the neural network and (ii) a number of negative weight values. As described in more detail below, in some embodiments the weight values are ternary in each layer (i.e., either 0, a positive value, or a negation of that positive value). The partial dot product calculation in the cores treats these ternary weights as {0, 1, and −1}, and uses a ternary MAC circuit that performs one's complement addition to account for negative weights. The bias factor in the configuration data then accounts for the number of negative weights, to effectively turn the one's complement addition into two's complement addition.

Furthermore, for larger input and output values (e.g., 8-bit input and output values), in which the dot product input processing circuit 1005 left shifts the dot product of the most significant bits of the inputs (e.g., by 4 bits), the bias factor has to add a larger amount for the negative weights. For the 8-bit case (in which the dot product of the weights with the most significant nibble of the inputs is shifted by 4 bits), the bias factor adds 17 for each negative weight. The value sent to the multiplier 1025, in some embodiments, is a combination of (i) the scaler value computed during the training of the neural network (which is often 1) and (ii) the positive value of the ternary weight (which was removed in order to scale the weight values used in the dot product to 1 and −1).

In some embodiments, a multiplexer is used to select between a bias value specific to the post-processing unit (i.e., allowing for different bias values for different computation nodes in a layer) and a bias value shared across all of the post-processing units in a layer. In general, convolution and fully-connected nodes will use a node-specific bias value (especially when accounting for the number of negative weights), but pooling and element-wise operator layers may use the same value for all of the nodes (often zero). For the scaling factor, a set of multiplexers is used in some embodiments to select between a node-specific scaling value and two possible shared scaling values. In some embodiments, pooling layers will use the same shared scaling value for each node (e.g., to divide by the number of nodes over which average pooling is performed), but at the end of a row will need a different scaling value to account for padding.

The right bit shift operator 1030 ensures that, post-multiplication, the value has the desired precision (i.e., shifting the binary point). As an example, a number with three bits before the binary point and two bits after multiplied by a similar such number would result in a number with six bits before the binary point and four bits after. However, if a number with only two bits after the binary point is desired, the right bit shift removes the last two bits. In some embodiments, the right bit shift receives a set of configuration bits that map to different allowed precisions.

The truncator 1035 performs a clipping operation in some embodiments to truncate the output value of the linear operator down to the desired number of bits. In some embodiments, this can be a 4-bit value, a 5-bit value (a 4-bit signed value), an 8-bit value, or a 16-bit value. In such embodiments, the output has 16 wires, and values of less than 16-bits have 0s for the appropriate number of most significant bits. In other embodiments, the maximum output is 8 bits, in which case 4-bit, 5-bit, and 8-bit values are possible outputs. Different clipping operations that may be used, in different embodiments, can include a modulo operation (that effectively zeroes out a particular number of the most significant bits), clipping values above a maximum down to that maximum (e.g., if outputting a 5-bit value, all values above 15 are clipped down to 15 (1111), etc. In some embodiments, the truncator 1035 receives (as output from the right bit shifter 1030) more bits than it outputs (e.g., receiving 32 bits but outputting a maximum of 16 bits).

Finally, the LUT 1040 implements the non-linear activation function. The full (e.g., 16-bit, 8-bit) output of the truncator 1035 is passed to the multiplexer 1045, while a subset of the output bits (e.g., 5 bits) are also split off to the LUT 1045. This LUT effectively implements a mapping table representing the activation function for the neural network computation node, and the multiplexer 1045 selects between the truncator output and the LUT output. The LUT configuration, in some embodiments, is the same for all nodes in a layer, which only requires one set of mapping table values to be sent as part of the neural network instructions. The multiplexer output is the neural network node output, which is gated by a valid signal (not shown) to indicate when the post-processing unit is outputting a completed activation value to be carried by the activation write bus to the appropriate core and stored in the activation memory of that core.

The use of a LUT rather than a hardwired non-linear function enables the use of different non-linear activation functions for different layers of a neural network as well as for different networks. For instance, in addition to common activation functions such as the Rectified Linear Unit (RELU), periodic activation functions, etc. are possible. In some embodiments, the lookup table circuit receives a truth-table (e.g., a 4-bit to 4-bit or 5-bit to 4-bit mapping) as configuration data in order to implement the non-linear activation function. In some embodiments, periodic functions with can be implemented using the modulus function of the truncator 1035. In this case, the period of the period function is the full truth table provided to the lookup table 1040, with the modulus function meaning that only the 5 least significant bits of the output from the right bit shifter 1030 will affect the value output by the lookup table 1040.

Figure 11:
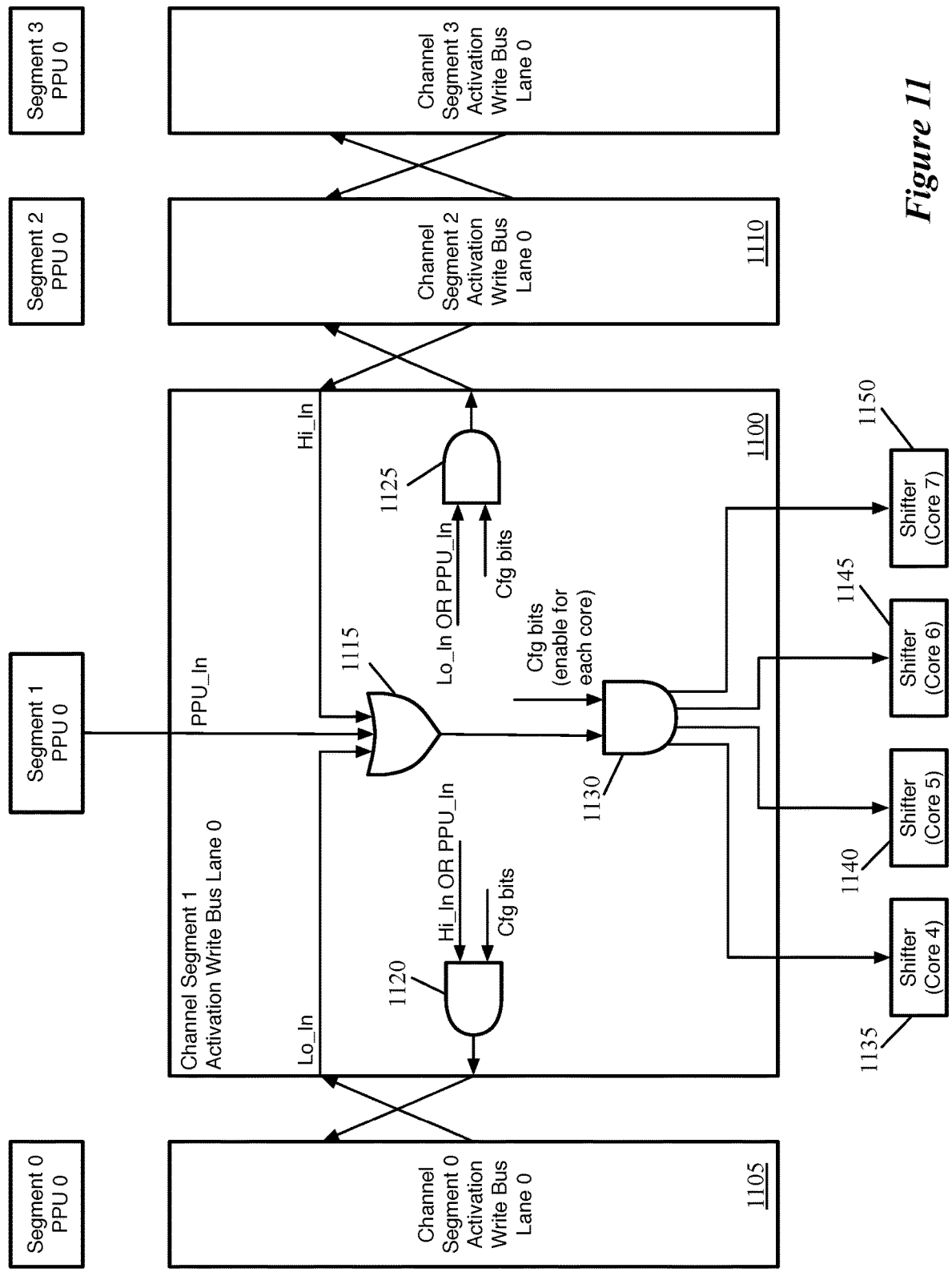
FIG. 11 conceptually illustrates a portion of an activation write bus of some embodiments.

FIG. 11 conceptually illustrates a portion 1100 of an activation write bus of some embodiments. In this example, the segment for which the activation write bus portion 1100 is shown is an internal segment (in that it has two neighboring segments 1105 and 1110). The activation write bus of some embodiments includes, within each segment, numerous (N) non-interacting lanes, and the portion 1100 is a segment of one of these lanes. In some embodiments, each segment includes the same number of lanes, and lane n∈N in one segment is connected to lane n in its neighboring segments in order for computation node output values (e.g., activation values) to be computed by a post-processing unit in one cluster and carried by the activation write bus to a core in a different cluster. As with the dot product bus, in some embodiments, the number N of activation write bus lanes is equal to the number of post-processing units in each post-processor block of a channel segment, the number of dot product bus lanes, and the number adder trees and primary/secondary filter slice buffers in each core. Thus, in a typical case, the activation write bus lane n carries the computation node output that was computed by adder tree n in one or more of the cores to generate partial dot products, which were aggregated by dot product bus lane n and provided to the post-processing unit n in one of the clusters.

The activation write bus portion 1100 includes an OR gate 1115 and three AND gates 1120-1130, in addition to multiple OR gates that are not shown here for simplicity. The OR gate 1115 receives an output value (e.g., activations) from either (i) the corresponding lane of the activation write bus in the downstream channel segment (Lo_In), (ii) the corresponding PPU in its own channel segment (PPU_In), (iii) the corresponding lane of the activation write bus in the upstream channel segment (Hi_In), or (iv) none of these options (if the activation write bus lane corresponds to an index for which no output value is calculated in a current neural network layer or layer portion). Because at most one of the PPUs for a given index will receive an aggregated dot product and compute an output value for a given layer portion, at most one of the inputs to the OR gate 1115 will be non-zero, and this value is passed on to the AND gate 1130.

The AND gate 1130 represents several AND gates (one for each of the cores), each of which receives the output of the OR gate 1115. If one of the cores local to this channel segment is the destination core for the output value carried by the activation write bus, then the AND gate 1130 for that core is enabled by a configuration bit, while the other AND gates (as well as corresponding AND gates in other channel segments) do not receive an enable signal (and thus gate the output from being provided to their respective cores).

The AND gates 1120 and 1125 pass the output values downstream and upstream, respectively. The input to AND gate 1120 is either the value received from upstream (Hi_In) or the locally computed value (PPU_In). An OR gate (not shown) is used in some embodiments to provide one of these values (unless both are 0) to the AND gate 1120, which is gated with an enable signal that sends the appropriate value downstream (in this case to activation write bus portion 1105) if the destination core belongs to a downstream cluster. The input to AND gate 1125 is either the value received from downstream (Lo_In) or the locally computed value (PPU_In). An OR gate (not shown) is used in some embodiments to provide one of these values (unless both are 0) to the AND gate 1125, which is gated with an enable signal that sends the appropriate value upstream (in this case to activation write bus portion 1110) if the destination core belongs to an upstream cluster. In some embodiments, to save on control/configuration bits, the enables for the AND gates 1120 and 1125 are shared between groups of contiguous activation write bus lanes. For example, some embodiments use groups of four lanes, such that, e.g., lanes 0-3 share these enable signals. As will be described below, cores receive contiguous blocks of activations, which allows this sharing of enable signals.

In addition to the N lanes, some embodiments also include a control lane with a similar structure. The control lane passes valid signals from the PPUs, which indicate whether a PPU is outputting valid data in a given clock cycle. Using configuration bits, these valid signals are also propagated upstream, downstream, and/or to the local cores. Whereas the configuration bits specify that the activation output for a given lane is propagated only to a single cluster, the valid signal may be propagated upstream, locally, and/or downstream, because multiple cores may be receiving activation values in the current cycle.

The output values are provided from the activation write bus lanes to shifters 1135-1150 at each core. In some embodiments, each of these shifters is wired to receive data from all activation write bus lanes (e.g., there are N activation write bus lanes but only a single shifter per core), although the AND gates 1120 gate off the output values so that each shifter only receives the output values that are to be stored at its corresponding core. For reasons described in further detail below, in some embodiments each core that receives output values for a particular layer receives these values from a contiguous set of activation write bus lanes. The shifters 1135-1150 shift these contiguous output values by different amounts before delivering the output values to their respective cores, with the shift amounts specified by configuration data. Receiving the output values from a contiguous set of activation write bus lanes allows for a single shift amount at each shifter to align all of the data being delivered to its respective core in a given cycle.

Figure 12:
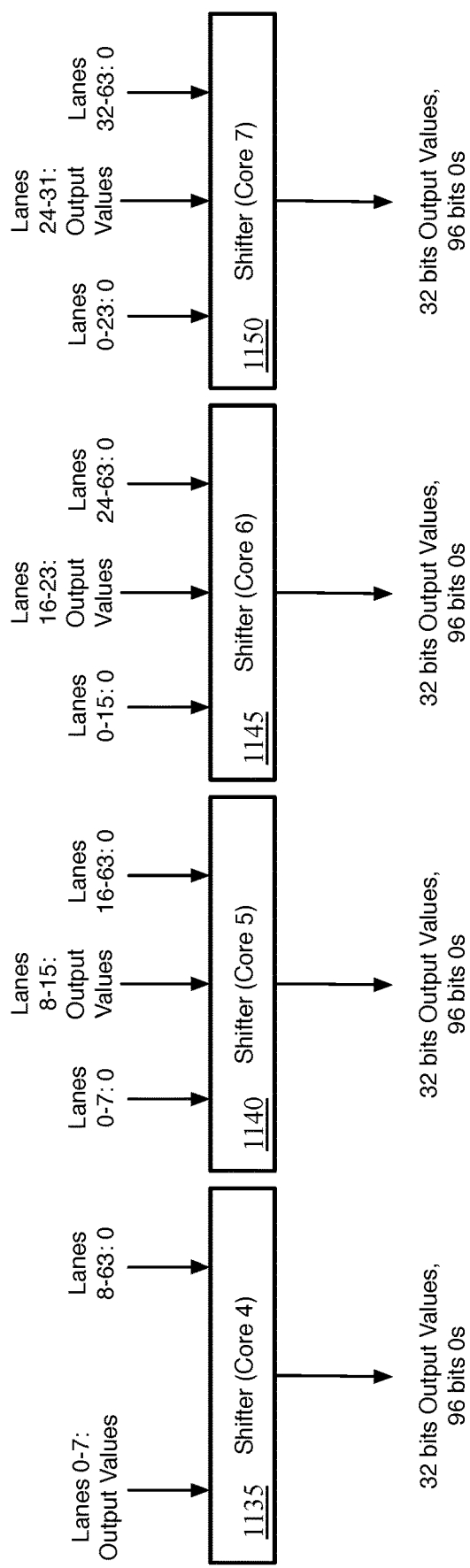
FIG. 12 conceptually illustrates an example of the shifters of the activation write bus of some embodiments shifting data by different amounts in order to align that data for storage in the memory of their respective cores.

FIG. 12 conceptually illustrates an example of the shifters 1135-1150 shifting data by different amounts in order to align that data for storage in the memory of their respective cores. In this example, the global channel includes 64 activation write bus lanes. As shown, the shifter 1135 for core 4 receives output values (e.g., 4 bits each) from lanes 0-7, and zero values (e.g., because the signals are gated) on lanes 8-63. The shifter 1140 for core 5 receives output values from lanes 8-15 and zero values (e.g., because the signals are gated) on lanes 0-7 and 16-63. The shifter 1145 for core 6 receives output values from lanes 16-23 and zero values (e.g., because the signals are gated) on lanes 0-15 and 24-63. Lastly, the shifter 1150 for core 7 receives output values from lanes 24-31 and zero values (e.g., because the signals are gated) on lanes 0-23 and 32-63. In this example, each destination core receives eight output values in each clock cycle of the current pass (i.e., as described below, each core stores output values for eight grids of activation values computed in the current pass). Up to four additional cores could store output values for the current pass, or the current pass could only be computing 32 output values at a time (i.e., only 32 filters are used in the current pass).

Each of the shifters 1135-1140 receives a different shift value such that output values received by each shifter are aligned in the same way upon output. In this case, the shifter 1135 for core 4 receives a 0-bit shift value, the shifter 1140 for core 5 receives a 32-bit shift value, the shifter 1145 for core 6 receives a 64-bit shift value, and the shifter 1150 for core 7 receives a 96-bit shift value. As shown, each of these shifters outputs 32 bits of output values (i.e., 8 output values) followed by 96 bits of 0s. In some embodiments, each shifter is wired to receive 256 bits of input data (i.e., all 64 4-bit activation write bus lanes), but only outputs 128 bits of data to the core. This is because the RAM words in the core memory are 128 bits wide, and the core write controller is set up to write a single 128-bit word at a given time. As such, in these embodiments, a single shifter (and thus a single core) can receive a maximum of 32 output values in a single clock cycle.

Figure 13:
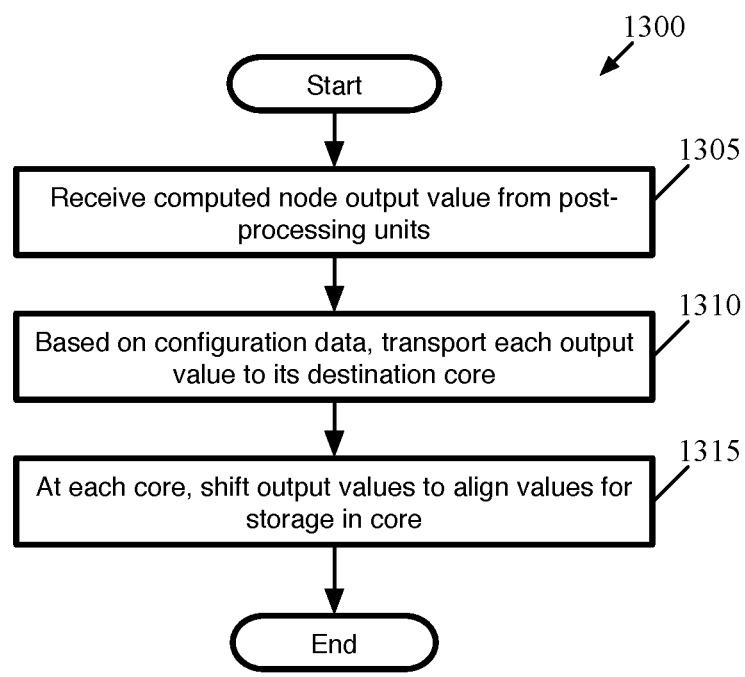
FIG. 13 conceptually illustrates a process of some embodiments for transporting output values (e.g., computed activations) to the cores for storage.

FIG. 13 conceptually illustrates a process 1300 of some embodiments for transporting output values (e.g., computed activations) to the cores for storage. In some embodiments, the process 1300 is performed by the activation write bus. This process is performed each time the post-processing units compute output values (e.g., for a convolutional layer, an element-wise operation layer, etc.). Thus, for a single pass (e.g., a single set of loaded filters), the process 1300 will be performed numerous times (i.e., each time a new set of inputs are loaded and used to compute new output values).

As shown, the process 1300 begins by receiving (at 1305) computed node output values from the post-processing units. As described above, at most one post-processing unit for a given index (i.e., corresponding to a given activation write bus lane) will compute output values during a particular clock cycle. Each activation write bus lane may receive a computed output value, or only a subset of the lanes will receive computed output values, depending on the number of filters used in a particular pass.

Based on configuration data, the process 1300 transports (at 1310) each output value to its destination core. In some embodiments, this configuration data is provided to the AND gates 1120-1130 of each activation write bus lane in order to transport output values upstream, downstream, or to local cores. As described above, the output values are transported upstream/downstream in groups in some embodiments via sharing of configuration data across multiple contiguous activation write bus lanes.

Lastly, at each core that receives output values for the current pass, the process 1300 shifts (at 1315) the output values to align the values for storage in the core. Different cores receive different shift configuration amounts, so that the output values received by each of these cores for the current clock cycle are aligned to the beginning of the 128 bits passed from the activation write bus shifter to the core for storage.

Figure 14:
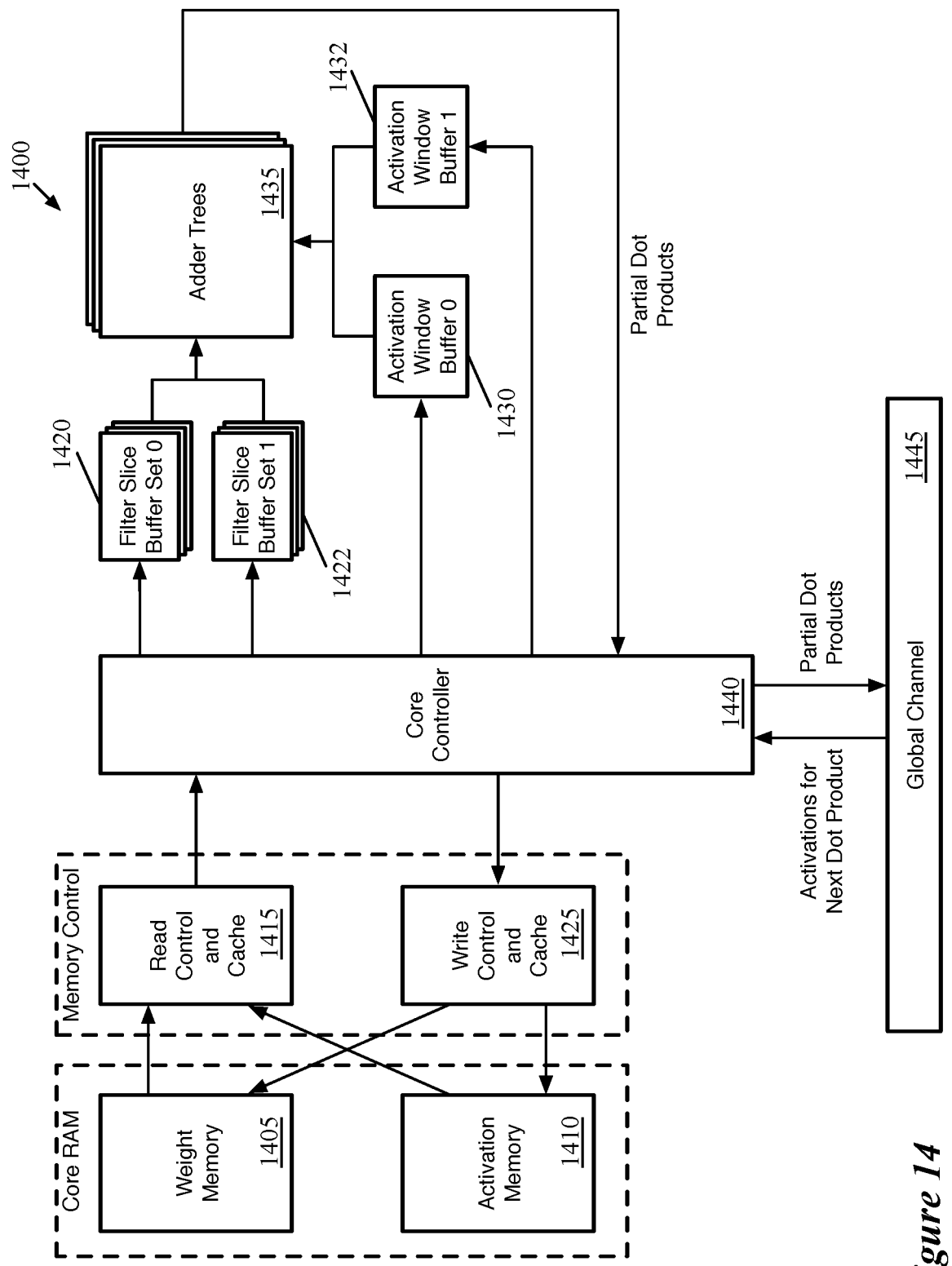
FIG. 14 conceptually illustrates the data flow within one of the cores of some embodiments for a dot product computation.

As mentioned, the dot product cores perform the majority of the dot product computation of the chip fabric of some embodiments. FIG. 14 conceptually illustrates the data flow 1400 within one of the cores of some embodiments for a dot product computation. This data flow will be described with certain specifics (e.g., weight and activation data sizes, number of separate adder trees simultaneously computing partial dot products, etc.) as examples, but it should be understood that different embodiments may use different sizes for weight data and/or activation values, different numbers of adder trees within a core, etc.

In some embodiments, the dot product cores store weight data values (e.g., weights for multiple nodes in multiple layers) in the weight memory 1405 and activation values in the activation memory 1410. In some embodiments, as shown, these memories 1405 and 1410 are part of a single block of memory for the core (e.g., banks of random access memories such as SRAMs). In addition to storing weight and activation values, in some embodiments the microprocessor of the IC can use the memories in the cores as overflow memory (e.g., to store an image before the image is processed and provided as input to the neural network fabric). The manner in which the weight data and activation values are stored in some embodiments is described in detail below by reference to FIGS. 17-19.

The weight values are part of the network parameters and thus are determined at compile time (and do not change at runtime), while the activation values (the input values to a particular node or set of nodes being computed) are the output values from a previous computation (or, for the first layer, are otherwise based on the network input) and thus are determined at runtime. Thus, the weight memory 1405 is typically larger than the activation memory 1410 (e.g., 512 KB to 64 KB), as the activation memory is at least party overwritten for each new layer of the neural network while the weight memory 1405 stores the weights for all of the dot product computations performed by the core. In some embodiments, the weights are stored as 1-bit or 2-bit values (e.g., all values stored as 2-bit values, or zeros stored as a single bit and negative/positive values stored as 2-bit 1/−1). In other embodiments, the weights are encoded in such a manner that less than 1 bit of the weight memory 1405 is allocated per weight value (e.g., by encoding the weight values in such a way that many of the zeros are removed, while storing additional data for each non-zero weight value).

The read controller and read cache 1415 reads data from the weight memory 1405 into sets of filter slice buffers 1420 and 1422 that store the weight data to be used in the dot products. In some embodiments, as mentioned, a filter is a set of weights that is used to compute a dot product with a set of inputs (e.g., in order to identify a specific feature type within a portion of an image). Depending on the number of channels of the activation inputs, filters may be divided into multiple slices. Each filter, in some embodiments, is used repeatedly to compute dot products with numerous activation windows (e.g., contiguous sets of activation inputs). Some embodiments load data for 36 (or 40) weight values into each filter slice buffer, which are actually used to compute 144 dot product components (with the requirement that at least 75% of the weight values be zero, the actual adder tree only receives 36-40 inputs for each buffer of 144 activation values, as described in detail below).

Some embodiments include both primary filter slice buffers 1420 and secondary filter slice buffers 1422, as shown in this figure. In a given clock cycle, at most one of these sets of filter slice buffers is used to compute dot products (e.g., using multiplexers to select only one of the sets of weight value data). For simpler dot product computations, only the primary filter slice buffer 1420 is needed, so there is no need to load weight values into the secondary filter slice buffers 1422. However, in other cases, both sets of filter slice buffers may be used, as described below (e.g., when dot products are too large to be computed in a single clock cycle using only the primary buffers).

The read control and cache 1415 also reads data (input values) from the activation memory 1410 into the activation window buffers 1430 and 1432. In addition, the read controller 1415 arranges the input values within the activation window buffers 1430 and 1432 in some embodiments to match up with the weight values in the filters. In some embodiments, the input values in an activation window read into the buffers 1430 (and 1432) include all of the values (as opposed to the 25% of the values needed for a particular filter), because the activation window is multiplied by numerous filters simultaneously (i.e., some or all of the filters stored in the filter slice buffers). The input values, in some embodiments, are quantized to have a fixed size (e.g., 4 bits), or set of fixed sizes (e.g., 4 bits or 8 bits) for ease and simplicity of computation.

As with the sets of filter slice buffers, some embodiments include both a primary activation window buffer 1430 and a secondary activation window buffer 1432. In a given clock cycle, at most one of these sets of activation window buffers is used to compute dot products (e.g., using multiplexers to select only one of the sets of activation input values). For simpler dot product computations, only the primary activation window buffer 1420 is needed, so there is no need to load activation inputs into the secondary activation window buffer 1422. However, in other cases, both activation window buffers may be used (e.g., when dot products are too large to be computed in a single clock cycle using only the primary buffers). In some embodiments, as shown, the same read controller and cache 1415 is used to read data from both the weight memory partition 1405 and the activation memory partition 1410. In such embodiments, the cache is used to store weight value data when reading the weights from the weight memory 1405. For each pass, this memory control circuit first reads the encoded weight data and provides this data to the core controller 1440 (which decodes weight data and loads the decoded weight data into the filter slice buffers), then reads input values and provides these values to the core controller 1440 (for the core controller to load the input values into the activation window buffer(s) interspersed with the computation of dot products by the adder tree circuits 1445).

The adder trees 1445 compute the dot products between the weight values represented in the filter slice buffers 1420 and the input values in the activation window buffer 1430. The details of these partial dot product computation circuits of some embodiments are described below by reference to FIG. 15. These adder trees 1445 output partial dot products (e.g., 10-bit values) that are provided to the dot product bus, which combines the partial dot products with other partial dot products as described above. In some embodiments, the number of filter slice buffers in each of the sets 1420 and 1422 is equal to the number of adder trees 1435 in the core, as well as the number of dot product bus lanes, post-processing units, and activation write bus lanes in each segment. Thus, for a typical neural network computation node, the partial dot products computed by the adder trees 1435 in multiple cores having a particular index are aggregated by the dot product bus lane with the same index, that aggregated dot product is provided for post-processing to one of the post-processing units with the same index (i.e., the post-processing unit with that index in one of the channel segments), and the output of the post-processing unit is transported by the activation write bus with the same index) to its destination core.

The core controller 1440 configures and coordinates the operation of the read and write controllers 1415 and 1425 in addition to the filter slice buffers 1420, activation window buffer 1430, and adder trees 1435. Furthermore, the core controller 1440 receives the input activations and weights from the read controller 1415, and loads them into the correct slots in the sets of filter slice buffers 1420 and 1422 and the activation window buffers 1430 and 1432 (or directs them to the ALU bus for non-dot product computations). Lastly, when the adder trees 1435 output their partial dot product values, the core controller 1440 sends these values to the dot product bus in the global channel 1445. When the activations for the next layer are output, the activation write bus carries these values to the core controller 1440, which provides them to the write control and cache 1425 to be written to activation memory 1410. The operations of the write controller 1425 and its cache are described below by reference to FIGS. 20-24.

To reduce the circuit area and power required for dot product computations (which use the majority of resources for neural network inference), the partial dot product computation circuits (e.g., the adder trees 1435) of some embodiments map each of a first number of input values to a second number (e.g., 25% of the first number) of dot product inputs, such that each dot product input only receives at most one input value with a non-zero corresponding weight value. Specifically, in some embodiments, the partial dot product computation circuit includes at least two sets of wires for each input (activation) value, with each of the sets of wires for a given input value connected to at least two different dot product inputs (so that each input value can be provided to at least two different inputs). With a guarantee of at least 75% weight sparsity (i.e., at least 75% of the weight values for any set of input values are zero), the number of dot product inputs is set at 25% (or slightly more than 25%, for redundancy) of the number of input values loaded in an activation window for the dot product computation circuit. In some embodiments, the weight sparsity is guaranteed by the training algorithm used to train the weights to perform a specific purpose, and the IC is adaptable for any set of weights that meets the guarantee.

Figure 15:
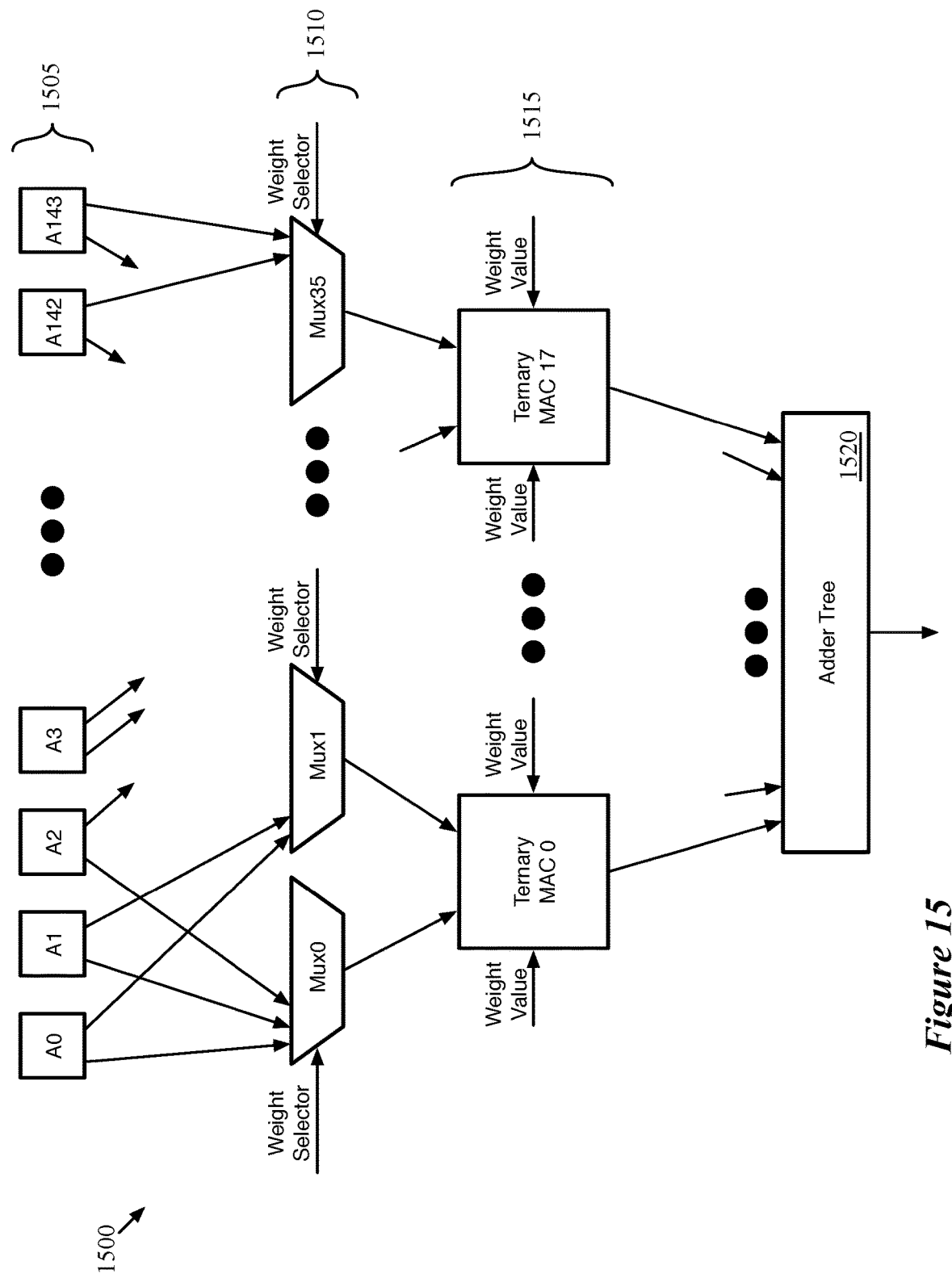
FIG. 15 conceptually illustrates an example of a partial dot product computation circuit for a guaranteed weight sparsity of at least 75%.

FIG. 15 conceptually illustrates an example of such a partial dot product computation circuit 1500 for a guaranteed weight sparsity of at least 75%. The wiring of the input values for this dot product computation circuit is designed to optimize the likelihood that, so long as the weights meet the sparsity requirement, the compiler can ensure that at runtime each input value with a nonzero corresponding weight value is provided to a different dot product input for nearly any arrangement of the nonzero weight values. As shown, the dot product computation circuit 1500 includes a set of activation inputs 1505, a set of multiplexers 1510, a set of ternary multiplier-accumulator (MAC) circuits 1515, and an adder tree 1520.

In this example, the dot product computation circuit 1500 includes 144 input values 1505. In different embodiments, the activation window buffer may have different sizes, which defines the size of the partial dot product computation. Each input value storage (e.g., each location in the activation window buffer) is connected to two of the thirty-six multiplexers 1510. In this example, at least 75% sparsity is assumed for each set of weight values, and thus the 144 activation inputs can be reduced to 36 inputs for the actual dot product computation. This significantly reduces the circuit area required for the dot product computation, as the number of adders is reduced by 75% (the adder tree effectively starts with 36 values rather than 144 values), in addition to reducing the amount of weight data that is stored in memory.

The multiplexers 1510 each have eight inputs and receive a set of select bits (the weight selector input) from the core controller that specifies which of these eight inputs to pass to the dot product computation. In some embodiments the weight selector input is a 3-bit value that is stored as part of the weight data for each non-zero weight. Having thirty-six 8-input multiplexers 1510 allows for 288 sets of wires from the activation inputs 1505 to the multiplexers 1510, which is two wires for each activation input. If the sparsity guarantee was only 50%, then seventy-two 4-input multiplexers could be used with two sets of wires for each activation input 1505 (or seventy-two 8-input multiplexers with four sets of wires for each activation input 1505), with similar proportions for different sparsity guarantees and numbers of wires per activation input.

The wire sets from the activation inputs to the multiplexers are arranged such that the compiler can verify that each input value with a nonzero corresponding weight is provided to a different one of the multiplexers 1510. The weight values are not known at the time of IC manufacture, and thus the wiring design is resilient to different arrangements of the nonzero weight values (that meet the sparsity requirement). Some embodiments use a cuckoo hashing algorithm (or other algorithm) to optimally map the wire sets from the activation inputs 1505 to the multiplexers 1510. In some embodiments, this algorithm computes two hashes (e.g., with two different hash functions) for each of the activation input locations 1505 that map to two different multiplexers 1510 (e.g., by computing the hash modulo 36). Each activation input location 1505 is wired to these two different multiplexers 1510 determined by the hashes. If one of the hash functions maps an activation input to a multiplexer that already has eight inputs, then some embodiments compute a third hash function for either that activation input or one of the activation inputs previously mapped to the multiplexer.

Other embodiments use other techniques to select the multiplexers to which each input value is wired, so long as each input is wired to two different multiplexers (and thus each multiplexer has input wires from eight different activation inputs). Additional constraints may be imposed as well, such as ensuring that no more than a specified maximum number of activation inputs are wired to the same pair of multiplexers. In addition, it should be understood that these techniques can be applied to dot product computation circuits with different numbers of inputs, different numbers of multiplexers, and different numbers of wires per input.

The weight values are known before the network is executed by the IC (i.e., at compile time), and thus the compiler can determine which of the two multiplexers that receive each input value with a non-zero corresponding weight at runtime will select that input value, such that each input value is selected by a different multiplexer (and only one multiplexer). In some embodiments, the compiler uses the same cuckoo hashing or other algorithm as was used for the wires. The select bits for the multiplexers 1510 are determined by which of the inputs to the multiplexer carries an input activation value with a nonzero corresponding weight value, and are received from the filter slice buffer. As described further below, these multiplexer select bits are stored for each non-zero weight value (for multiplexers that do not receive any inputs corresponding to non-zero weights, the multiplexer select bits do not matter, and thus do not need to be stored in the encoded weight data). These multiplexers 1510 provide their output to a set of ternary multiply-accumulator (MAC) circuits 1515. The ternary MAC circuits effectively form the leaves of the dot product computation, and the number of such circuits is half the number of multiplexers 1510 (18 ternary MAC circuits 1515 in this example).

In some embodiments, the weight values for a particular dot product computation are all either zero, a positive value, or the negation of the positive value in some embodiments. In this case, the dot product does not require any actual multiplication at the leaves of the computation, as the positive and negative weight values can be treated as 1 and −1, with a single multiplication by the positive value afterwards. Removing the multiplication at the leaves saves significant circuit area for a chip with numerous such computation circuits.

To combine the two input values while accounting for the ternary weight values, the ternary MAC circuits 1515 add the two input values from the multiplexers 1510 while also receiving as inputs the corresponding weight data for these input values. In some embodiments, as described further below, the ternary MAC receives two bits of weight data for each of its inputs. If both of the weights are positive, then the ternary MAC outputs the sum of the two input values (and outputs the negative of this sum if both of the weights are negative). If only one of the weight values is negative, then its corresponding input value is subtracted from the other input value (with a positive corresponding weight value), and if both of the weight values are zero, then the ternary MAC output is zero. Lastly, if only one of the weight values is zero, then the ternary MAC outputs the input value (or the negative of the input value) with the corresponding nonzero weight value. The negative values are accounted for in the bias computation within the post-processing unit, as described above.

The outputs of the ternary MACs provide the inputs to the adder tree 1520 that computes the output for the partial dot product computation. In some embodiments, this adder tree is a standard adder tree circuit that adds pairs of values over several layers. For example, the adder tree 1520 receives 18 inputs for 9 adders, which in turn provide outputs to 4 adders (with an additional output to be added in later), etc. In some embodiments, the inputs to the ternary MACs 1515 are 4-bit inputs (the length of the quantized activation values), and the ternary MACs 1515 output 6-bit values. The adder tree 1520 receives these 6-bit values and outputs a 10-bit value after several stages of addition. It should be noted that this description refers to handling of signed 4-bit input values. Some embodiments can also handle unsigned input values by converting them to signed input values before performing the addition operations. For example, some embodiments output and store 4-bit outputs, which can be signed or unsigned. Before performing the addition operations, an additional bit is added that either sign-extends (to convert signed 4-bit inputs to signed 5-bit inputs) or 0-pads (to convert unsigned 4-bit inputs to signed 5-bit inputs).

While this diagram shows the wires (or some of the wires) connecting each of the input values 1505 to a single partial dot product computation circuit, in some embodiments each of these input values 1505 in the activation window buffer is actually connected to each of the partial dot product computation circuits in the core. That is, for the case with 64 such circuits, each value in the activation slice register is carried by 128 total wires to 128 multiplexers (two for each of the partial dot product computation circuits). In some embodiments, the wiring arrangement is the same for each set of multiplexers (i.e., for each partial dot product computation circuit).

As mentioned, for redundancy, some embodiments use a number of dot product inputs (i.e., multiplexers) that is slightly more than required by the sparsity guarantee for the dot product computation. For instance, in the example above, rather than using 36 inputs (exactly 25% of the 144 input values), some embodiments use 38 or 40 inputs. In this case, some of the activations 1505 are mapped to three of the multiplexers 1510, rather than two.

Figure 16:
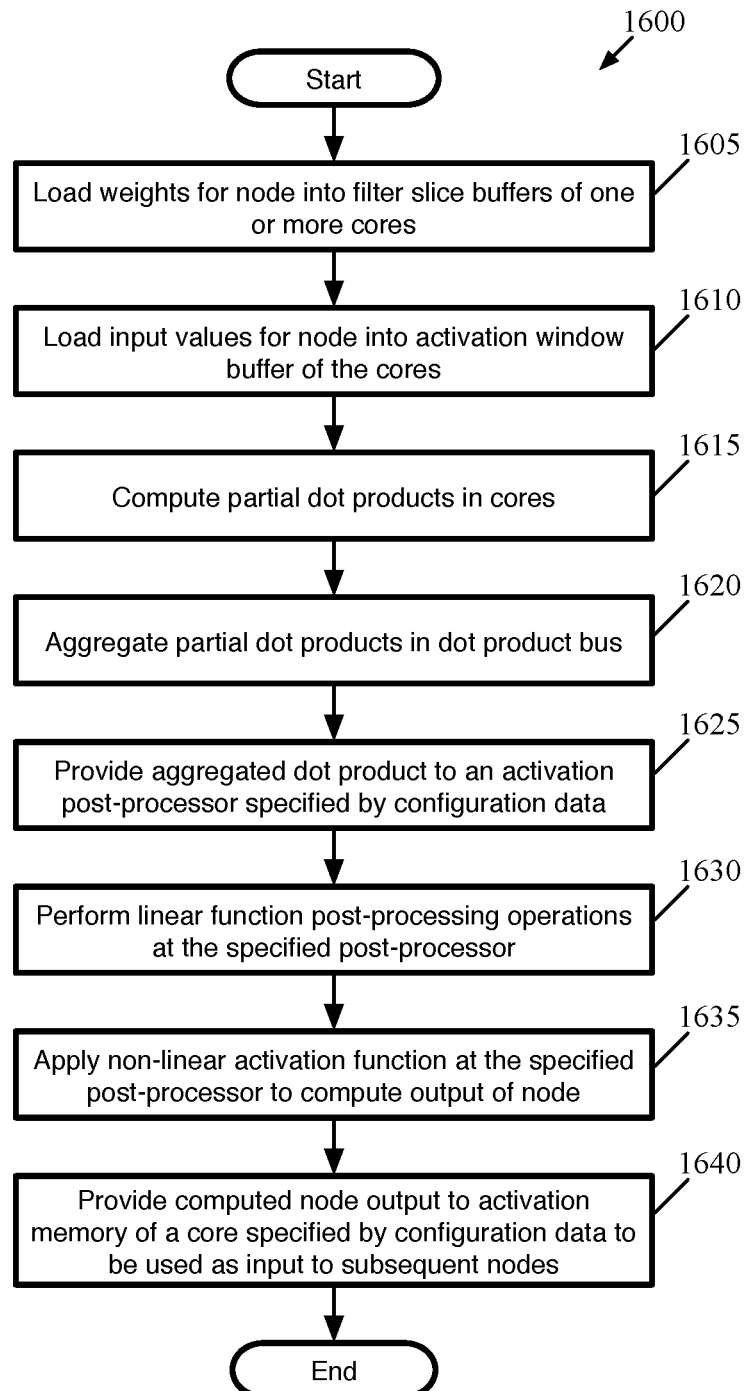
FIG. 16 conceptually illustrates a process of some embodiments for executing a set of instructions (or a portion of a set of instructions) to compute the output of a neural network node.

FIG. 16 conceptually illustrates a process 1600 of some embodiments for executing a set of instructions (or a portion of a set of instructions) to compute the output of a neural network node (specifically, a convolutional or fully-connected node). The process 1600 is executed by the chip fabric of a neural network IC, such as that described above. Typically, the process 1600 is executed simultaneously for multiple nodes, and operations 1610-1640 are performed repeatedly for multiple activation windows (i.e., multiple groups of input values loaded into the activation window buffer) in order to completely execute a layer (or portion of a layer) of the neural network. In the case of the process 1600, the dot product can be computed in a single cycle and does not involve any split filter slices (i.e., no time-multiplexing is required). Additional processes are described below for nodes that involve large dot products, larger input values, or split filters.

As shown, the process begins (at 1605) by loading the weights for a node into filter slice buffers of one or more cores. In addition, the process loads (at 1610) the input (activation) values for the node into the activation window buffer of these cores. In some embodiments, a set of input values are loaded into one activation window buffer in a core while the weight data for several nodes are loaded into several filter slice buffers of the core. Other embodiments load the weight data into the filter slice buffers first, then load the input values into the activation window buffer. Furthermore, some embodiments load the weight data once for a pass (that computes outputs for many activation nodes), then iteratively load sets of input values and compute dot products for numerous nodes without the need to re-load the weight data. In addition, the weights and activations for a node, in some embodiments, are divided among the filter slice and activation window buffers of all of the cores that are active for the current set of instructions. The storage of the weight and activation values and loading of these values into the filter slice buffer and activation window buffer, respectively, are also described in greater detail below.

The process 1600 then computes (at 1615) partial dot products in the cores. As described above, the activation values loaded into the activation window buffers in each of the active cores are multiplied by their corresponding weight values loaded into the filter slice buffers of these cores. In some embodiments, the size of the partial dot products is reduced using the wiring structure shown in FIG. 15, and with ternary weight values of {0, 1, −1}, the multiplication is handled by the ternary MAC circuits shown in this figure.

Next, the process aggregates (at 1620) these partial dot products in the dot product bus. In some embodiments, the partial dot products for a particular node are calculated by the adder tree with the same index (i.e., out of several adder trees) in each of the active cores, and thus these partial dot products are all passed to the same corresponding lane of the dot product bus (which has one lane for each of the adder trees in a core). In some embodiments, the final aggregation is performed by the dot product bus lane in the channel segment of the post-processor selected for the particular node.

The process 1600 then provides (at 1625) the aggregated dot product to an activation post-processor specified by configuration data. This configuration data, in some embodiments, is generated by a compiler and parsed by the hierarchical controller circuits of the neural network chip fabric, and indicates which channel segment will perform the post-processing. Each of the channel segments has an equal number of post-processing units, and the post-processing unit in the selected channel that corresponds to the dot product bus lane that aggregates the dot product is the post-processing unit that receives the aggregated dot product.

At the post-processing unit that receives the aggregated dot product, the process 1600 performs (at 1630) linear function post-processing operations. For all dot products, this includes the bias and scale operations described by reference to FIG. 10 above, with the values for these operations sent as configuration data from the cluster controller. In addition, as described below, certain dot products are aggregated over multiple cycles by the dot product input processing circuit (e.g., if time-multiplexing is required to handle dot products with a large number of components, or for dot products with double the standard number of bits).

Next, the process 1600 applies (at 1635) the non-linear activation function at the post-processing unit to complete the calculation of the node output value. In some embodiments, as shown in FIG. 10, a lookup table is used for this computation (e.g., a 5-bit to 4-bit mapping table). The mapping for each possible set of input bits is provided by configuration data from the cluster controller in some embodiments.

In some embodiments, the operations 1615-1635 are executed to compute the node output without storing the any intermediate values in memory. That is, none of the partial dot products are stored in any memories (e.g., RAM) during the computation within the core, and the same is true before and during the aggregation within the dot product bus. In some embodiments, a register is used to aggregate multiple dot product bus inputs over multiple cycles. However, in a standard case (e.g., for 4-bit dot products), this register passes the dot product input through and the entire set of operations 1615-1635 is executed in a single clock cycle.

Finally, the process 1600 provides the computed node output to the activation memory of one (or more) of the cores as specified by the configuration data, so that this output can be used as the input to a subsequent set of neural network nodes. In some embodiments, the node output value is carried to the specified core by the activation write bus, with the core index for the value specified by the cluster controller(s). As described below, once at the specified core, the node output value may be temporarily stored in a write cache until the write cache is full and the data is written to the core memory.

As mentioned, the process 1600 illustrates the most simplistic case for computing a dot product. For this simplest type of dot product computation, the neural network computation circuit of some embodiments places the following restrictions on the computation: (i) all of the input values should be of the specified discrete size (e.g., 4 bits), (ii) the maximum number of input values is the size of the input buffer multiplied by the number of cores (e.g., 144 inputs×16 cores=2304 total input values), (iii) all of the weight values are either 0, +α, or −α (and thus can be stored as 0, 1, and −1), and a large enough percentage of the weight values are 0 that the input values with non-zero weight values can each map to a different multiplexer input. Solutions for handling the cases when these requirements are not met are described in greater detail below.

As mentioned above by reference to FIG. 14, each core includes a block of memory to store the weight data and activation values used by the core to compute dot products (i.e., the activation values that are loaded into the activation window buffer and the weight data that is loaded into the filter slice buffers). In some embodiments, each core is allocated the same amount of memory in total, which is divided between weight memory and activation memory for a particular network by the compiler that designs the program for the inference circuit to execute the network. Some embodiments require that each core be divided between weight memory and activation memory in the same manner (i.e., the allocation of weight/activation memory to each core is the same for all of the cores), while other embodiments allow for different allocations between the cores. For example, in some embodiments the allocation is the same for each core within a cluster, but can vary between cores in different clusters (e.g., if a subset of cores are used for a majority of the layers of the network, then that subset of cores might need more of its memory allocated to weight data storage.

Within a core, the weight memory and activation memory partitions are themselves subdivided between layers of the network. As described above, all of the weight data used by a core is stored in the memory of that core at bootup time, because these values are the same for every input provided to the network. On the other hand, the activation values are determined at runtime (and occupy more memory per value than the weight data), so the cores do not store all of the activation values at a time. Depending on the type of network, only two layers of activations may need to be stored at once (the input activation values for the current layer being executed as well as the output activation values for that layer). In this case, once layer L is being executed (using the layer L activations as inputs and outputting the layer L+1 activations), the circuit can overwrite the layer L−1 activations. On the other hand, if a network has residual connections (i.e., the output activations from layer L are used as inputs for more than just layer L+1), then more than two layers of activations may need to be stored at once.

Figure 17:
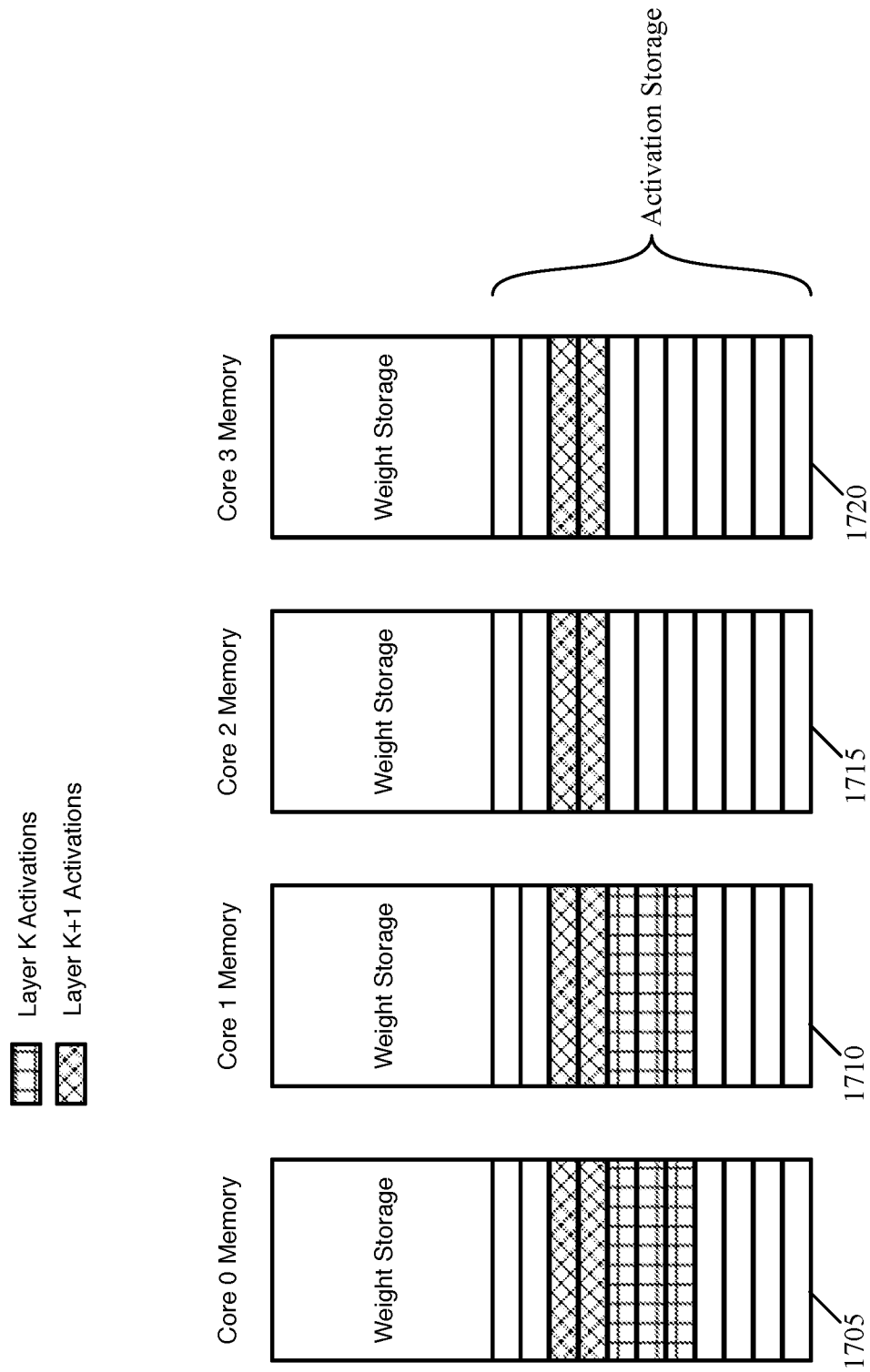
FIG. 17 conceptually illustrates the assignment of layers of activations to memories of four cores within a cluster.

FIG. 17 conceptually illustrates the assignment of layers of activations to memories 1705-1720 of four cores within a cluster. In this example, each of the cores is partitioned into weight storage (shown in the figure as a single block) as well as activation storage (shown as blocks of memory). Each of the blocks within the activation storage represents a set of memory locations (e.g., RAM words) in some embodiments. Though the figure shows a small number of such blocks within each core memory 1705-1720, it should be understood that a typical neural network computation circuit will have thousands of RAM words per memory. In addition, although the activation partition is larger than the weight partition in these examples, the weight partition will often be the larger partition because all of the weight values are stored in the memories at boot time.

The figure illustrates (using different types of cross-hatching) the memory portions allocated to the activation values (i.e., input activations) for each of two layers (layer K and layer K+1). In this example, the activations for layer K are divided across the memories 1705 and 1710 for two of the cores (meaning that only these two cores participate in the dot product calculations for this layer), whereas the activations for layer K+1 are divided across the memories 1705-1720 for all four illustrated cores. For each of the layers, the first RAM word storing activations for that layer is aligned to the same memory address (i.e., the first activation for the layer stored in each core starts at an equivalent memory location within the respective core). In addition, the first activation for a layer starts at the beginning of a RAM word (i.e., the least significant bit in the word) in some embodiments.

In some embodiments, the activation values for a layer are divided evenly among the cores storing the activations for that layer (or as close to evenly as possible). Some embodiments require that the number of cores for a layer is a multiple of the number of cores in a cluster (e.g., a multiple of four for the chip fabric shown above in FIG. 5). Other embodiments simply impose the requirement that the number of two-dimensional activation grids assigned to each core is equal (or as close to equal as possible). Referring to the three-dimensional structure of a layer of activations shown in FIG. 2, each two-dimensional grid of activations is assigned entirely to a single core. As such, if the number of activation grids is not evenly divisible by the number of cores to which those activations are assigned, then some of the cores will be assigned more of the actual activation values than other cores. However, some embodiments assign zero-grids (i.e., grids of activation values equal to zero) to make up the difference and even out the number of activations in each core for the layer. In other embodiments, rather than specifically ensuring the activation values are all zero (which would require generating one or more extra activation value grids of zeros and loading these values into the RAM each time the network is executed), the compiler ensures that the corresponding weight values stored in the weight memory are all zero, such that the data used for these activation value grids does not matter).

In addition, as shown in FIG. 17, all of the activation values for a layer are assigned to a contiguous block of each core's memory. As described further below, in certain cases, a portion of a RAM word may be zero-padded (or left with unverified data that is not used in the computations for the layer) within this contiguous block of memory.

Figure 18:
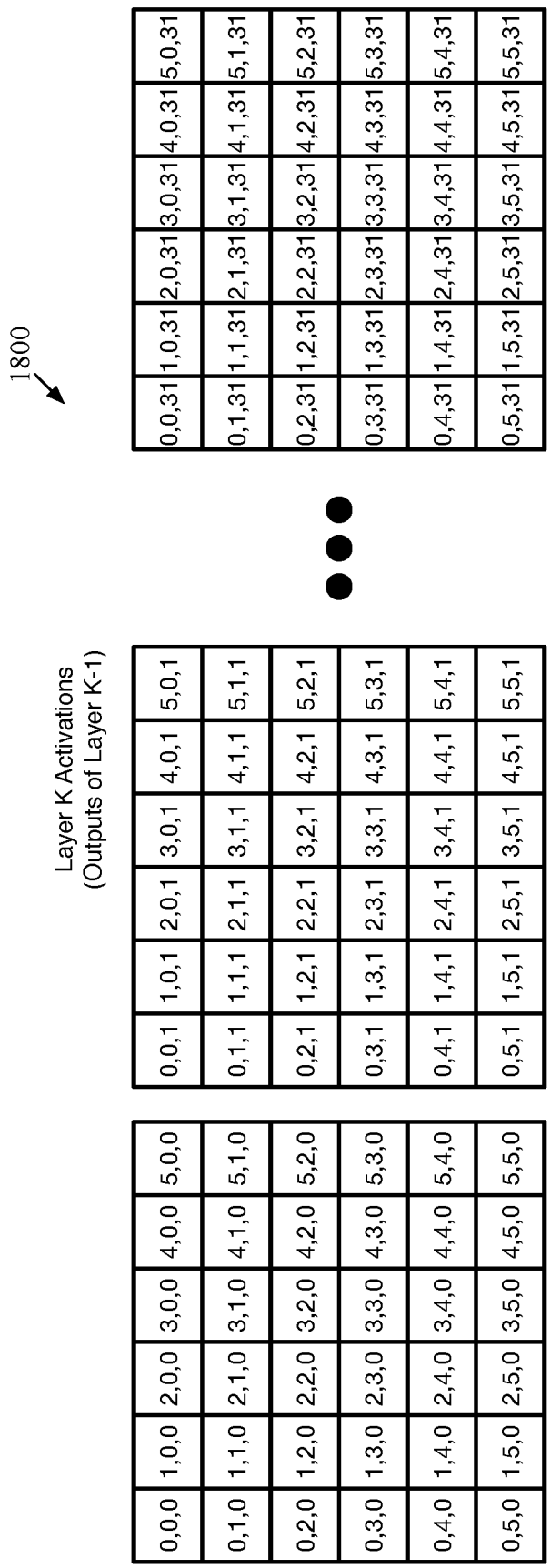
FIG. 18 conceptually illustrates a layer of activation values.
Figure 19:
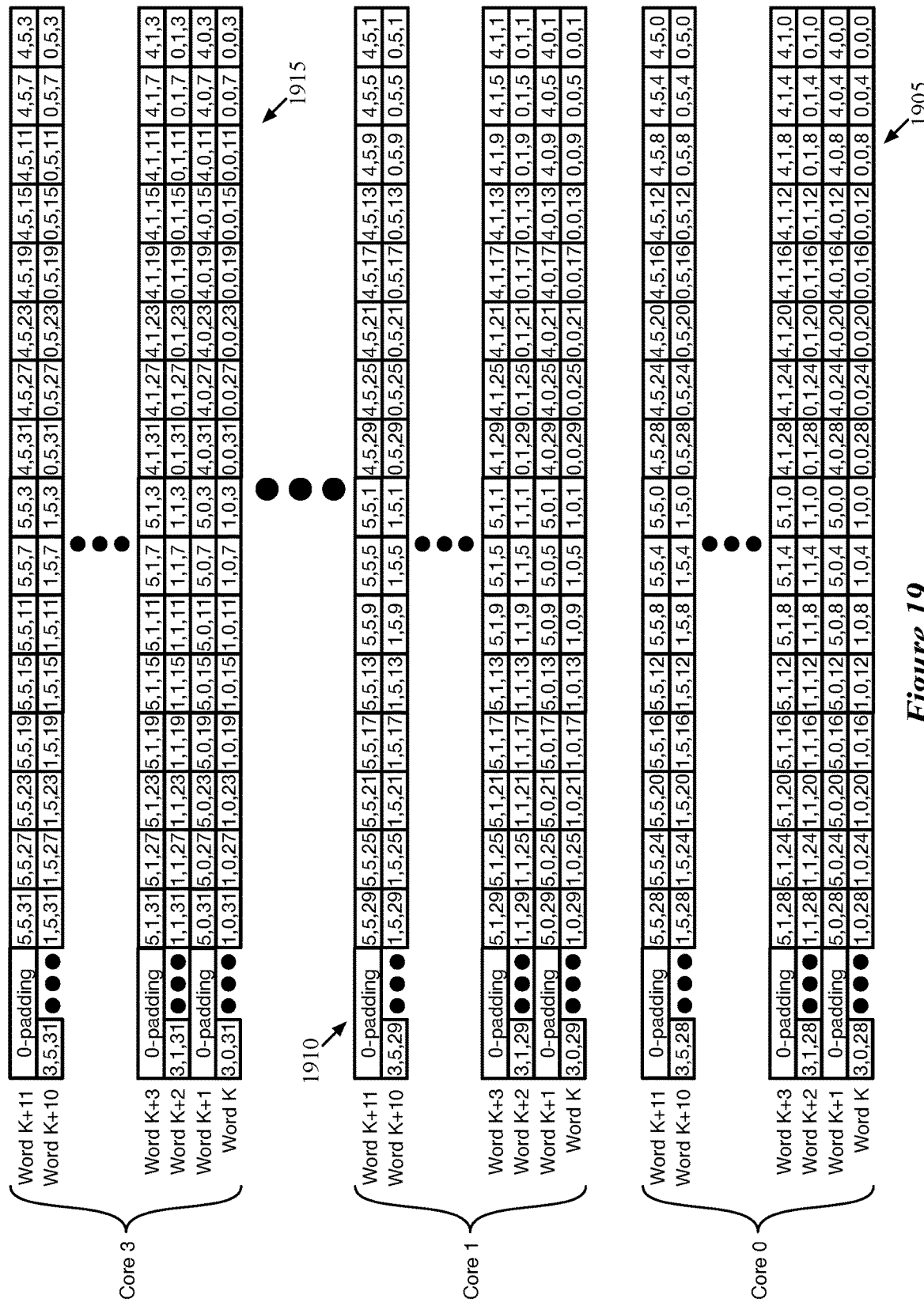
FIG. 19 conceptually illustrates the arrangement of the activation values of FIG. 18 among the memory of four cores.

FIG. 18 conceptually illustrates a layer of activation values 1800, and FIG. 19 conceptually illustrates the arrangement of these activation values 1800 among the memory of four cores. As shown in FIG. 18, the layer K activation values are structured as a 6×6×32 layer (i.e., 32 6×6 grids, meaning that the previous layer most likely had 32 filters). Each activation value in the layer is labeled with a three-dimensional (x, y, z) coordinate. The x-coordinate refers to the column to which the activation belongs (0-5), the y-coordinate refers to the row to which the activation belongs (0-5), and the z-coordinate refers to the grid to which the activation belongs (0-31). Each of these activations will have different values depending on the input data provided to the network, but the activation value at a given coordinate will be stored in the same location in the core memories each time the network is executed.

FIG. 19, as mentioned, illustrates the arrangement of the activation values 1800 according to the activation storage rules of some embodiments. In this case, the compiler determined that the activation values 1800 of Layer K will be stored in four cores of the neural network computation fabric (Cores 0-3). The memories 1905-1915 of each of the cores include numerous banks of RAM in some embodiments, divided into words that can each be read from or written to individually. These words may have different lengths in different embodiments; in this example, the words are each 128 bits long. Thus, if the activation values are each 4-bit values (as is the case in some embodiments), then a single word can hold 32 activation values. When larger 8-bit activation values are used, then a single word holds 16 activation values. In the figure, each word is shown with the least significant bits on the right, which will be referred to as the "start" of the word. Thus, the rightmost 4 bits (least significant nibble) of each word holds the first activation value of the word. In addition, the words are ordered, with this example showing the first word in each core (or at least the first word for the illustrated layer of activation values) at the bottom of the diagram.

To optimize the use of the core memory as well as the efficiency with which the activation values are read from the core memory, some embodiments organize the activation values in the memory according to a set of defined rules (which are shown by way of example in FIG. 19). As mentioned, each two-dimensional grid of activation values is assigned entirely to a single core. In this example, grids {0, 4, 8, . . . 28} are assigned to Core 0, grids {1, 5, 9, . . . 29} are assigned to Core 1, grids {2, 6, 10, . . . 30} are assigned to Core 2, and grids {3, 7, 11, . . . 31} are assigned to Core 3. The compiler may use different algorithms to assign grids of activation values to different cores in some embodiments, so long as the grids are assigned evenly (or as close as possible to evenly) to the cores.

The activation values within a core are not necessarily arranged with all of the activation values of a grid stored contiguously. Instead, within each core, some embodiments store all of the activations for a particular coordinate (i.e., an x-y coordinate) within the grids assigned to that core in a contiguous block. For a typical convolution, all of the activation values at a particular (x,y) coordinate will be used for dot product computations at the same time, so storing these values contiguously helps minimize resources used (and latency) for loading the activation values when computing the dot products for a layer.

As shown, the activation memory for layer K in each core starts with the activations at (0,0) for all of the grids assigned to that core. In this case, eight grids of activation values are assigned to each of the four cores (the 32 grids are evenly divisible by 4, so no zero-grids are required). Thus, the first eight values of the first word in each core (designated as word K) are the activations with (x,y) coordinates of (0,0). In some embodiments, if there are more grids assigned to a core than the number of activation values that a memory location (i.e., a RAM word) can store, then these are split up into separate sets of activations, and only a single word worth of activation values at the same coordinate are stored contiguously. That is, if 35 grids of activation values were assigned to Core 0, then only the first 32 activation values would have coordinates of (0,0). Those first 32 grids would be stored as a contiguous block that iterates through each (x,y) coordinate, followed by the remaining 3 grids of activation values (stored in the same way, iterating through each (x,y) coordinate).

Within the memory 1905-1915 of each core, the first 8 activation values are those located at coordinate (0,0). Next, the algorithm for activation value storage moves to the activation values coordinate (1,0)—that is, the x-coordinate is incremented as the next value in the same row of each grid is stored. This proceeds until the end of the current row is reached (i.e., the activation values with coordinate (5,0)). In some embodiments, once the end of a row in the activation grids is reached, the remainder of the current RAM word is 0-padded. As shown in the figure, this means that the last half (64 bits, or 16 activations) of word K+1 (as well as words K+3, K+5, etc.) in each of the memories 1905-1915 is 0-padded (or padded with unverified data that is never loaded into the activation window buffer). This pattern (arranging the activation values in row-major order) is repeated for each row of activation values in the grids assigned to a given core.

When loading the activation values as inputs to dot product computation, upon reaching the end of a row of the activation grids, the core memory controller returns to the start of the next row, and the activation values from the end of the previous row are not reused. The use of 0-padding (rather than starting the next row of activation values in the same RAM word) avoids the need to read multiple words when starting a new row of convolutional layer computations (which would require additional clock cycles).

As a result of this activation storage algorithm, a given memory location in one source core for a layer will store activations for the same x-y coordinates as that memory location in any of the other source cores. For example, the tenth activation in RAM word K+1 of Core 0 is the activation for coordinate (5,0) in activation grid 4. Correspondingly, the tenth activation in RAM word K+1 of any of the other cores is also an activation for coordinate (5,0), in different activation grids.

The weight values are stored in a similar manner, in some embodiments, with certain differences. Just as activation values for a layer are divided across multiple cores (and, specifically, the activation values for each particular dot product in a layer are divided across the multiple cores), the weight values for each filter in a layer also divided across these same multiple cores. Over the course of a convolutional layer, a particular weight value in a filter is multiplied by numerous activation values, all of which are in the same activation grid. As such, each weight value is stored in the same core as the activation grid that contains the activations by which that weight value is multiplied. However, in some embodiments, the length of each filter slice may be different, even within a single layer, due to the different number of non-zero weight values. That is, even if a filter slice buffer always has 36 (or 40) weight values, the amount of memory required to store those weight values may differ depending on the number of non-zero weight values.

The above-described storage pattern of the input activation values for one layer, in some embodiments, influences the assignment of filters to different indices (i.e., partial dot product computation circuit, dot product bus lane, post-processing circuit, and output bus lane) for the previous layer. As indicated above, in some embodiments the activation write bus operates such that all of the output activation values (which are input activation values for a subsequent layer or layers) computed at a given time (i.e., in a given clock cycle) that are to be stored in a particular core should be computed by post-processing units having a contiguous range of indices. In the typical scenario (e.g., in which the filter slices do not need to be split across multiple partial dot product computation circuits), this means that all of the filters used to compute output activation values that will be stored in a particular core will be assigned by the compiler to a contiguous range of weight value buffers (and thus to a contiguous range of activation write bus lanes).

As described above by reference to FIGS. 11 and 12, in some embodiments the activation write bus is wired such that all lanes provide data to the shifters for all of the cores, but the core does not actually receive the output activation values from all activation write bus lanes. Instead, the core circuitry responsible for writing these output activation values into the core memory receives only the activation values designated for the core, aligned to the start of the input data by the shifter for the core.

Each of the cores, in some embodiments, includes write control circuitry that is responsible for writing the output activation values (received via the activation write bus) into the activation memory of the core. This write control circuitry in some embodiments is capable of writing to one memory location (e.g., one RAM word) in a given clock cycle. However, rather than instantly writing each set of received output activation values to their assigned location in memory as soon as the output values are received, some embodiments use a cache to store output values until an entire memory location (entire RAM word) can be written. This write cache, in some embodiments, is the same width as a memory location (e.g., 128 bits). Because the memory read/write operations are power-intensive (as compared to temporarily storing data in registers), only writing output values to their memory location when the entire memory location can be written saves significant power over the course of executing a neural network.

Figure 20:
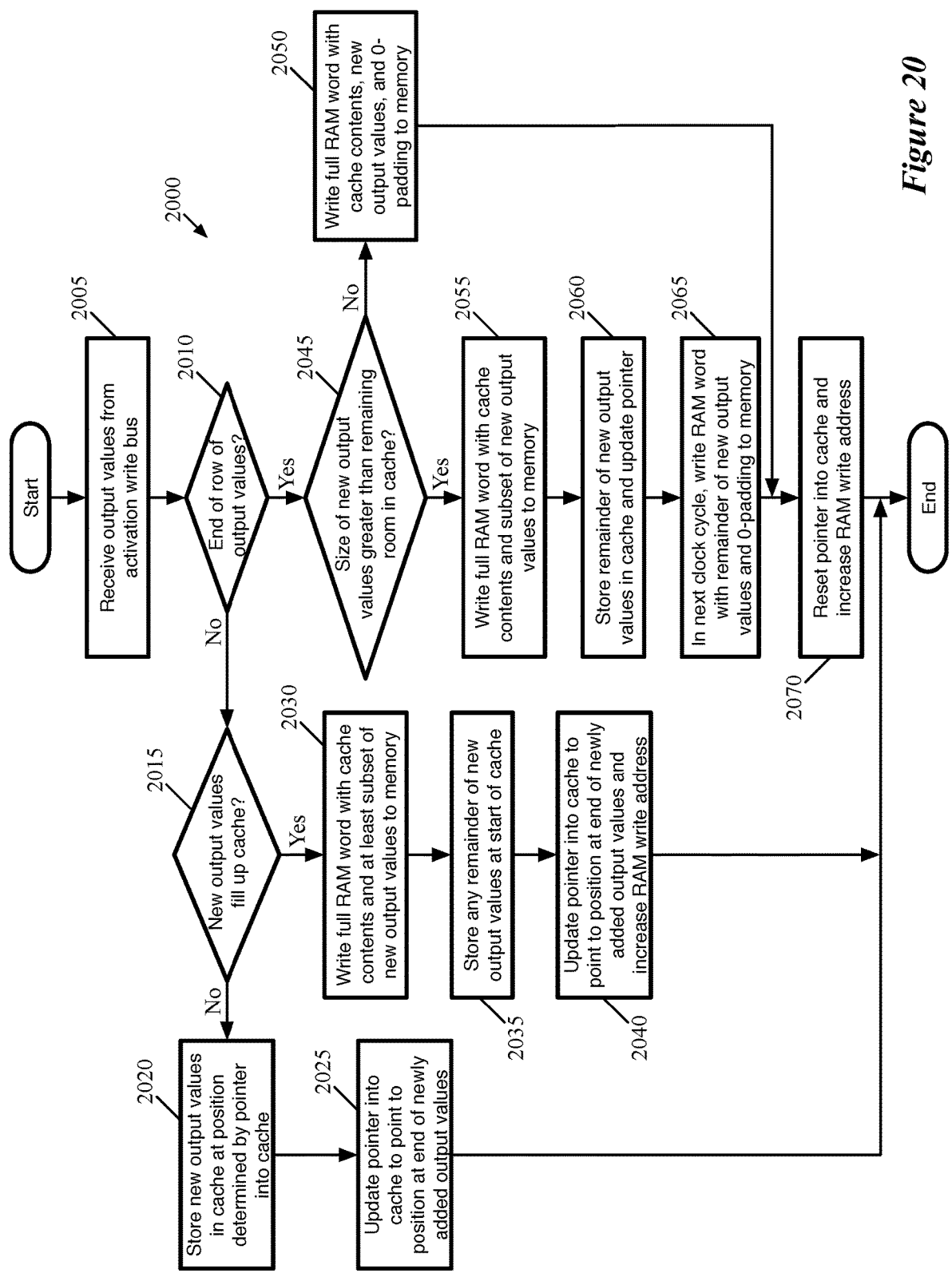
FIG. 20 conceptually illustrates a process of some embodiments for handling newly received output activation values from the activation write bus.

FIG. 20 conceptually illustrates a process 2000 of some embodiments for handling newly received output activation values from the activation write bus. In some embodiments, the process 2000 is performed by write control circuitry in each destination core of a current pass, each time output activation values are computed during that pass. For example, if a neural network layer has 100×100 output activation grids that are stored across eight different cores, then the write control circuitry in each of these eight cores performs the process 2000 (or a similar process) 10,000 times during a pass for that particular layer. The process 2000 will be described in part by reference to FIGS. 21-24, which illustrate the write control circuitry receiving newly computed output activation values in different scenarios.

As shown, the process 2000 begins by receiving (at 2005) output values from the activation write bus. In different examples, the output values could be activation values for a convolutional layer, outputs of an element-wise addition or multiplication layer, consolidated outputs from a pooling layer, etc. The received output values in some embodiments would already have been aligned by the shifter of the activation write bus for the core performing process 2000. Of note, though not shown in this flow chart, if the received output values in a clock cycle are equal in width to a RAM word (i.e., the core is receiving the maximum number of output values allowed), some embodiments directly write the output values to the next RAM word without caching the data at all. In this case, the majority of the write control circuitry (i.e., the write cache and its control circuits) is bypassed, and the process 2000 is not performed.

The process 2000 determines (at 2010) whether the received output values are the end of a row of output values. As shown in FIG. 19, when the end of a row of activations is reached, the remainder of the RAM word that stores those activation values is 0-padded (e.g., the word K+1 in each of the cores illustrated in that figure). Thus, rather than waiting for the cache to completely fill up, some embodiments write any data in the cache already along with the newly received output values to the next RAM word in the core memory, while 0-padding the output if necessary. In some embodiments, the write control circuitry receives a control signal that indicates when the end of a row is reached. In some embodiments, the write control circuitry receives, in each clock cycle, an opcode from the core controller that specifies one of (i) not writing any data because no output values are received that cycle, (ii) a standard write operation that only causes a write to memory if the cache fills up, or (iii) a padded write operation that specifies to write all data in the cache as well as the newly received output values to memory. If the padded write opcode is received, this is indicative of the end of the row of outputs being reached, while if the end of the row is not reached then the standard write opcode is received.

If the end of a row is not reached (e.g., the standard write opcode is received by the write control circuitry), then the process 2000 determines (at 2015) whether the newly received output values cause the cache to fill up. In some embodiments, the write control circuit includes registers for storing (i) a RAM word width of output value data (e.g., 128 bits) and (ii) a pointer that indicates the cache location at which the next set of output value data should start. In some embodiments, this pointer is a value that includes a lower set of bits indicating the cache location for the next set of output values and an upper set of bits indicating the next RAM word to which to write data from the cache (or an offset from a fixed RAM word address). When the number of new output values added to the pointer location in the cache, this indicates that the new output values cause the cache to fill up. Because, for a given pass, the number of output values received for each set of computations is the same, a value indicating this number is received by the write control circuitry along with each set of output values as configuration data. The write control circuit adds this configuration value to the current pointer and, if the value causes the cache pointer to increase past the cache size (i.e., causing the lower set of bits of the pointer to roll over and increase the upper set of bits), write the data to memory.

If the newly received output values do not cause the cache to fill up, the process 2000 stores (at 2020) the new output values in the cache at the position determined by the pointer into the cache. In addition, the process updates (at 2025) the pointer into the cache to point to the position in the cache at the end of the newly added output values. As mentioned, some embodiments modify the cache pointer by adding the configuration value for the number of output values received to the previously stored cache pointer.

Figure 21:
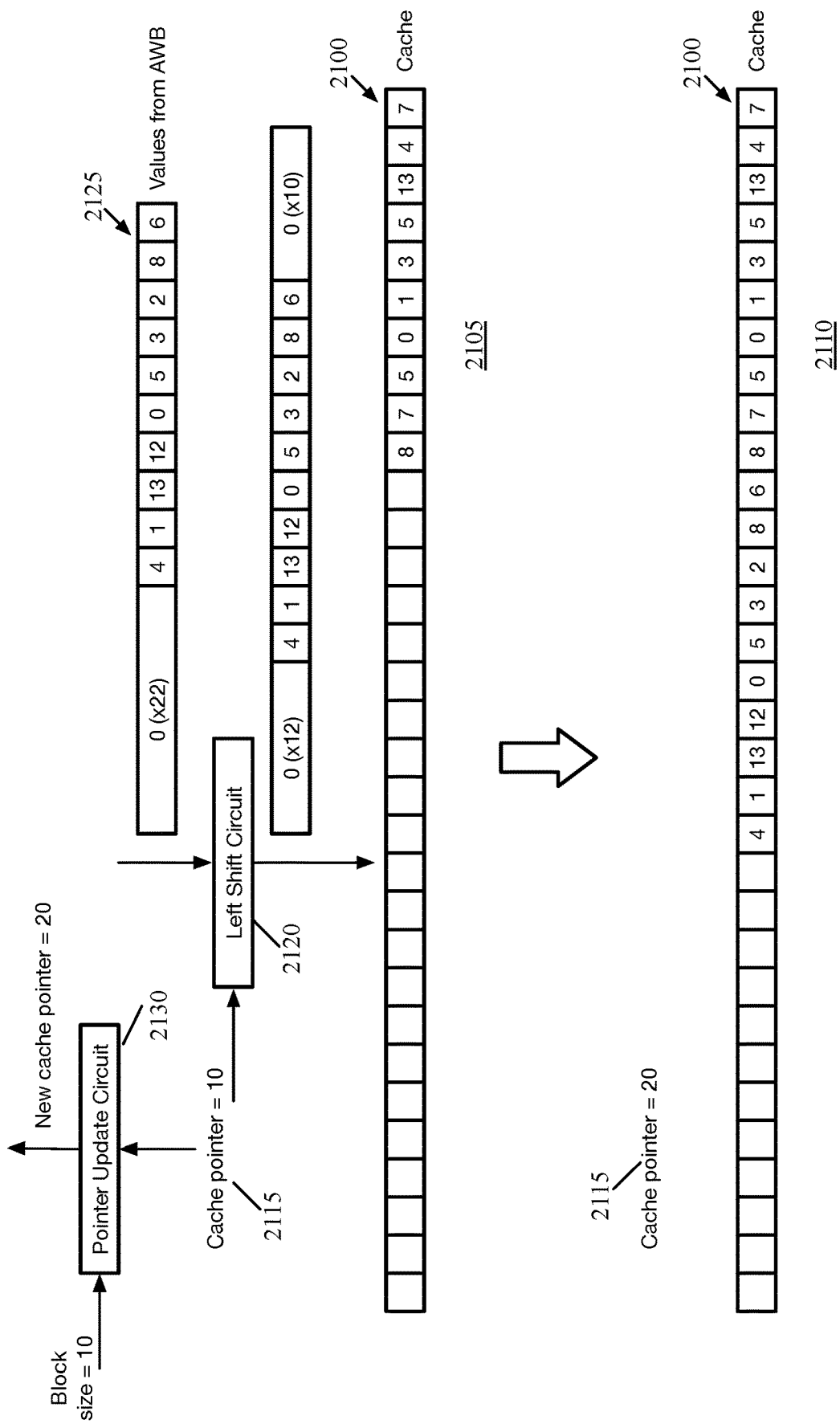
FIG. 21 illustrates an example of operations to add new output values to the cache and update the cache pointer when the newly received output values do not fill up the cache.

FIG. 21 illustrates an example of these operations to add new output values to the cache and update the cache pointer when the newly received output values do not fill up the cache, over two stages 2105-2110. The first stage 2105 illustrates the cache 2100 and the cache pointer 2115, which in some embodiments are both registers storing data for the write control circuit. In this and subsequent examples, each output value is shown as a 4-bit nibble, such that the cache includes 32 nibbles. Similarly, the values received from the activation write buffer also include 32 nibbles, though these examples show the non-valid (zeroed out) sections of this data in compressed form.

As shown in the first stage 2105, the cache begins the clock cycle with 10 values of valid (not yet written to memory) data, and as such the cache pointer 2115 is set to the value 10. The remaining 22 nibbles in the cache may be zeroed out or may store old data that will be overwritten, in different embodiments. A left shift circuit 2120 receives (i) data 2125 from the activation write bus, which includes 10 new output values (i.e., the block size for the current pass is 10), as well as (ii) the current cache pointer value 2115. The left shift circuit 2120 shifts the received data 2125 by the number of nibbles indicated by the cache pointer value 2115. As such, the data output by the left shift circuit 2120 to the cache 2100 has 10 nibbles worth of zeros, then the 10 newly received values, and finally 12 nibbles worth of zeros. This allows the newly received values to be stored in the cache 2100 in the correct locations, as shown in the second stage 2110.

In addition, the cache pointer 2115 is provided to a pointer update circuit 2130, along with the block size (the configuration value from the control circuits that indicates the number of output values received). The pointer update circuit 2130 adds the block size to the previous cache pointer value to generate the new cache pointer value, which in this case is 20 (as shown in the second stage 2110).

Returning to the process 2000, if the newly received output values do not represent the end of a row of output values but do fill up the cache, the process 2000 writes (at 2030) a full RAM word with the existing cache contents and at least a subset of the new output values to the core memory. In addition, the process stores (at 2035) any remainder of new output values (i.e., output values that are not part of the RAM word written to memory) in the cache, starting at the beginning. That is, the cache is filled circularly, such that once the end of the cache is reached, the write controller immediately begins filling up the cache from its beginning. Along with this, the process updates (at 2040) the pointer into the cache to point to the position at the end of the newly added output values and increases the write address into the RAM (because the previous write address has now had a word written to it).

Figure 22:
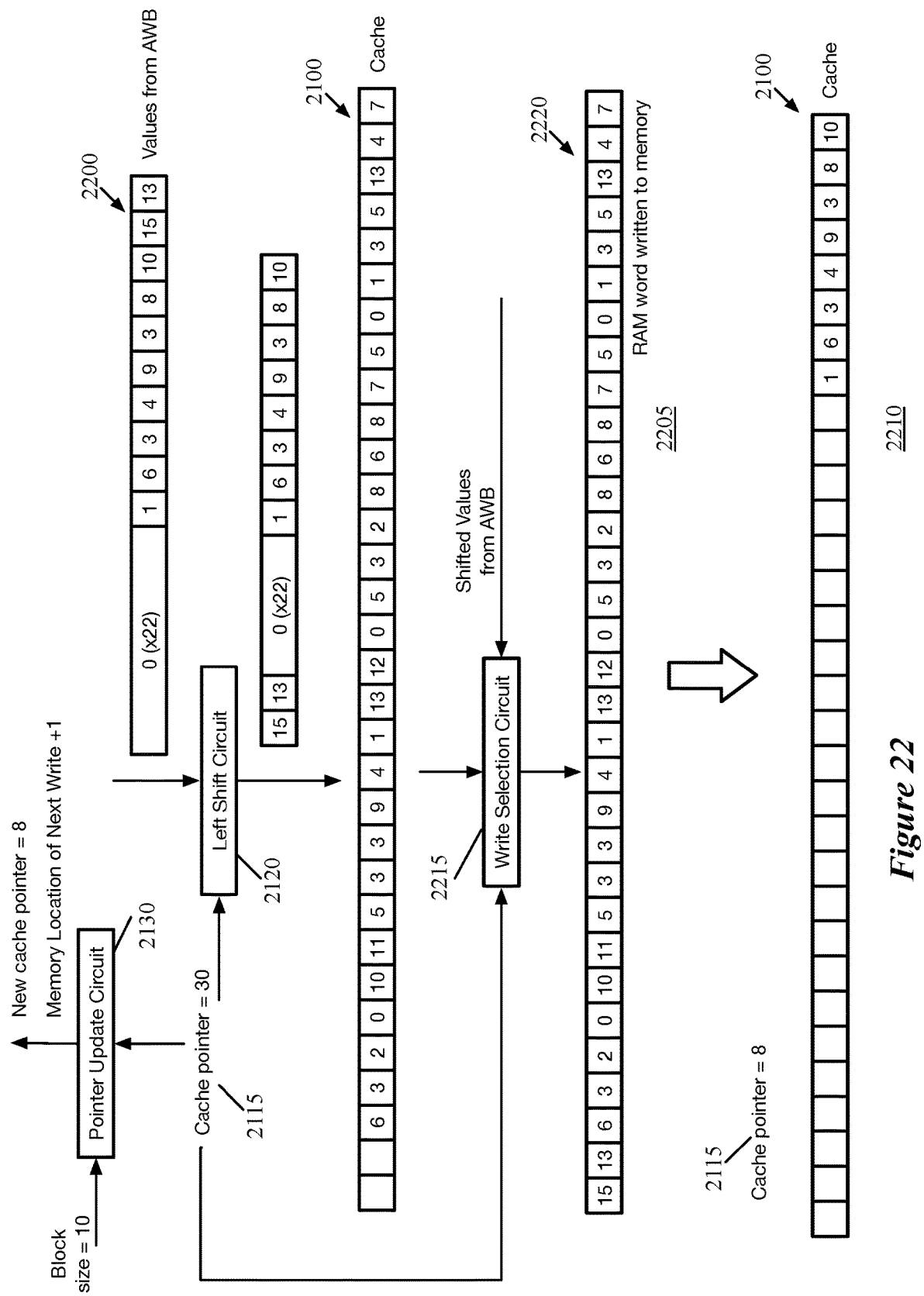
FIG. 22 illustrates an example of operations to write a full RAM word including previously cached output values and newly received output values to memory, add any remaining new output values to the cache, and update the cache pointer.

FIG. 22 illustrates an example of these operations to write a full RAM word including previously cached output values and newly received output values to memory, add any remaining new output values to the cache, and update the cache pointer, over two stages 2205-2210. The first stage 2205 illustrates that the cache 2100 is nearly filled up prior to receiving any new output values, with 30 of the 32 spots in the cache storing valid data. Correspondingly, the cache pointer 2115 is set to 30 at this point.

The left shift circuit 2120 receives (i) data 2200 from the activation write bus, which as in the previous example includes 10 new output values, as well as (ii) the current cache pointer value 2115. The left shift circuit 2120 circularly shifts the received data 2200 by the number of nibbles indicated by the cache pointer value 2115 (in this case, 30). As such, the data output by the left shift circuit 2120 to the cache 2100 begins with the last 8 new output values, then 22 nibbles worth of zeros, and then the initial 2 new output values. These first 2 new output values will be written to memory while the eight remaining values will be stored at the beginning of the cache.

In order to write the correct set of data to memory, the write control circuitry of some embodiments includes a write selection circuit 2215. This circuit receives the shifted values from the activation write bus (i.e., the output of the left shift circuit 2120) as well as the values previously stored in the cache 2100, and provides the full RAM word worth of data to the circuits that actually write to memory. Which values to select from which input is based on the cache pointer 2115, which is also provided to the write selection circuit 2215. In this case, the write selection circuit 2215 uses the cache pointer value 2115 to select 30 previously-cached output values and 2 newly received output values in order to generate a RAM word 2220 that is written to memory. In some embodiments, the write selection circuit 2215 shares circuitry with a cache update circuit that is responsible for updating the cache, as these operations use much of the same data to combine output values in similar ways.

In addition to the memory write operations, the cache pointer 2115 is provided to the pointer update circuit 2130, along with the block size. The pointer update circuit 2130 adds the block size to the previous cache pointer value to generate the new cache pointer value, which in this case rolls over to 8. As mentioned, in some embodiments the cache pointer value is the lower set of bits of an overall pointer value while the upper set of bits of this value is used to indicate the next memory location (e.g., RAM word) to which to write the output values. In this case, the block size of 10 causes the pointer update circuit 2130 to increase the overall pointer value such that the lower set of bits rolls over from 30 to 8. This causes the upper set of bits indicating the next memory location to which to write output values to increase by 1. As noted, in different embodiments this upper set of bits may represent the actual memory location or an offset from a base memory location that is fixed for the current pass or neural network layer.

Returning to the process 2000, if the received output values are the end of a row of output values, the write control circuit will write at least one RAM word to memory (and in some cases, two). In this case, the process determines (at 2045) whether the number of newly received output values is greater than the remaining room in the cache. Essentially, this determination indicates whether one or two RAM words are to be written to memory. If the new output values do not fill up the cache or fill up the cache exactly with no remainder, then only one RAM word needs to be written to memory.

In this case, the process 2000 writes (at 2050) a full RAM word with the existing cache contents, the newly received output values, and any necessary 0-padding to memory. In addition, the process 2000 resets (at 2070) the pointer into the cache to 0 (because the cache has been emptied) and increases the address of the next memory location to which to write a RAM word. Some embodiments also allow for the RAM write address to be completely reset at this point (e.g., if the end of a row is also the end of a pass).

Figure 23:
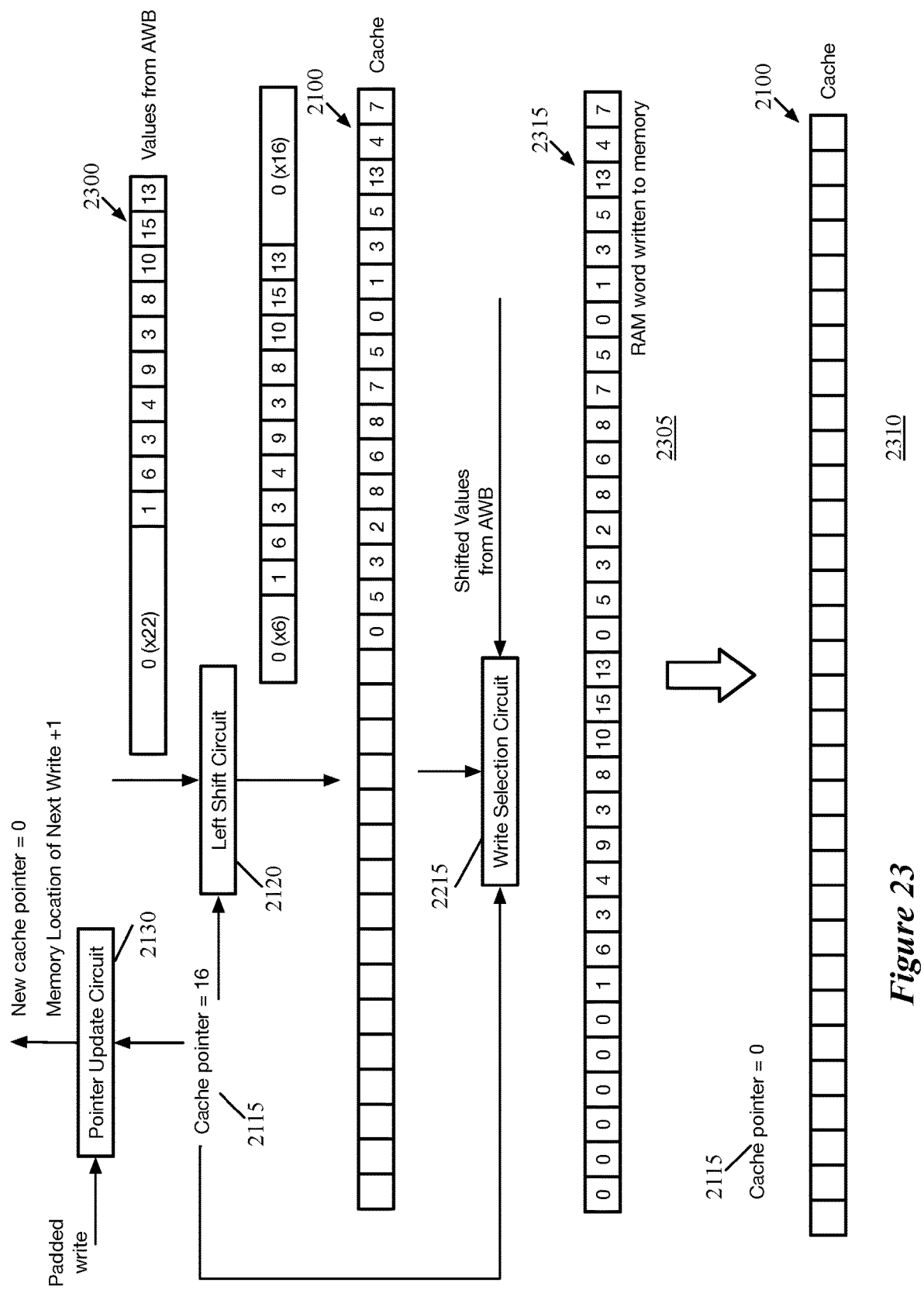
FIG. 23 illustrates an example of operations to write all of the existing cached output values and the newly received values to a single memory location with 0-padding as needed.

FIG. 23 illustrates an example of these operations to write all of the existing cached output values and the newly received values to a single memory location with 0-padding as needed, over two stages 2305-2310. The first stage 2305 illustrates that the cache 2100 begins the clock cycle storing 16 valid (not yet written to memory) output values, and as such the cache pointer 2115 is set to the value 16.

The left shift circuit 2120 again receives (i) data 2300 from the activation write bus, which as in the previous examples includes 10 new output values, as well as (ii) the current cache pointer value 2115. The left shift circuit 2120 shifts the received data 2300 by the number of nibbles indicated by the cache pointer value 2115 (in this case, 16). As such, the data output by the left shift circuit 2120 to the cache 2100 begins with 16 nibbles worth of zeros, then the 10 newly received output values, and then six more nibbles worth of zeros.

In this case, unlike the two previous examples, the write controller opcode specified by configuration data is for a padded write, rather than a standard write. As such, the contents of the cache and the newly received output values are written to the next memory location in the core memory. The write selection circuit 2215 receives, as in FIG. 22, the cache contents as well as the newly received output values, shifted by the left shift circuit 2120. This write selection circuit 2215 also receives the current cache pointer value 2115, which specifies to use the cache contents for the first 16 nibbles of the RAM word and to use the newly received output values from the left shift circuit 2120 for the remainder of the RAM word. As such, the RAM word 2315 that is written to memory includes these 26 output values as well as 6 nibbles worth of zero-padding (from the left shift circuit 2120).

In addition, the cache pointer value 2115 is modified by the pointer update circuit 2130. The pointer update circuit 2130 also receives the block size, as in previous examples, but this is ignored due to the received opcode being a padded write operation and the number of the newly received output values not being greater than the remaining room in the cache. Instead, on account of the padded write opcode, the pointer update circuit 2130 increments the memory location for the next write operation, and resets the cache pointer value 2115 to 0. The second stage 2310 illustrates that the cache pointer 2115 has been reset to 0 and the cache 2100 is empty.

Returning once more to the process 2000, if the newly received output values are the end of a row of output values and the number of these newly received output values is greater than the remaining room in the cache, then two write operations are required in order to write all of the data to memory. In this case, in the initial clock cycle (i.e., the clock cycle at which the output values are received, and during which the other operations 2020-2050 would occur in those cases), the process 2000 writes (at 2055) to the core memory a full RAM word with the cache contents and the subset of the newly received output values that fit within RAM word. That is, if the cache has 6 remaining nibbles that were not previously occupied with valid data, then the cache contents and the first 6 of the newly received output values are written to memory. In addition, the process 2000 stores (at 2060) the remainder of the newly received output values in the cache and updates the pointer into the cache. This update will include the overall pointer rolling over, thereby increasing the memory location for the next write. For this clock cycle, the write controller operates in the same manner as if the configuration opcode specifies a standard write operation and the cache was filled up. However, the write controller of some embodiments also stores a state value in this case to indicate that the padded write operation needs to be completed.

In the next clock cycle, the process 2000 writes (at 2065) to the core memory a RAM word that includes the remainder of the newly received output values (which are now the stored cache contents) along with 0-padding. In some embodiments, the state value stored by the write controller in the previous clock cycle (indicating that the padded write operation needs to be completed) causes the write controller to write this second RAM word to memory. The memory location of this second RAM word is the next memory location after the location to which the initial RAM word was written at operation 2050. Along with writing the second RAM word to core memory, the process 2000 also resets (at 2070) the pointer into the cache and increases the address of the next memory location to which to write a RAM word (i.e., for the next row of output values). As mentioned above, some embodiments also allow for the RAM write address to be completely reset at this point.

Figure 24A:
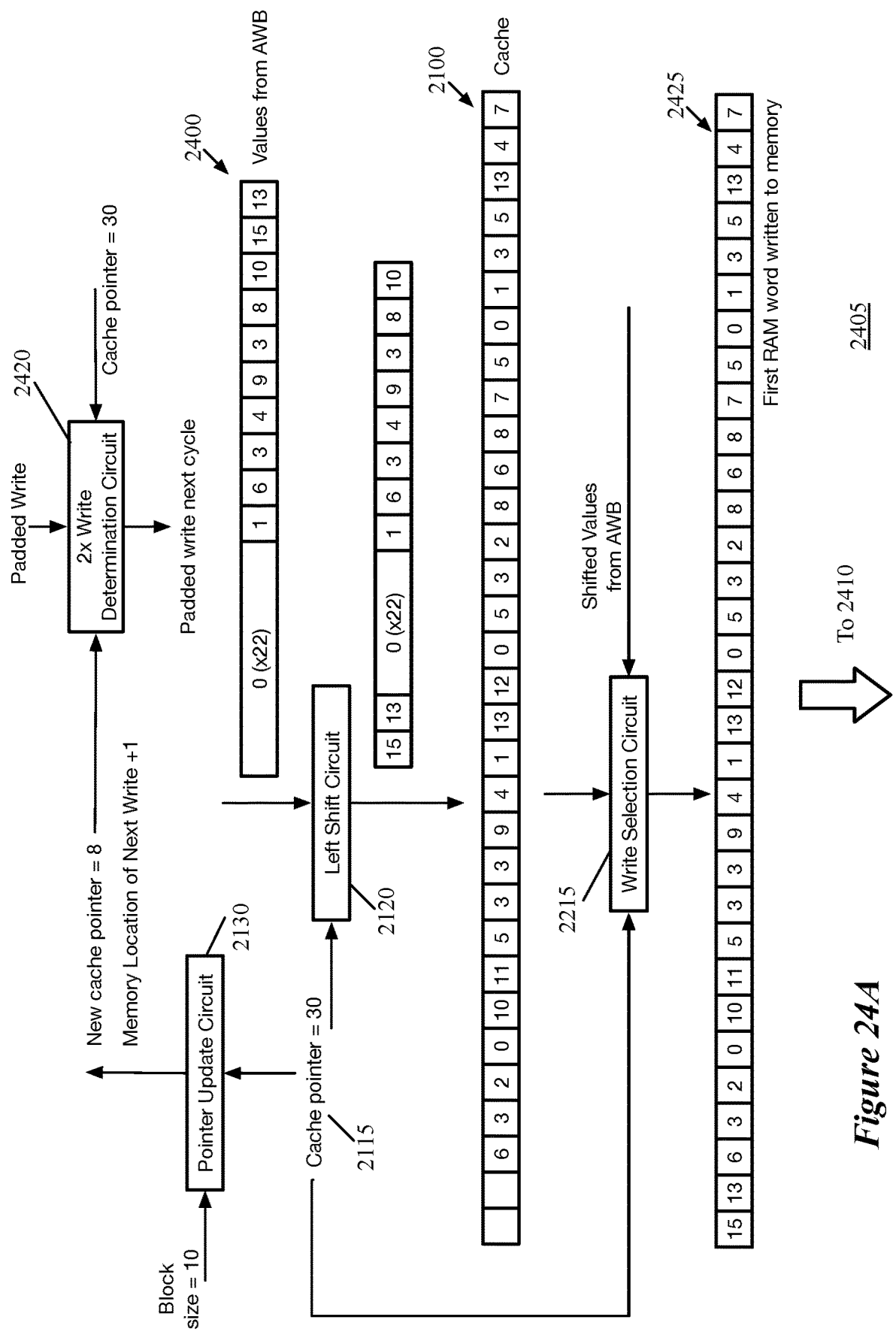
FIGS. 24A-B illustrates an example of operations to write all of the existing cached output values and the newly received values to two memory locations.
Figure 24B:
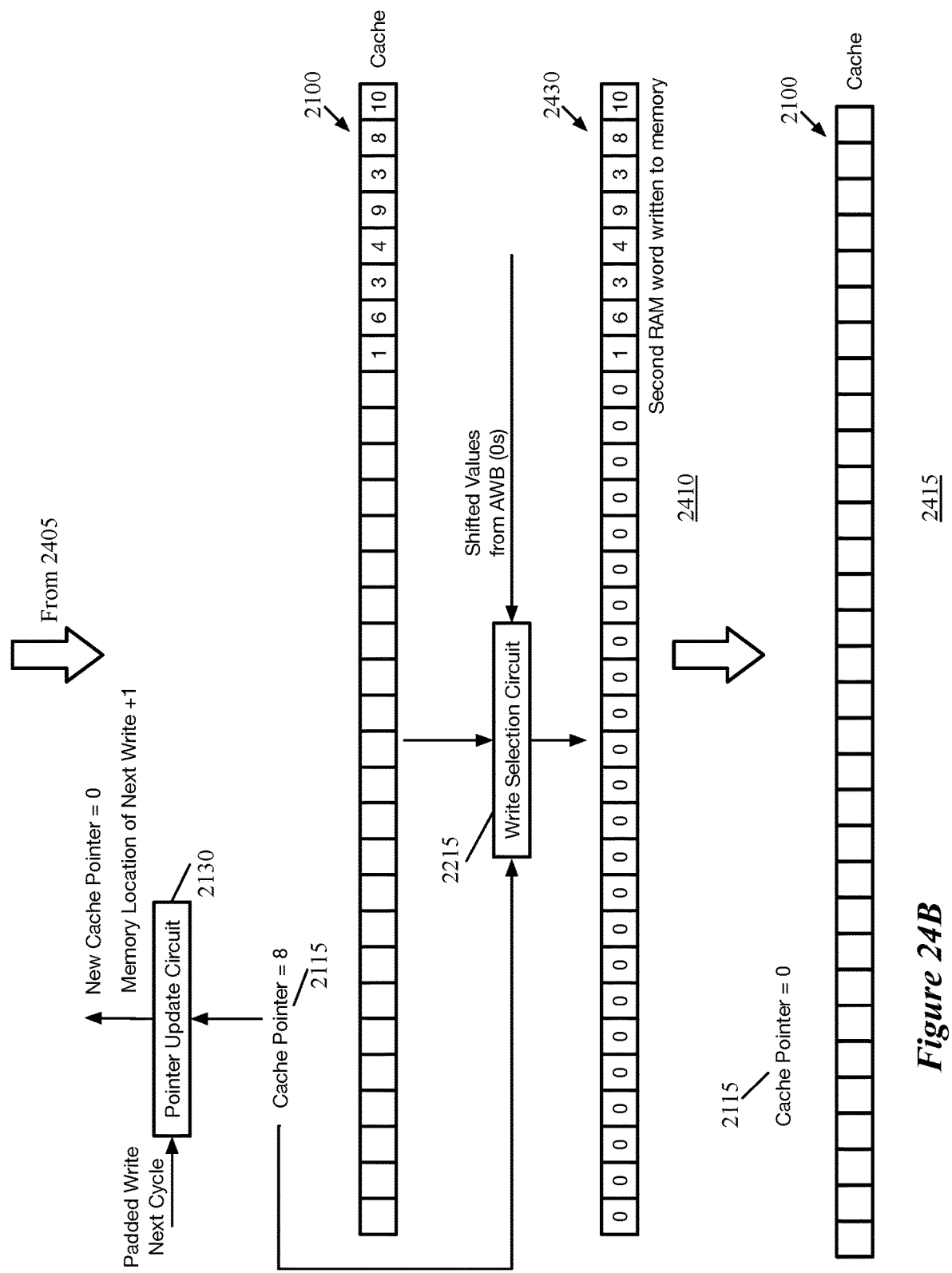

FIGS. 24A-B illustrates an example of the operations to write all of the existing cached output values and the newly received values to two memory locations, over three stages 2405-2415. The first stage 2405 illustrates that the cache 2100 begins the first clock cycle (at which output values are received) storing 30 valid (not yet written to memory) output values, and as such the cache pointer 2115 is set to the value 30.

As in the previous examples, the left shift circuit 2120 receives (i) data 2400 from the activation write bus, which again includes 10 new output values, as well as (ii) the current cache pointer value 2115. The left shift circuit 2120 circularly shifts the received data 2300 by the number of nibbles indicated by the cache pointer value 2115 (in this case, 30). As such, the data output by the left shift circuit 2120 to the cache 2100 begins with the last 8 new output values, then 22 nibbles worth of zeros, and then the initial 2 new output values.

As in the example of FIG. 23, the write controller opcode specified by the configuration data is for a padded write, rather than a standard write operation. As such, the contents of the cache and the newly received output values need to be written to the next memory location in the core memory. However, unlike that example, there are more than one RAM word's worth of output values to write. As shown, in this initial clock cycle, the write selection circuit 2215 receives the contents of the cache 2100 as well as the newly received output values shifted by the left shift circuit 2120. The write selection circuit 2215 also receives the current cache pointer value 2115, which specifies to use the cache contents for the first 30 nibbles of the RAM word and to use the newly received output values from the left shift circuit 2120 for the remainder of the RAM word (in this case the last two nibbles). As such, the RAM word 2425 that is written to memory in this clock cycle includes these 32 output values with no zero-padding.

The pointer update circuit 2130, in this case, adds the block size (10) to the existing pointer value, such that the cache pointer (the lower set of bits of the overall pointer) rolls over to the value 8 while the memory location for the next write operation is increased by 1. While the configuration opcode specifies a padded write operation, the cache pointer value is not reset in this instance because of the newly received output values wrapping around to a second RAM word.

This first stage 2405 also illustrates a 2× write determination circuit 2420. As mentioned, some embodiments store a state value that indicates when a second memory write is required in a subsequent clock cycle (i.e., a write operation that is not based on an opcode received that cycle). The 2× write determination circuit 2420, in some embodiments, receives the padded write opcode (or a value based on this opcode indicating that the padded write operation was specified), as well as the previous cache pointer 2115 (in this case, 30) and the updated cache pointer (in this case, 8). If, as in this case, the updated cache pointer value is less than the previous cache pointer value, but is not 0, then the write controller stores a state value (e.g., in a single bit register) that specifies to perform a write operation in the subsequent clock cycle.

The second stage 2410 illustrates that, in the subsequent clock cycle, the cache 2100 now stores 8 valid values and the cache pointer 2115 is correspondingly set to 8. In this clock cycle, the write controller circuitry does not receive any new output values from the activation write bus or an opcode specifying a write operation, but nevertheless performs another write operation based on the stored state value from the previous clock cycle. Accordingly, the write selection circuit 2215 receives the cache contents (with 8 valid values) and full RAM word worth of zero values from the left shift circuit. Based on the cache pointer 2115 being set to the value 8, the write selection circuit outputs a RAM word 2430 with the eight valid cache values and the remainder of the word being zero values.

The cache pointer value 2115 is also modified again by the pointer update circuit 2130. The pointer update circuit 2130 also receives the block size, as in previous examples, but this is ignored based on the stored state value indicating to perform a padded write this cycle. Instead, on account of this stored state value, the pointer update circuit 2130 increments the memory location for the next write operation, and resets the cache pointer value 2115 to 0. The third stage 2415 illustrates that the cache pointer 2115 has been reset to 0 and the cache 2100 is empty.

It should be noted that, while in this example the write block size could be arbitrary (i.e., any value up to 32), some embodiments place additional restrictions on the write block size. For instance, in some embodiments the compiler is only allowed to define write block sizes that are powers of 2 (up to a maximum of 32). This prevents the situations shown in FIGS. 22 and 24A-B, in which an incoming block of activations requires wrapping around to the beginning of the cache. If the write block size is always a power of 2, then each time a block of output values is received (and is not the end of a row of output values) it will either be stored in the cache or will exactly fill up the cache without requiring a cache wrap (in which case the cached values and new values are written to memory). Similarly, if the end of a row is reached, the situation in which two writes to memory are required does not occur in this case, as either the initial write is exactly 32 activations or is 0-padded.

It should also be noted that, in some embodiments, the core memory banks are unable to handle read and write operations in the same cycle. Because of the nature of the neural network operations (e.g., for convolutional layers), in which the read operations are interspersed with the write operations (because, for a single pass, new read operations are required for each subsequent set of computation node operations, the outputs of which are written to memory), in some cases the cores will be reading and writing to the same memory bank. In general, the compiler tries to avoid using the same memory bank for both the input and output of a single layer, but when this is the case additional cycles may be required in order to allow for both read and write operations to those memory banks. Specifically, in some embodiments, the write controller circuitry receives a configuration value that indicates when a read operation is also being performed for the same memory bank, and prevents writing to memory for those clock cycles (though if data only needs to be stored in the cache, without a memory write operation, there is no issue). The compiler, in some embodiments, ensures that the there is a bubble in the read requests as necessary to allow for the write operations to occur once the cache fills up or the end of a row is reached before new output values are computed.

The integrated circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the IC to be executed by the IC on the device. These devices can include mobile devices, desktop computers, Internet of Things (IOT devices), etc.

Figure 25:
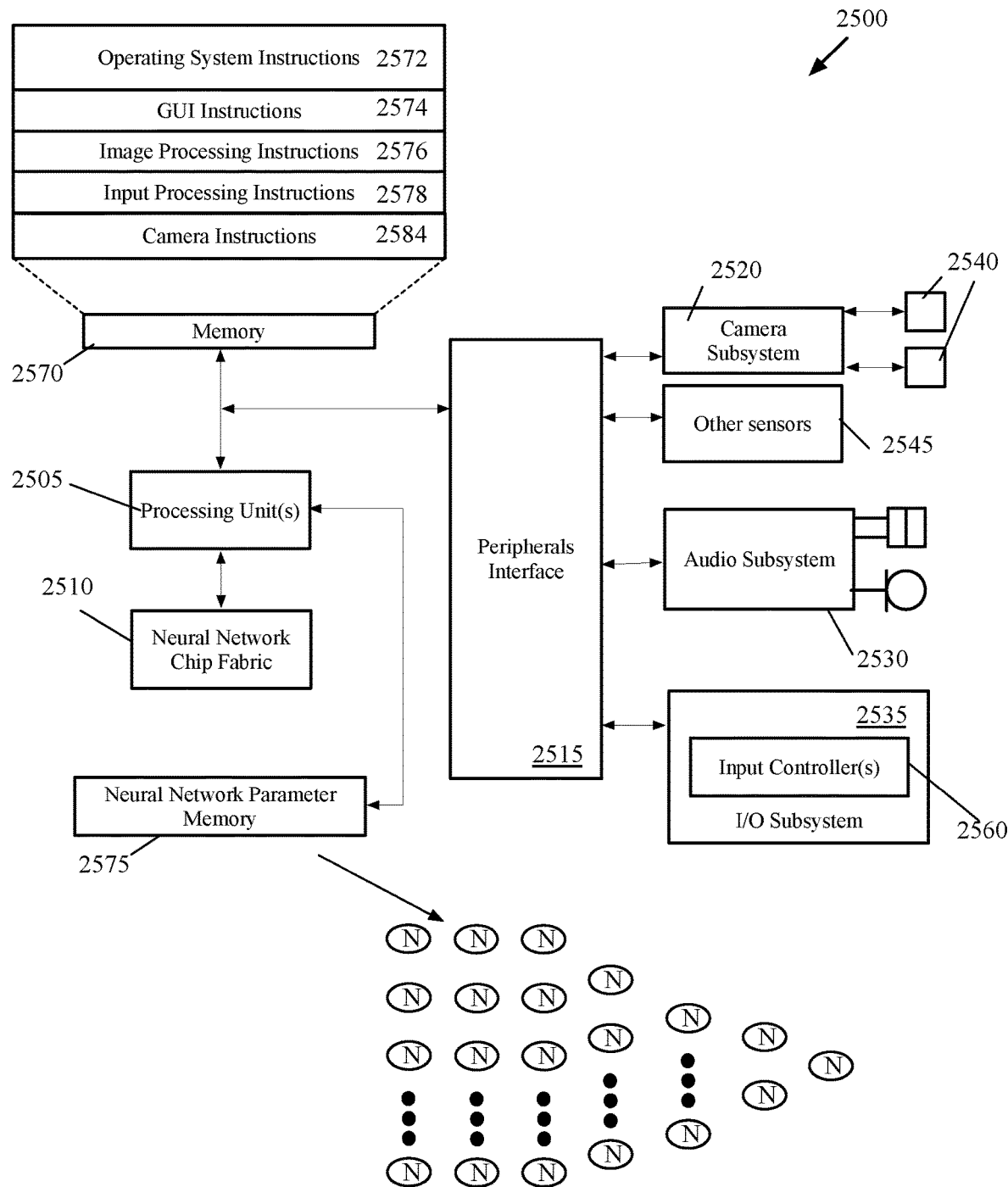
FIG. 25 is an example of an architecture of an electronic device that includes the neural network integrated circuit of some embodiments.

FIG. 25 is an example of an architecture 2500 of an electronic device that includes the neural network integrated circuit of some embodiments. The electronic device may be a mobile computing device such as a smartphone, tablet, laptop, etc., or may be another type of device (e.g., an IoT device, a personal home assistant). As shown, the device 2500 includes one or more general-purpose processing units 2505, a neural network chip fabric 2510, and a peripherals interface 2515.

The peripherals interface 2515 is coupled to various sensors and subsystems, including a camera subsystem 2520, an audio subsystem 2530, an I/O subsystem 2535, and other sensors 2545 (e.g., motion/acceleration sensors), etc. The peripherals interface 2515 enables communication between the processing units 2505 and various peripherals. For example, an orientation sensor (e.g., a gyroscope) and an acceleration sensor (e.g., an accelerometer) can be coupled to the peripherals interface 2515 to facilitate orientation and acceleration functions. The camera subsystem 2520 is coupled to one or more optical sensors 2540 (e.g., charged coupled device (CCD) optical sensors, complementary metal-oxide-semiconductor (CMOS) optical sensors, etc.). The camera subsystem 2520 and the optical sensors 2540 facilitate camera functions, such as image and/or video data capturing.

The audio subsystem 2530 couples with a speaker to output audio (e.g., to output voice navigation instructions). Additionally, the audio subsystem 2530 is coupled to a microphone to facilitate voice-enabled functions, such as voice recognition, digital recording, etc. The I/O subsystem 2535 involves the transfer between input/output peripheral devices, such as a display, a touch screen, etc., and the data bus of the processing units 2505 through the peripherals interface 2515. The I/O subsystem 2535 various input controllers 2560 to facilitate the transfer between input/output peripheral devices and the data bus of the processing units 2505. These input controllers 2560 couple to various input/control devices, such as one or more buttons, a touch-screen, etc.

In some embodiments, the device includes a wireless communication subsystem (not shown in FIG. 25) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 25, a memory 2570 (or set of various physical storages) stores an operating system (OS) 2572. The OS 2572 includes instructions for handling basic system services and for performing hardware dependent tasks. The memory 2570 also stores various sets of instructions, including (1) graphical user interface instructions 2574 to facilitate graphic user interface processing; (2) image processing instructions 2576 to facilitate image-related processing and functions; (3) input processing instructions 2578 to facilitate input-related (e.g., touch input) processes and functions; and (4) camera instructions 2584 to facilitate camera-related processes and functions. The processing units 2510 execute the instructions stored in the memory 2570 in some embodiments.

The memory 2570 may represent multiple different storages available on the device 2500. In some embodiments, the memory 2570 includes volatile memory (e.g., high-speed random access memory), non-volatile memory (e.g., flash memory), a combination of volatile and non-volatile memory, and/or any other type of memory.

The instructions described above are merely exemplary and the memory 2570 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 2575 stores the weight values, bias parameters, etc. for implementing one or more machine-trained networks by the neural network chip fabric 2510. As mentioned above, different clusters of cores of the fabric 2510 can implement different machine-trained networks in parallel in some embodiments. In different embodiments, these neural network parameters are stored on-chip (i.e., in memory that is part of the neural network chip fabric 2510) or loaded onto the IC 2510 from the neural network parameter memory 2575 via the processing unit(s) 2505.

While the components illustrated in FIG. 25 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 2505 and the neural network IC 2510, which enables the processing units 2505 to provide inputs to the neural network IC 2510 and receive the outputs of the network from the IC 2510. Also, while many of the functions have been described as being performed by one component, one of ordinary skill in the art will realize that the functions described with respect to FIG. 25 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 26:
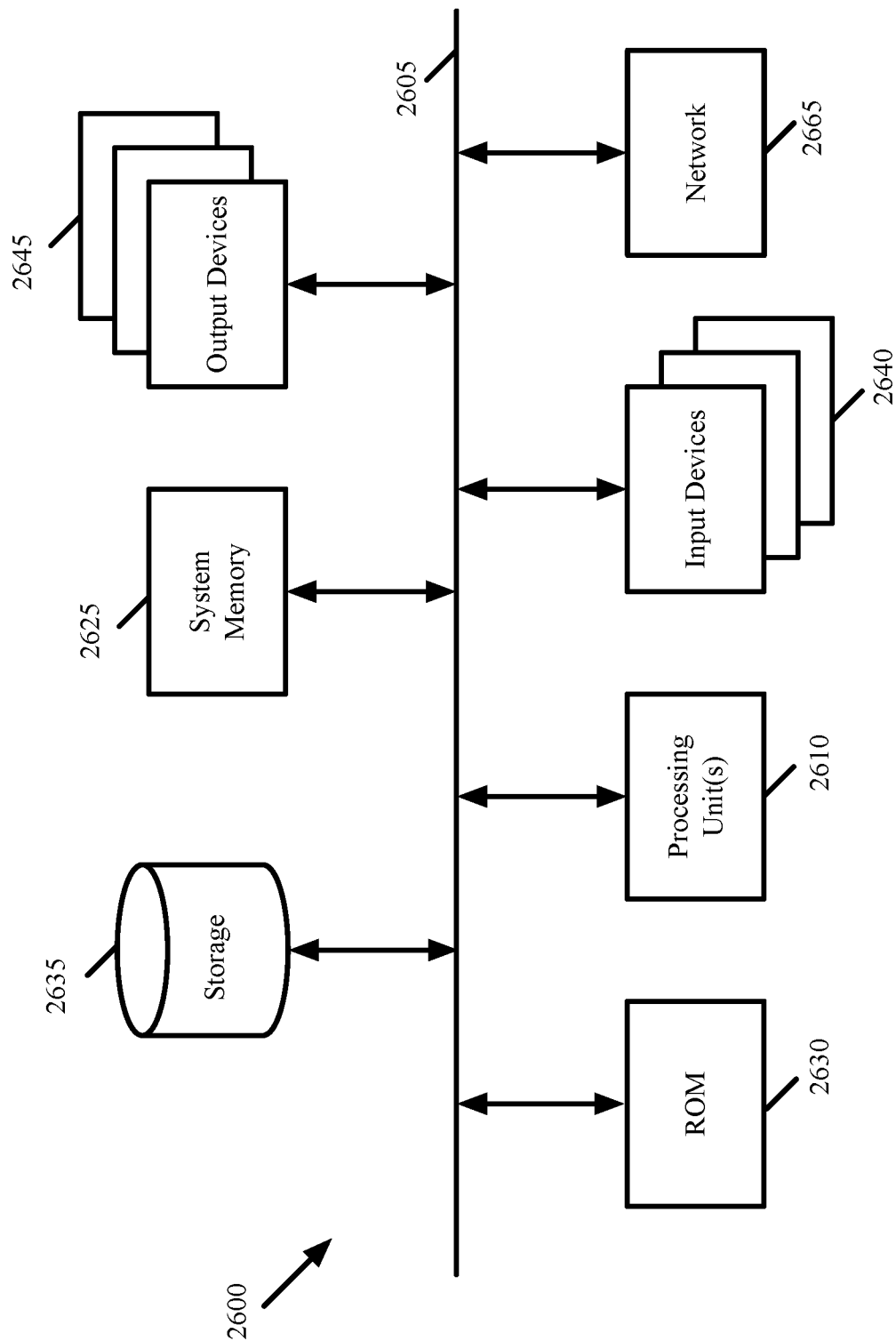
FIG. 26 conceptually illustrates an electronic system with which some embodiments of the invention are implemented.

FIG. 26 conceptually illustrates an electronic system 2600 with which some embodiments of the invention are implemented. The electronic system 2600 can be used to execute any of the control and/or compiler systems described above in some embodiments. The electronic system 2600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2600 includes a bus 2605, processing unit(s) 2610, a system memory 2625, a read-only memory 2630, a permanent storage device 2635, input devices 2640, and output devices 2645.

The bus 2605 collectively represents all system, peripheral, and chipset buses that communicatively connect the numerous internal devices of the electronic system 2600. For instance, the bus 2605 communicatively connects the processing unit(s) 2610 with the read-only memory 2630, the system memory 2625, and the permanent storage device 2635.

From these various memory units, the processing unit(s) 2610 retrieves instructions to execute and data to process in order to execute the processes of the invention. The processing unit(s) may be a single processor or a multi-core processor in different embodiments.

The read-only-memory (ROM) 2630 stores static data and instructions that are needed by the processing unit(s) 2610 and other modules of the electronic system. The permanent storage device 2635, on the other hand, is a read-and-write memory device. This device is a non-volatile memory unit that stores instructions and data even when the electronic system 2600 is off. Some embodiments of the invention use a mass-storage device (such as a magnetic or optical disk and its corresponding disk drive) as the permanent storage device 2635.

Other embodiments use a removable storage device (such as a floppy disk, flash drive, etc.) as the permanent storage device. Like the permanent storage device 2635, the system memory 2625 is a read-and-write memory device. However, unlike storage device 2635, the system memory is a volatile read-and-write memory, such a random-access memory. The system memory stores some of the instructions and data that the processor needs at runtime. In some embodiments, the invention's processes are stored in the system memory 2625, the permanent storage device 2635, and/or the read-only memory 2630. From these various memory units, the processing unit(s) 2610 retrieves instructions to execute and data to process in order to execute the processes of some embodiments.

The bus 2605 also connects to the input and output devices 2640 and 2645. The input devices enable the user to communicate information and select commands to the electronic system. The input devices 2640 include alphanumeric keyboards and pointing devices (also called "cursor control devices"). The output devices 2645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 26, bus 2605 also couples electronic system 2600 to a network 2665 through a network adapter (not shown). In this manner, the computer can be a part of a network of computers (such as a local area network ("LAN"), a wide area network ("WAN"), or an Intranet, or a network of networks, such as the Internet. Any or all components of electronic system 2600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 13, 16 and 20) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A neural network inference circuit for executing a neural network that comprises a plurality of computation nodes at a plurality of layers, the neural network inference circuit comprising:
   a plurality of core circuits comprising memories for storing input values for the computation nodes of the neural network;
   a set of post-processing circuits for computing output values of the computation nodes of the neural network, wherein output values of computation nodes of a first layer of the neural network are for storage in the memories of the plurality of core circuits as input values for a second layer of the neural network; and
   an output bus, comprising a plurality of lanes, that connects the set of post-processing circuits to the plurality of core circuits, the output bus for (i) receiving a set of output values from the set of post-processing circuits, (ii) transporting the set of output values to the plurality of core circuits based on configuration data specifying a core circuit at which each output value of the set of output values is to be stored, and (iii) aligning the set of output values for storage in the plurality of core circuits,
   wherein:
   the plurality of lanes of the output bus are ordered and indexed, each lane corresponding to a set of post-processing units;
   for a particular clock cycle, each lane receives at most one computed output value from one of the post-processing units of its corresponding set of post-processing units;
   a subset of the output values that are transported to a particular core circuit that receives output values in the particular clock cycle are transported on contiguous lanes of the output bus; and
   the output bus aligns the subset of output values that are transported to the particular core circuit by shifting the subset of output values by an amount based on a lowest index of the contiguous lanes.

2. The neural network inference circuit of claim 1 further comprising dot product computation circuits for computing dot products and providing the dot products to the set of post-processing circuits.

3. The neural network inference circuit of claim 2, wherein the set of post-processing circuits compute output values of computation nodes of at least a set of layers of the neural network based on the dot products received from the dot product computation circuits.

4. The neural network inference circuit of claim 2, wherein the dot product computation circuits comprise:
   partial dot product computation circuits that are part of the plurality of core circuits; and
   a dot product bus that aggregates dot products from the partial dot product computation circuits of different core circuits and provides the aggregated dot products to the set of post-processing circuits.

5. The neural network inference circuit of claim 1, wherein the output bus aligns the set of output values for storage in the plurality of core circuits by shifting subsets of output values of the set of output values by different amounts.

6. The neural network inference circuit of claim 5, wherein the different amounts vary for different core circuits.

7. The neural network inference circuit of claim 1, wherein at least a subset of the plurality of lanes do not receive any computed output value in the particular clock cycle.

8. The neural network inference circuit of claim 1, wherein the output bus further comprises a shifter for each core circuit of the neural network inference circuit.

9. The neural network inference circuit of claim 8, wherein the shifter for each core circuit comprises inputs to receive output values from all lanes of the output bus.

10. The neural network inference circuit of claim 9, wherein the shifter for each core circuit outputs output values from at most half of the plurality of lanes of the output bus.

11. The neural network inference circuit of claim 1, wherein the plurality of core circuits are divided into clusters, wherein each cluster is associated with (i) a subset of the set of post-processing units and (ii) a segment of a plurality of segments of the output bus.

12. The neural network inference circuit of claim 11, wherein the configuration data specifies, for each respective segment of the plurality of segments, whether to transport specific output values to (i) a core circuit belonging to the respective cluster corresponding to the respective segment, (ii) a first neighboring segment located in a first direction from the respective segment, or (iii) a second neighboring segment located in a second direction from the respective segment.

13. The neural network inference circuit of claim 12, wherein each of the plurality of lanes of the output bus interconnects across the plurality of segments, wherein the configuration data is specified for groups of contiguous lanes.

14. The neural network inference circuit of claim 1, wherein computation nodes of at least a set of the plurality of layers of the neural network comprise dot products of sets of input values and sets of weight values, wherein for a particular layer of the neural network, each of a plurality of sets of weight values is used to compute output values for a plurality of computation nodes.

15. The neural network inference circuit of claim 14, wherein the output bus transports each output value computed using a particular set of weight values for storage in the particular core circuit.

16. The neural network inference circuit of claim 15, wherein for each respective set of weight values of the plurality of sets of weight values, all output values computed using the respective set of weight values are transported by the output bus for storage in a same respective core circuit.

* * * * *